US008696453B2

(12) United States Patent
Yoshikawa et al.

(10) Patent No.: US 8,696,453 B2
(45) Date of Patent: *Apr. 15, 2014

(54) GAME APPARATUS, STORAGE MEDIUM STORING A GAME PROGRAM, AND GAME CONTROL METHOD

(71) Applicant: Nintendo Co., Ltd., Kyoto (JP)

(72) Inventors: Yasuo Yoshikawa, Nagoya (JP); Takahiro Harada, Kyoto (JP); Toyokazu Nonaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,042

(22) Filed: Mar. 13, 2013

(65) Prior Publication Data
US 2013/0190085 A1  Jul. 25, 2013

Related U.S. Application Data

(63) Continuation of application No. 13/210,415, filed on Aug. 16, 2011, now Pat. No. 8,403,749, which is a continuation of application No. 11/236,845, filed on Sep. 28, 2005, now Pat. No. 8,033,914.

(30) Foreign Application Priority Data

Dec. 13, 2004 (JP) .................................. 2004-360387
May 16, 2005 (JP) .................................. 2005-142321

(51) Int. Cl.
A63F 9/24 (2006.01)
(52) U.S. Cl.
USPC ............................................. 463/31; 463/37

(58) Field of Classification Search
USPC ....................................................... 463/31, 37
See application file for complete search history.

(56) References Cited

U.S. PATENT DOCUMENTS 4,711,543 A     12/1987  Blair et al.
2002/0034979 A1*  3/2002  Yamamoto et al. ............. 463/31
(Continued)

FOREIGN PATENT DOCUMENTS

JP      05-31256       2/1993
JP      11-095650      4/1999
(Continued)

OTHER PUBLICATIONS

"DS Hardware", Nintendo DS Release Data, www.gamefaqs.com/portable/ds/data/925329, Nov. 11, 2004, 1 page.

(Continued)

Primary Examiner — Pierre E Elisca
(74) Attorney, Agent, or Firm — Nixon & Vanderhye P.C.

(57) ABSTRACT

A game apparatus includes an LCD and is provided a touch panel in relation to the LCD. The LCD displays a game screen for making a player character hit a ball. For example, when touch-on is performed on the LCD (touch panel), the stance and shot power of the player character are decided according to coordinates of the touch-on position. With this, the path of the ball is decided to be a straight ball, draw ball or fade ball, and the carry of the ball is decided with regard to the shot power. Following the touch-on, when a slide operation is performed, an impact is decided according to the slide operation. For example, the path of the ball is changed by the decided impact.

11 Claims, 48 Drawing Sheets

(56) References Cited

U.S. PATENT DOCUMENTS

| | | | |
|---|---|---|---|
| 2002/0115486 | A1 | 8/2002 | Miyamoto et al. |
| 2006/0025217 | A1* | 2/2006 | Hussaini et al. ............... 463/36 |
| 2006/0089198 | A1 | 4/2006 | Sawatani et al. |
| 2008/0291216 | A1* | 11/2008 | Cheng et al. .................. 345/619 |
| 2008/0293464 | A1* | 11/2008 | Cheng et al. ...................... 463/3 |
| 2008/0293488 | A1* | 11/2008 | Cheng et al. .................. 463/31 |
| 2009/0170579 | A1 | 7/2009 | Ishii et al. |

FOREIGN PATENT DOCUMENTS

| | | |
|---|---|---|
| JP | 2002-000939 | 1/2002 |
| JP | 2002-939 | 1/2002 |
| JP | 2003-290552 | 10/2003 |
| JP | 2004-267763 | 9/2004 |
| JP | 2004-321303 | 11/2004 |

OTHER PUBLICATIONS

Electronic Arts, "Tiger Woods PGA Tour 2003 Manual", www.replacmentdocs.com, Oct. 31, 2002, 53 pages.

Akutsu "Game Super Express" (Column), No. 105, "Latest edition of masterpiece of golf games, Links 2003 Japanese version" (Online), May 16, 2003, "Mycom Journal" Mainichi Communications Inc., (retrieved on Sep. 19, 2008) (URL: http://journal.mycom.co.jp/column/game/105/index.html).

Nakamura, "Arrived today! Demo & Patch (dated Sep. 30, 2002), Golf Simulator, Links 2003, Playable demo (166 MB)"(Online), Sep. 30, 2002, Game Watch, Impress Corporation (retrieved on Sep. 19, 2008)(URL: http://www.watch.impress.co.jp/game/docs/20020930/demo0930.htm).

Nakamura, "Media Quest introduces Links 2003 (Japanese version) on the market on Apr. 25, Latest soft of standard golf simulator series" (Online), Mar. 17, 2003, Game Watch, Impress Corporation (retrieved on Sep. 19, 2008)(URL: http://www.watch.impress.co.jp/game/docs/20030317/links.htm).

"3-D Golf!", "Login 1992 7/3 No. 13", ASCII Media Works, Jul. 3, 1992, vol. 11, No. 13, p. 14.

Sep. 30, 2008 Notice of Reason for Rejection and partial translation.

Office Action issued Nov. 9, 2010 in Japanese Appln. No. 2005-142321, with partial English text.

Manual for "Tiger Woods PGA Tour 2003" for PC, 2003, pp. 1-26 and 51.

"Tiger Woods PGA Tour 2003 for PC", Game Details Section of Summary, [online], GameSpot website, searched Oct. 29, 2010, http://www.gamespot.com/pc/sports/tigerwoodspgatour2003/tech_info.html?tag=tabs%3Bsummary (5 pages).

"Tiger Woods PGA Tour 2003 (PC)" [online], GameSpy website, searched Oct. 29, 2010, http://pc.gamespy.com/pc/tiger-woods-pga-tour-2003/ (4 pages).

"Microsoft Golf 1998 Edition," Login 1998 Aug. 8, vol. 17, No. 8, published by ASCII Corporation, Aug. 1, 1998, p. 53, with partial English translation.

* cited by examiner

FIG. 5
(A) GAME SCREEN WITH SHOT POWER VALUE OF 100% 120
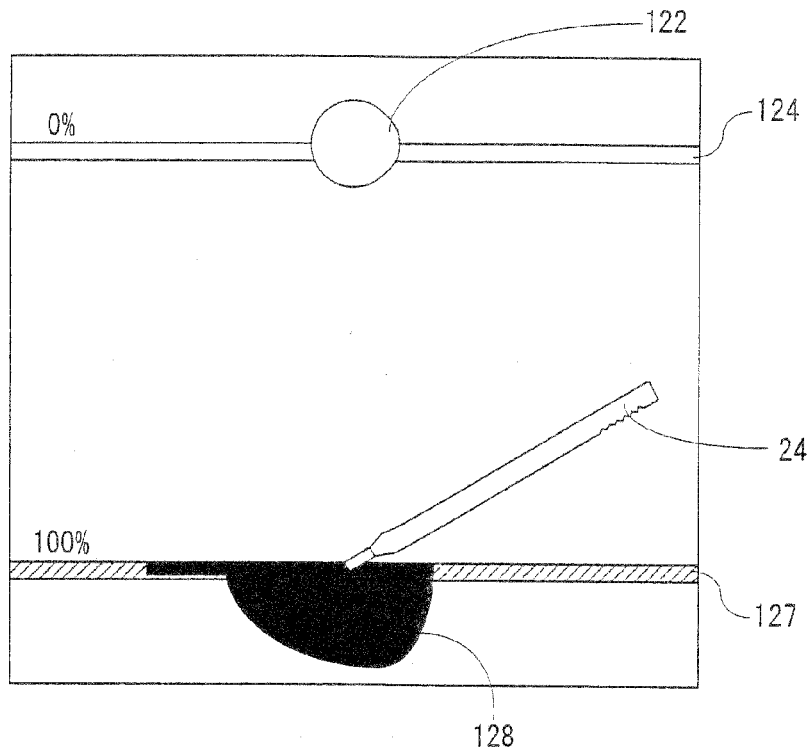
(B) GAME SCREEN WITH SHOT POWER VALUE OF 30% 120
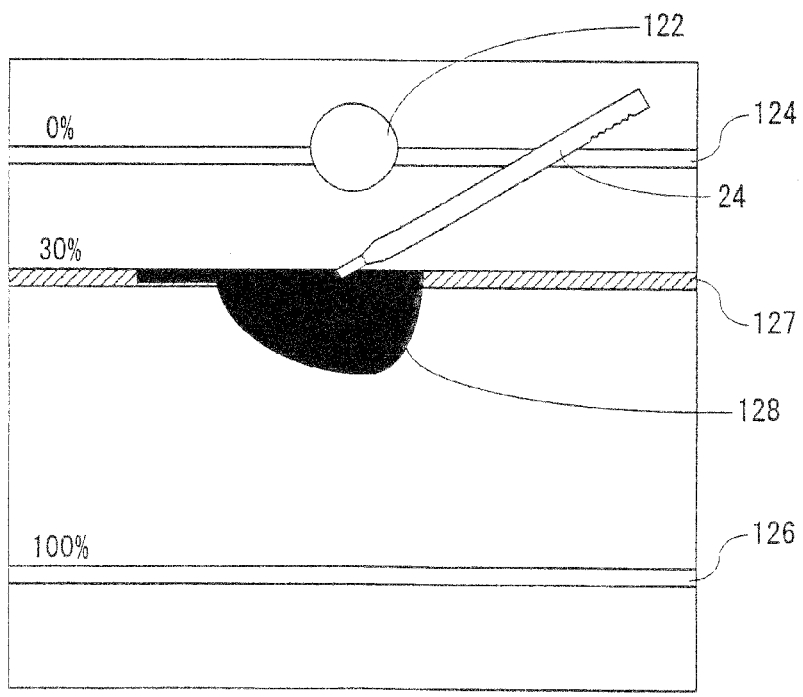

FIG. 6
(A) GAME SCREEN USING 1W 120
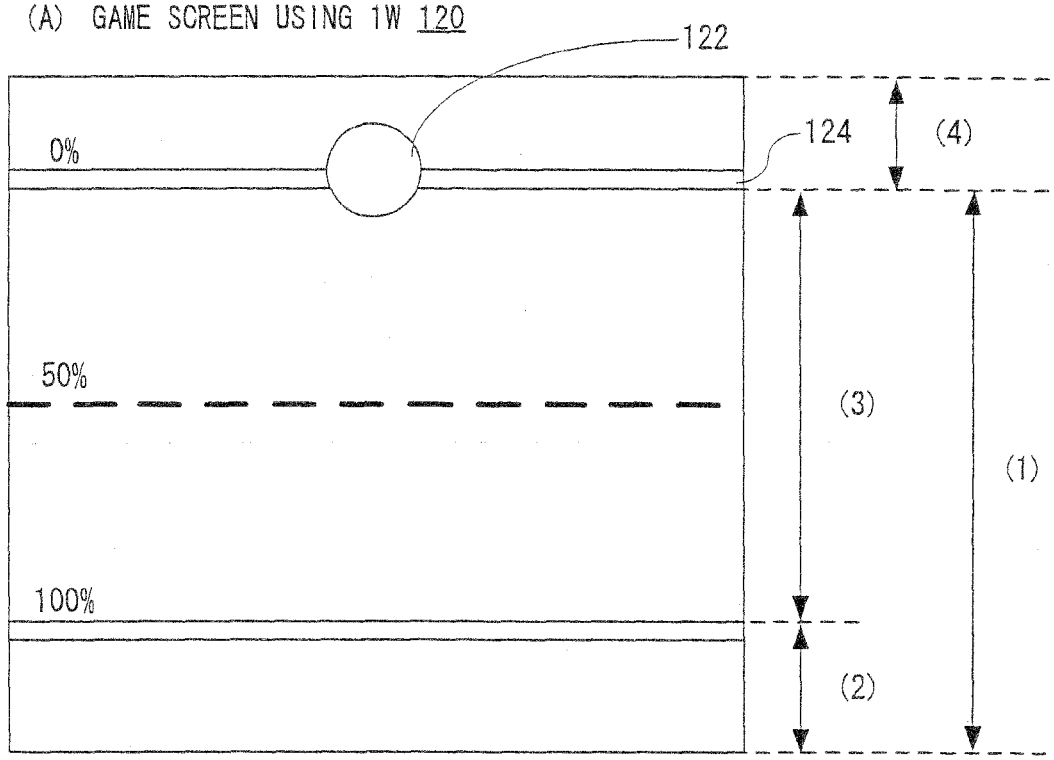
(B) GAME SCREEN USING PW 120
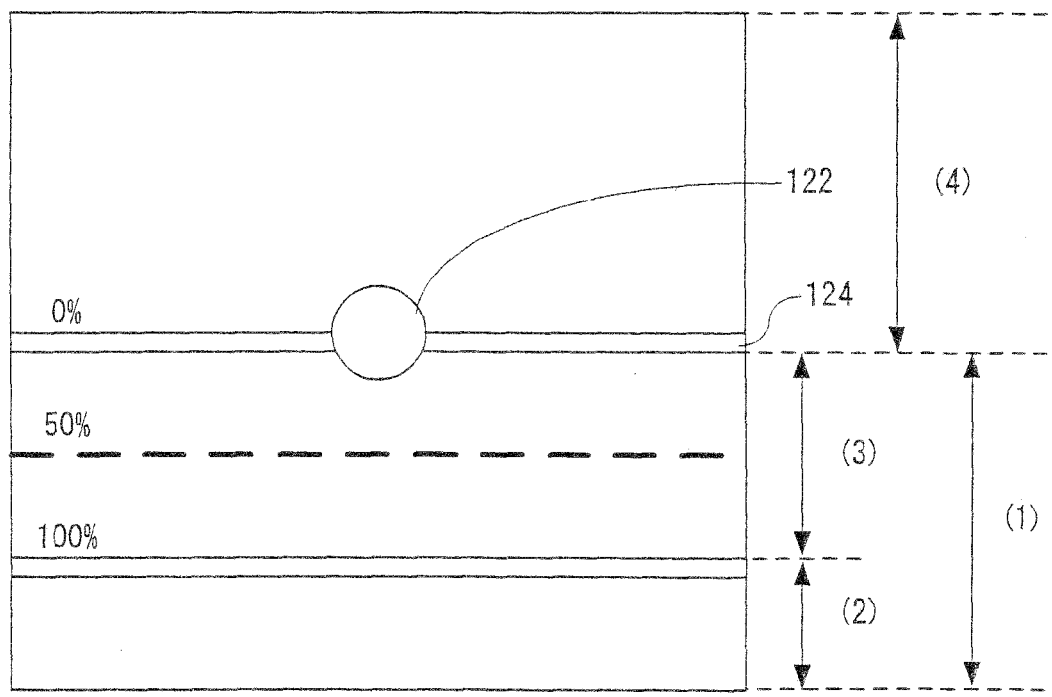

FIG. 10
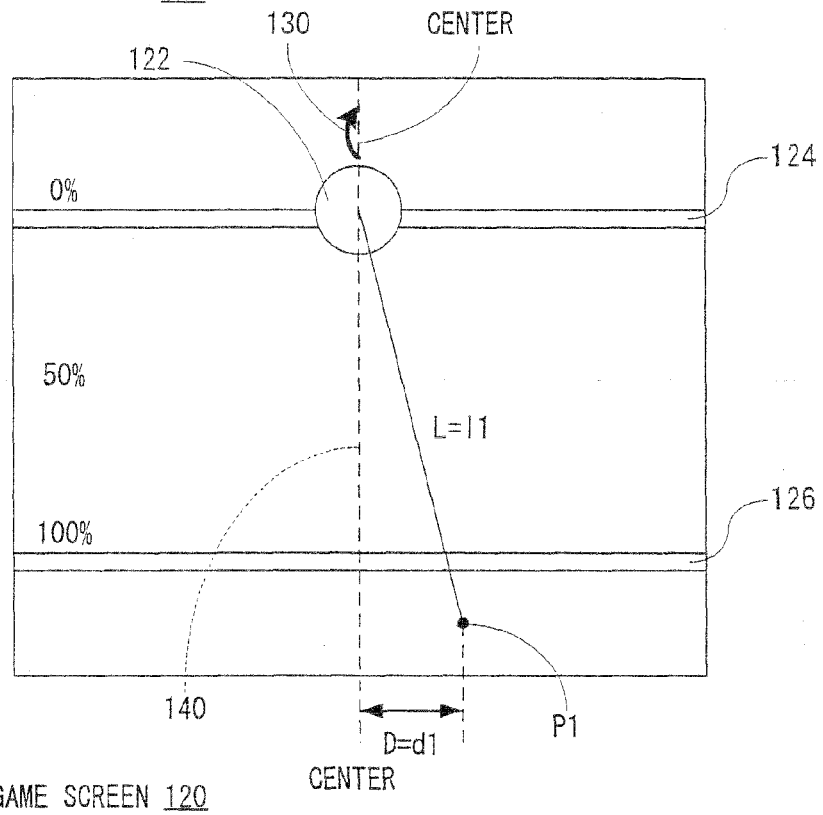
(A) GAME SCREEN 120
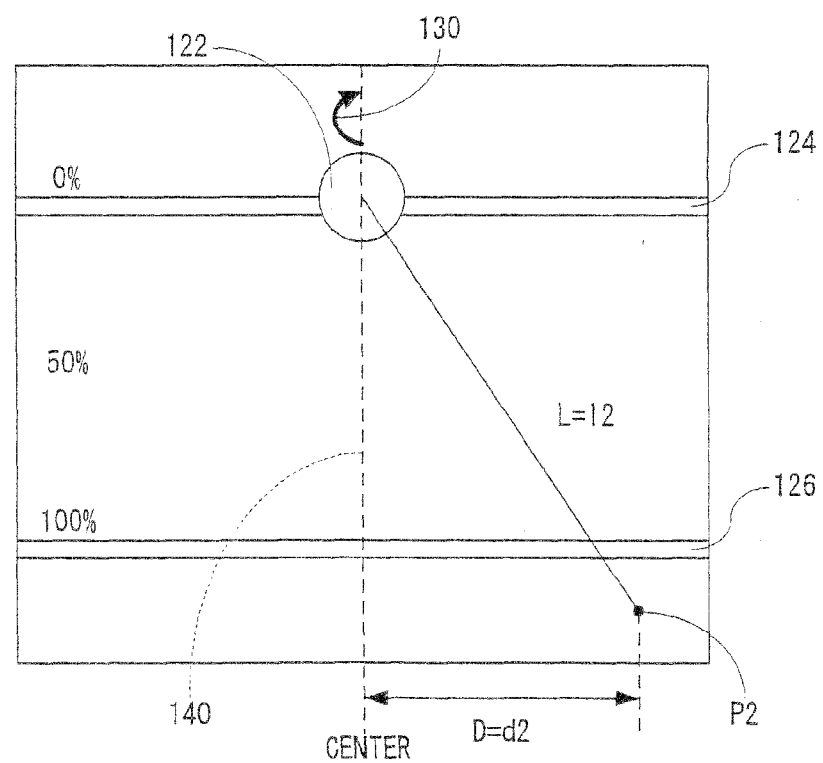
(B) GAME SCREEN 120

FIG. 11
(A) GAME SCREEN WITH DOWNHILL 120
(FOR RIGHT-HANDED PLAYER CHARACTER)
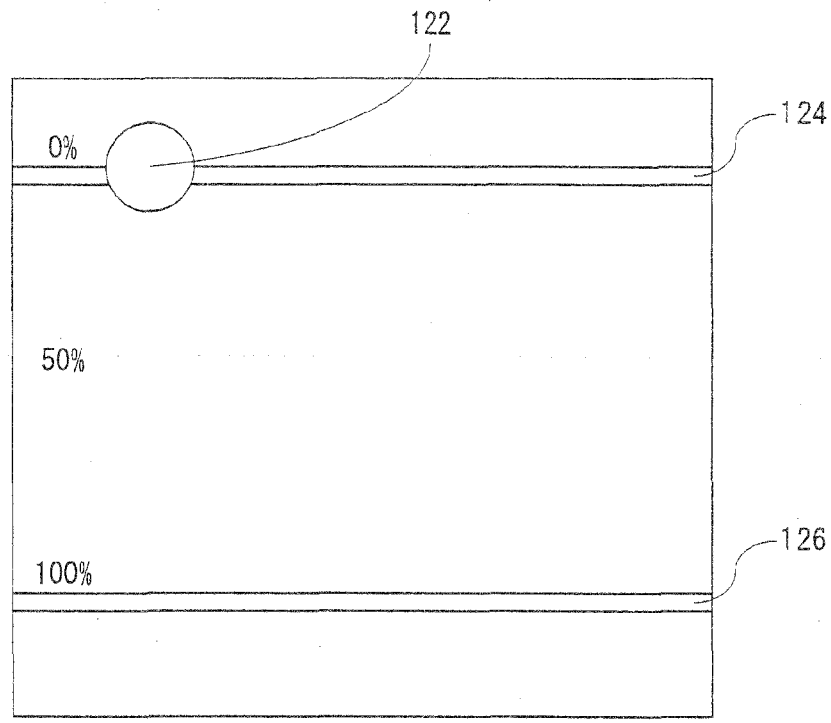
(B) GAME SCREEN WITH UPHILL 120
(FOR RIGHT-HANDED PLAYER CHARACTER)
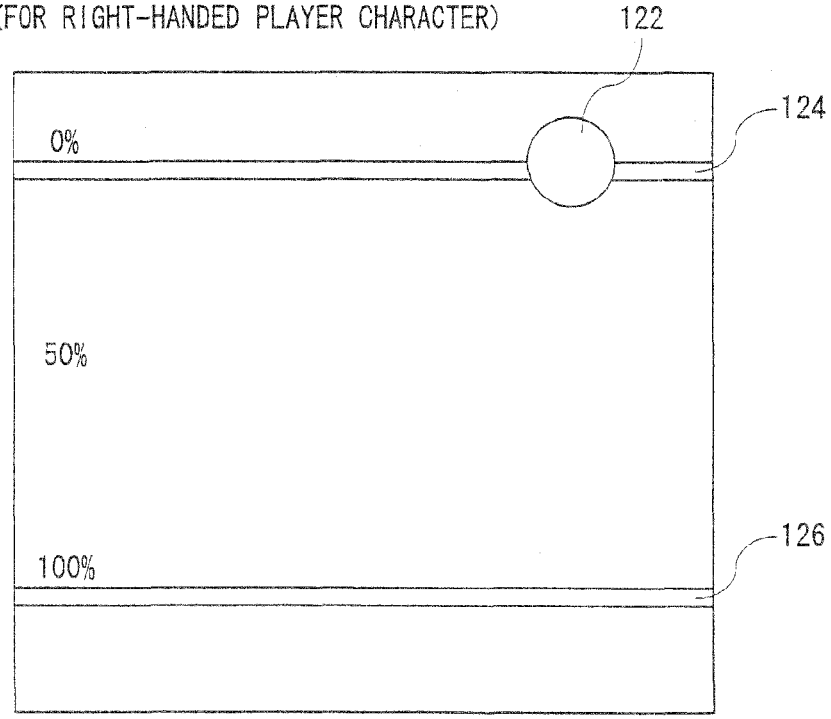

FIG. 12
(A) SLIDE OPERATION GOING BEYOND IMPACT LINE
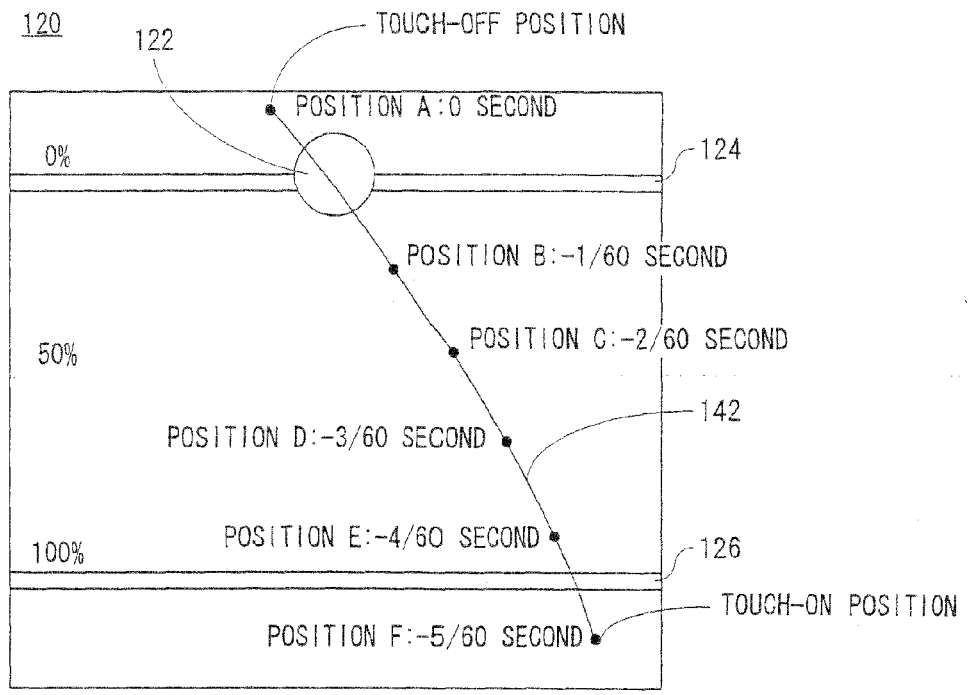
(B) SLIDE OPERATION NOT GOING BEYOND IMPACT LINE
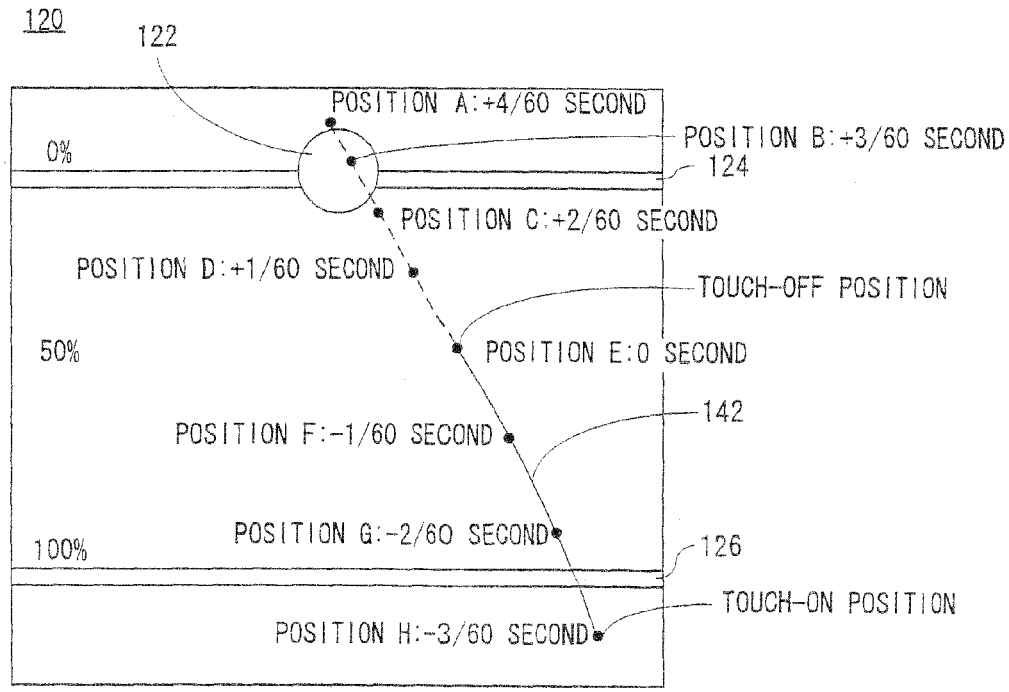

FIG. 15
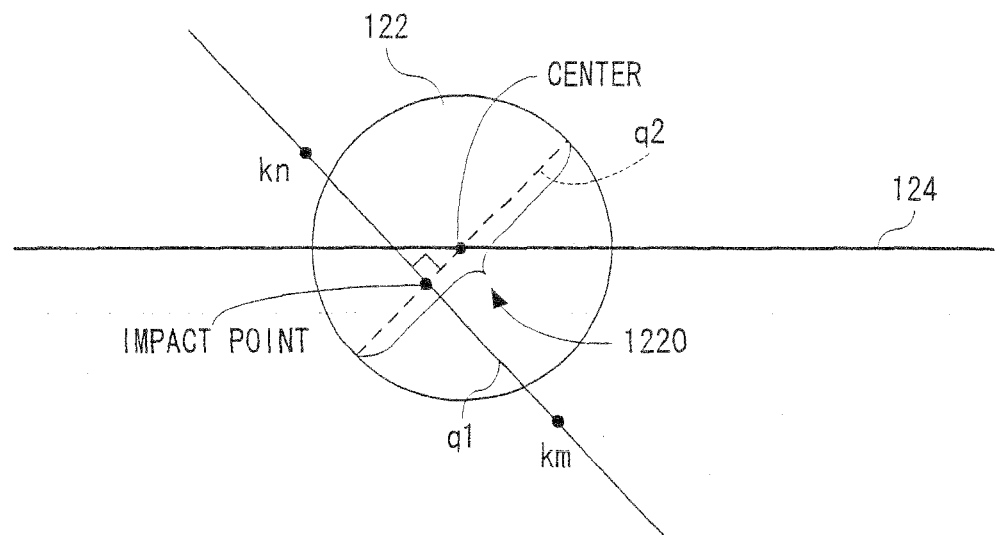
(A)
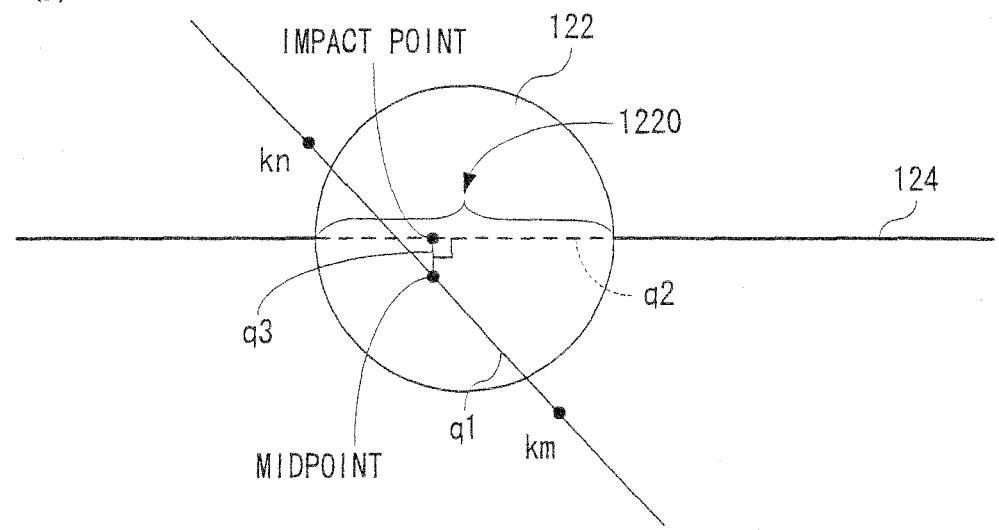
(B)
kn : FIRST COORDINATES
km : SECOND COORDINATES FIG. 16
(A) GAME DIFFICULTY LEVEL: LOW (BALL SIZE: LARGE)
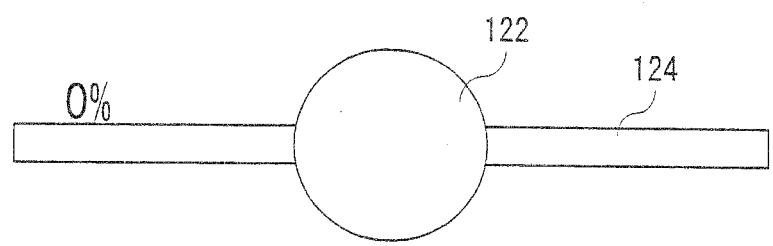
(B) GAME DIFFICULTY LEVEL: MEDIUM (BALL SIZE: MEDIUM)
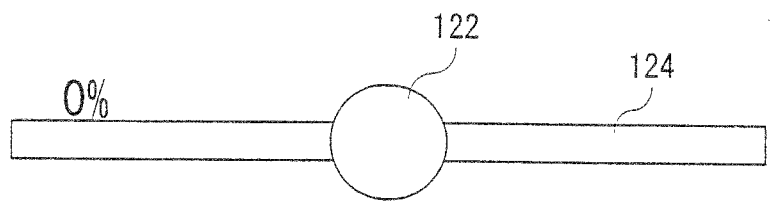
(C) GAME DIFFICULTY LEVEL: HIGH (BALL SIZE: SMALL)
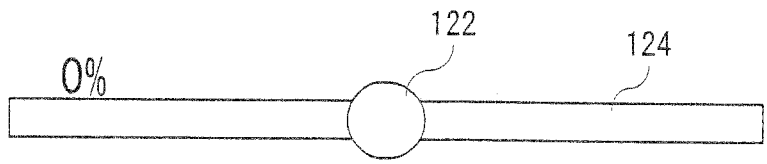

FIG. 17
(A) EASY TO MAKE IMPACT BUT
    DIFFICULT TO ACHIEVE LONG CARRY
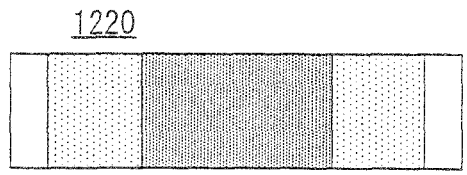
(B) EASY TO MAKE CURVE
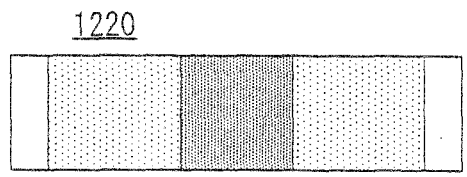
(C) DIFFICULT TO MAKE IMPACT BUT
    EASY TO ACHIEVE LONG CARRY
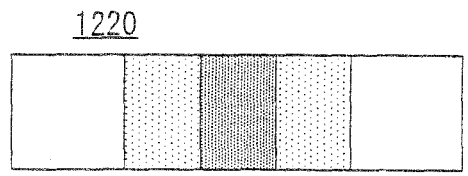
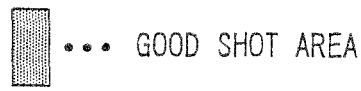 ··· GOOD SHOT AREA
 ··· PUSH SHOT AREA, PULL SHOT AREA
 ··· MISSED SHOT AREA

FIG. 30

DATA STORAGE AREA 72

| IMAGE DATA | 720 | STANCE VALUE DATA | 750 |
|---|---|---|---|
| MAP DATA (LANDFORM DATA) | 722 | SWING SPEED CORRECTION DATA | 752 |
| SELECTED CLUB DATA | 724 | IMPACT RESULT DATA | 754 |
| SHOT DIRECTION DATA | 726 | IMPACT POINT DATA | 756 |
| BALL SPIN DATA | 728 | LAUNCH DIRECTION CORRECTION DATA | 758 |
| SHOT TYPE SETTING DATA | 730 | LAUNCH ANGLE CORRECTION DATA | 760 |
| FULL SHOT LINE POSITION DATA | 732 | POWER LOSS CORRECTION DATA | 762 |
| IMPACT LINE POSITION DATA | 734 | SPIN CORRECTION DATA | 764 |
| TARGET BALL SIZE DATA | 736 | SLIDE OPERATION TIME REFERENCE TIMER | 766 |
| TARGET BALL POSITION DATA | 738 | SLIDE OPERATION STOP TIME REFERENCE TIMER | 768 |
| LIE STATE DATA | 740 | SWING PROCESS FLAG | 770 |
| INITIAL TOUCH POSITION DATA | 742 | TOUCH-ON FLAG | 772 |
| CURRENT TOUCH POSITION DATA | 744 | SWING SPEED CORRECTION FLAG | 774 |
| IMMEDIATELY PRECEDING TOUCH POSITION DATA | 746 | NICE SHOT FLAG | 776 |
| SHOT POWER VALUE DATA | 748 | ⋮ | |

GAME APPARATUS, STORAGE MEDIUM STORING A GAME PROGRAM, AND GAME CONTROL METHOD

CROSS-REFERENCE TO RELATED APPLICATIONS

This application is a continuation of U.S. application Ser. No. 13/210,415, filed Aug. 16, 2011, now U.S. Pat. No. 8,403, 749, which is a continuation of U.S. application Ser. No. 11/236,845, filed Sep. 28, 2005, now U.S. Pat. No. 8,033,914, which claims the benefit of Japanese Patent Application Nos. 2004-360387, filed Dec. 13, 2004 and 2005-142321, filed May 16, 2005, each of which is incorporated herein in its entirety.

BACKGROUND

1. Technical Field

The technology presented herein relates to a game apparatus, a storage medium storing a game program, and a game control method. More specifically, the present technology relates to a game apparatus, a storage medium storing a game program, and a game control method, for controlling movement of an object according to a player's operating position and slide operation.

2. Description of the Prior Art

One example of this kind of conventional game apparatus is disclosed in Japanese Patent Laying-open No. 5-31256 [A63F 9/22, A63B 67/02, G06F 15/20] (document 1) laid-open on Feb. 9, 1993. According to the hitting simulation device in this prior art, a hitting simulation on a golf course is performed by, when a user brings a pen tip down on a virtual ball displayed on the flat display and then lifts the pen, determining the shooting direction and the shooting power according to changes in coordinate point corresponding to the path of the pen.

In addition, another example of conventional game apparatus is disclosed in Japanese Patent Laying-open No. 2002-939 [A63F 13/00, G06F 3/033] (document 2) laid-open on Jan. 8, 2002. According to this prior art, when Push button as a pointer for a golf club is dragged to the right and left, the carry and the line of the ball are determined on the basis of the dragging distance and the dragging speed.

The related art disclosed in the document 1 makes it possible to input information required for a hitting simulation by performing one physical operation that is similar to an actual hitting action. However, the prior art can produce variations only in shooting direction and shooting power, and thus a game using this art would be too simple to play with pleasure.

Additionally, with the prior art disclosed in the document 2, only the carry and the line of the ball are determined by a simple operation of dragging Push button to the right and left. As in the case of the prior art disclosed in the document 1, a game using this art is so simple that it may lack in interesting characteristics.

SUMMARY

Therefore, it is a primary feature of an example embodiment presented herein to provide a novel game apparatus, storage medium storing a game program, and game control method.

It is another feature of the present example embodiment to provide a game apparatus, storage medium storing a game program, and game control method, which can offer a new sense of operation and make a game more interesting.

A game apparatus according to the present example embodiment comprises a parameter setting means which sets at least one parameter according to two-dimensional coordinates of an operating position where a predetermined requirement is satisfied, and a game processing means which performs varied game processes using the parameter set by the parameter setting means, depending on whether or not a path determined on the basis of a slide operation subsequent to an inputting operation of the operating position passes through at least a predetermined area.

More specifically, in the game apparatus (10: a reference numeral in "Detailed Description of the Preferred Embodiments". The same applies to the following numerals.), the parameter setting means (42, S13, S19, S23, S25) sets at least one parameter according to two-dimensional coordinates of the operating position where a predetermined requirement is satisfied ("YES" in a step S3). The game processing means (42, S93) performs varied game processes depending on whether or not a path determined on a slide operation subsequent to an input operation of the operating position passes through at least a predetermined area (122). At this time, the set parameter is employed.

According to the present example embodiment, at least one parameter is set at the two-dimensional coordinates of an operating position and varied game processes are performed depending on whether or not the path of a slide operation subsequent to an input operation of specifying the operating position passes through a predetermined area. This makes it possible to perform in a simple manner diversified game processes which are dependent on the player's operations. That is, a game is made more interesting.

In one aspect of the present example embodiment, it further comprises a display portion for displaying at least an operating portion, and a touch panel provided relative to the display portion. A predetermined requirement includes a touch-on to the touch panel. More specifically, the game apparatus further comprises the display portion (14) and a touch panel (22). The display portion (14) displays at least an operating portion (120). The predetermined requirement is a touch on the touch panel, and a parameter is set on the basis of the coordinates of the touch-on. Thus, it is possible to perform various game processes by the player's touch operations.

Another game apparatus according to the present example embodiment comprises an operating position detecting means, a first requirement determining means, a first parameter setting means, a contact determining means, and a game processing means. The operating position detecting means detects a user's operating position on an operating surface. The first requirement determining means determines whether or not the result of detection by the operating position detecting means satisfies a first requirement. The first parameter setting means sets at least one first parameter according to two-dimensional coordinates of the operating position detected by the operating position detecting means when the first requirement determining means has determined that the first requirement is satisfied. The contact determining means determines contact between a path on the operating surface determined on the basis of operating positions detected sequentially from the detection of the operating position in relation to the setting of the first parameter and a first area set on the operating surface. The game processing means performs varied game processes according to the result of detection by the contact determining means, on the basis of the first parameter set by the first parameter setting means.

More specifically, on the game apparatus (10), the operating position detecting means (22, 42, S1, S29, S51, S281, S351) detects the user's operating position on the operating surface (14, 120). The first requirement determining means (42, S3, S283) determines whether or not the result of detection by the operating position detecting means (22, 42, S1, S29, S51, S281, S351) satisfies the first requirement. For example, the first requirement applies to such situations where a transition occurs from a state that no operational input is given to a state that some operational input is given, where an operating position comes within a predetermined area or beyond a predetermined position, and where an operating speed becomes equal to or more than a threshold value (the distance between sequential operating positions is equal to or more than the threshold value), etc.

The first parameter setting means (42, S13, S19, S23, S319, S333, S337, S339) sets at least one first parameter according to the two-dimensional position of the operating position detected by the operating position detecting means (22, 42, S1, S29, S51, S281, S351) when the first requirement determining means (42, S3, S283) has determined that the first requirement is satisfied. For example, the first parameter setting means (42, S13, S19, S23, S319, S333, S337, S339) may set a parameter for each element value of two-dimensional coordinates (that is, setting a parameter A based on an X coordinate and setting a parameter B based on a Y coordinate), or it may set a parameter based on two-dimensional coordinates as a combination of element values (that is, setting the parameter A based on the two-dimensional coordinates (x, y)). Also, it may set a plurality of parameters based on each element value or two-dimensional coordinates (e.g., setting the parameters A and B based on the X coordinate or setting the parameters A and B based on the two-dimensional coordinates (x, y)).

Besides, in using an operating means such as a touch panel, by allowing an operating pressure (pressing force) to be detected as well as the operating position, it would be possible to set the first parameter based on three-dimensional information of two-dimensional coordinates plus the pressure (three-dimensional coordinates).

The contact determining means (42, S77, S483, S493, S497, S501) determines contact between the path (142) on the operating surface (14, 120) which is defined on the basis of the operating positions detected sequentially from the detection of the operating position in relation to the setting of the first parameter and the first area (122 (its display area)) set on the operating surface (14, 120). For example, it determines whether or not the path (142) has passed through the first area ((4), the display area for 122), whether or not an end point of the path (142) exists within the first area ((4), the display area for 122), or whether or not the end point of the path (142) lies on a boundary of the first area ((4), the display area for 122).

Here, the phrase "operating positions detected sequentially from the detection of the operating position in relation to the setting of the first parameter" means that, after the detection of the operating position used for setting the first parameter, operating positions are continuously input and the output from the operating position detecting means does not represent "no operation". However, an exception may be made in such a case where an output indicative of no operation is temporarily presented due to a noise effect or operation error, etc.

Additionally, it is possible to make no affirmative determination if the end point of the path (142) exists within the first area ((4), the display area for 122) (its boundary may be included) and make an affirmative determination only if the path (142) has passed through the first area ((4), the display area for 122). Alternatively, it is possible to make no affirmative determination if the path (142) has passed through the first area ((4), the display area for 122) and make an affirmative determination only if the end point of the path (142) exists within the first area ((4), the display area for 122) (its boundary may be included). Moreover, it is also possible to make a determination on contact between the path (142) and the first area ((4), the display area for 122) by determining whether or not the detected operating position exists within the first area ((4), the display area for 122) (its boundary may be included). Thus, this way of making a determination is acceptable, but it is preferable to detect that a line segment linking the detected operating positions has passed through the first area ((4), the display area for 122), as in the embodiment described later. Furthermore, the first area ((4), the display area for 122) may be a one-dimensional area (a line segment (straight line or curved line)), a two-dimensional area or a three-dimensional area.

Also, the game processing means (42, S93, S225) performs varied game processes according to the result of detection by the contact determining means (42, S71, S77, S483, S493, S497, S501), on the basis of the first parameter set by the first parameter setting means (42, S13, S19, S23, S319, S333, S337, S339).

According to the present example embodiment, game processes dependent on the player's operations are performed, thereby making a game more interesting.

In one aspect, the present example embodiment further comprises a second requirement determining means which, after it has been determined that the first requirement is satisfied, determines whether or not the result of detection by the operating position detecting means satisfies a second requirement different from the first requirement, and a path defining means which defines a path on the basis of the operating positions detected by the operating position detecting means from the time when it has been determined that the first requirement is satisfied until the time when it has been determined that the second requirement is satisfied. More specifically, after it has been determined that the first requirement is satisfied, the second requirement determining means (42, S53, S71, S77, S353, S483, S493, S497, S501) determines whether or not the detection result satisfies the second requirement different from the first requirement. The second requirement here applies to such situations where an operational input changes from on state to off state, where the operating position comes within a predetermined area on the operating surface (14, 120), and where the operating speed becomes equal to or less than the threshold value (the distance between sequential operating positions becomes equal to or less than the threshold value), etc. The path defining means (42, S69, S363, S371) defines the path (142) based on the operating positions detected by the operating position detecting means (22, 42, S1, S29, S51, S281, S351) from the time when it has been determined that the first requirement is satisfied until the time when it has been determined that the second requirement is satisfied. For example, the path (142) can be defined by, whenever an operating position is detected, linking the previous operating position and the current operating position. Alternatively, the path (142) can be defined after detection of a plurality of operating positions. In this way, the path is defined according to the operating positions from the instance when the first requirement is satisfied until the instance when the second requirement is satisfied, which makes it possible to decide a unit of operation in an appropriate manner.

In another aspect, the present example embodiment further comprises a second parameter setting means which sets a second parameter different from the first parameter according to the result of determination by the contact determining means. The game processing means performs a game process based on the first parameter and the second parameter. More specifically, the second parameter setting means (42, S529, S537) sets the second parameter different from the first parameter according to the result of determination by the contact determining means (42, S71, S77, S483, S493, S497, S501). The game processing means (42, S93, S225) performs game processes based on the first parameter and second parameter. As stated above, by allowing the second parameter to be set, it becomes possible to set many parameters by a simple game operation and perform further diversified game processes.

In still another aspect, the present example embodiment further comprises a first parameter correcting means which corrects the first parameter according the result of determination by the contact determining means. The game processing means performs a game process based on the first parameter corrected by the first parameter correcting means. More specifically, the first parameter correcting means (42, S529, S537, S555, S563, S565, S571, S573, S579, S581) corrects the first parameter according to the result of determination by the contact determining means (42, S71, S77, S483, S493, S497, S501). The game processing means (42, S93, S225) performs a game process based on the corrected first parameter. Correcting the first parameter as mentioned above would require an operating skill of the player, which makes a game more interesting.

In one embodiment, the game processing means performs a game process based on the first parameter when the path is in contact with the first area, and does not perform a game process based on the first parameter when the path is not in contact with the first area. More specifically, the game processing means (42, S93, S225) performs a game process based on the first parameter when the path (142) is in contact with the first area (122). However, the game processing means (42, S93, S225) does not perform a game process based on the first parameter when the path (142) is not in contact with the first area (122). For example, it performs a game process different from the game process based on the first parameter. Accordingly, varied game processes can be performed depending on whether or not the path of the player's operation comes into contact with the first area, which requires an operating skill of the player, resulting in enhancement in interesting characteristics of a game.

In another aspect of the present example embodiment, the first area includes a plurality of determination areas, and the game processing means performs varied game processes according to the determination area with which the path has made contact. More specifically, the first area (122) includes the plurality of determination areas. The game processing means (42, S93, S225) performs a game process according to the determination area with which the path (142) has made contact. For example, it performs a different game process for each touched determination area or performs a game process in a different manner of presentation for each touched determination area. As a result, diversified game processes can be performed by a simple operation. Consequently, it is possible to avoid the player from losing interest in the game wherever possible.

In one embodiment, according to a direction of the path, the plurality of determination areas are arranged in predetermined order so as to be orthogonal to that direction. More specifically, the plurality of determination areas are arranged according to the direction of the path (142) in such a manner as to be orthogonal to that direction. For example, the plurality of determination areas may be arranged on a straight line which passes through a representative point (such as a midpoint) and extends in a direction orthogonal to the direction of the path (142). The direction of the path (142) here refers to a direction linking two points on the path or a direction of average between them. The direction linking the two points, assuming that a direction of movement from a time-wise anterior operating position to a time-wise posterior operating position is an operating direction, denotes a direction of movement from one point on the path (142) to another point on the path that exists in a position advanced from the one point in the direction of operation. Typically, the direction of the path (142) is a direction of movement from one time-wise anterior operating position to one time-wise posterior operating position. In addition, the direction may be a direction of movement from a second last operating position to a last operating position, may be a direction of movement from an operating position immediately before contact with the first area (122) to an operating position at the time of the contact, or may be a direction of movement from the operating position at the time of the contact to an operating position at the time immediately after the contact. Moreover, the meaning of the direction of the path (142) is the same as the present invention described later. As stated above, the determination areas are provided along a direction orthogonal to the direction of the path, which makes it possible to determine with which part of the first area with reference to the direction of the path the path has made contact.

In another embodiment, the game processing means performs varied game processes according to the position of the path which has made contact with the first area. More specifically, the game processing means (42, S93, S225) performs varied game processes according to the position of the path (142) which has made contact with the first area (122). For example, the game processing means (42, S93, S225) performs varied game processes according to a distance between the representative point of the first area (122) (such as the midpoint or the boundary point in the first area) and a point at which the path (142) has made contact with the first area (122) (a representative point of a part of the path that exists within the first area). In addition, by determining an intersecting point between the path and a straight line that passes through the representative point (such as the midpoint) of the first area and extends in a direction orthogonal to the direction of the path, or by determining an intersecting point between that straight line and a straight line passing through two points on the path (for example, one point immediately before the contact with the first area and the other point at the time of the contact, or one point at the time of the contact and the other point immediately after the contact), it is possible to perform varied game processes according to the distance between the intersecting point and the representative of the first area. In this manner, a wide variety of game processes can be performed by a simple operation. This makes it possible to prevent the player from becoming tired with the game as much as possible.

In still another aspect of the present example embodiment, the first parameter setting means sets one parameter according to one element of the two-dimensional coordinates and another parameter according to the other element of the two-dimensional coordinates. Incidentally, the two-dimensional coordinates may be orthogonal coordinates or polar coordinates. Alternatively, it is possible to set one parameter according to a differential between one element of the two-dimensional coordinates and one element of the representative point (such as the midpoint) of the first area, and set another parameter according to a differential between the other element of the two-dimensional coordinates and the other element of the representative point (such as the midpoint) of the first area. More specifically, the first parameter setting means (42, S13,

S19, S23, S319, S333, S337, S339) sets one first parameter according to one element of the two-dimensional coordinates and sets another first parameter according to the other element of the two-dimensional coordinates. That is, a first parameter is set according to each element of coordinates such as orthogonal coordinates and polar coordinates. At this time, for example, a reference point (zero point or offset position) for any one of the first parameters is set as a representative point of the first area (122) (the midpoint or a specific point on the boundary). Therefore, by operating at least one point, a parameter is set according to each element of the two-dimensional coordinates of the point, which makes it possible to produce variations in game process by a simple operation.

In one embodiment, the game processing means moves a moving object in the game world. The first parameter setting means sets a first parameter related to a moving distance of the moving object according to one element of the two-dimensional coordinates, and sets a first parameter related to a moving direction of the moving object according to the other element of the two-dimensional coordinates. More specifically, the game processing means (42, S93, S225) moves the moving object (106) in the game world. The first parameter setting means (42, S13, S19, S23, S319, S333, S337, S339) sets a parameter related to the moving distance of the moving object (106) according to one element of the two-dimensional coordinates, and sets a parameter related to the moving direction of the moving object (106) according to the other element of the two-dimensional coordinates. Consequently, it is possible to produce variations in the game processes by a simple operation.

In another embodiment, the game processing means moves a moving object in the game world. The first parameter setting means sets a parameter related to the moving distance of the moving object according to one element of the two-dimensional coordinates, and sets a parameter affecting the degree of curve of the moving path of the moving object according to the other element of the two-dimensional coordinates. More specifically, the game processing means (42, S93, S225) moves the moving object (106) in the game world. The first parameter setting means (42, S13, S19, S23, S319, S333, S337, S339) sets a first parameter related to the moving distance of the moving object (106) according to one element of the two-dimensional coordinates, and sets a first parameter affecting the degree of curve of the moving path of the moving object (106) according to the other element of the two-dimensional coordinates. Here, if the moving object (106) is like a ball, for example, the first parameter affecting the degree of curve of the moving path refers to a spin value of the ball. This also makes it possible to produce variations in game process by a simple operation.

In further another aspect, the present example embodiment further comprises a game parameter storing means which stores game parameters varying with the state of a game. The first parameter setting means changes a corresponding relationship between one element and one first parameter and a corresponding relationship between the other element and another first parameter, based on the game parameters. More specifically, the game parameter storing means (42, 48) stores game parameters varying with the state of a game. In a golf game, for example, the game parameters apply to the kind of a club selected according to the player's operation, the state of current lie of a ball as the moving object (106) (a parameter of type of landform in the current position of the ball), or to the game difficulty level set by the player or automatically. The first parameter setting means (42, S13, S19, S23, S319, S333, S337, S339) changes at least one of a corresponding relationship between one element and one parameter and a corresponding relationship between the other element and another parameter. For example, the moving distance and the moving direction vary according to the kind of a club. As stated above, a corresponding relationship with a first parameter varies with a change in a game parameter, which makes it possible to offer a wide variety of game processes.

In another aspect, the present example embodiment further comprises a direction change accepting means which accepts a change in operating direction on the operating surface and a direction change storing means which, when the direction change accepting means accepts the change in operating direction, stores direction change information indicative of the direction change. The first parameter setting means sets another parameter according to one element and sets one parameter according to the other element, when the direction change storing means stores the direction change information. More specifically, the direction change accepting means (42) accepts a change in operating direction on the operating surface (14, 120). When the direction change accepting means (42) accepts the change in operating direction, the direction change storing means (48) stores the direction information indicative of the direction change. When the direction change storing means (48) stores the direction change information, the first parameter setting means (42, S13, S19, S23, S319, S333, S337, S339) sets another first parameter according to one element and sets one first parameter according to the other element. For example, the operating direction can be changed according to the player's preferences, which makes it possible to improve operability.

In still another aspect of the present example embodiment, the game processing means moves a moving object in the game world. The first parameters include a distance parameter for the moving distance of the moving object and a direction parameter for the moving direction of the moving object. More specifically, the game processing means (42, S93, S225) moves the moving object (106) in the game world. The parameters includes the distance parameter for the moving distance of the moving object (106) and the direction parameter for the moving direction of the moving object (106). This also makes it possible to produce variations in the game process by a simple operation.

In one embodiment, the direction parameter includes a spin value parameter for the spin value of the moving object. More specifically, the direction parameter includes a spin value parameter for the spin value (side-spin value) of the moving object (106) like a ball. Therefore, the moving path of the moving object (106) is changed by its own spin. This makes it possible to produce variations in the path of the moving object like a ball.

In further another aspect of the present example embodiment, the operating position detecting means detects the operating positions from start to end of operation by the user in time sequence. The present invention further comprises a path defining means which, when it is not determined at the end of operation that the path defined on the basis of the operating positions until the end of operation has made contact with the first area, extends the path under a predetermined rule. More specifically, the operating position detecting means (22, 42, S1, S29, S51, S281, S351) detects the operating positions from start to end of operation in time sequence. When it is not determined at the end of the operation that the path (142) decided on the basis of the operating positions until the end of operation has made contact with the first area (122), the path defining means (42, S69, S371) extends the path (122) under a predetermined rule. Under the predetermined rule, the path can be extended in the direction of operation, i.e., in the direction of the path (average direction, instantaneous direction at a certain point, final direction, etc.), for example. Additionally, the path can be extended by only a distance in accordance with a change speed of the path (average change speed, instantaneous change speed, final change speed, etc. Typically, this is based on a distance per unit of time between a plurality of operating positions). That is, it is not necessary to continue the operation up to the first area, which allows the player to perform an operation more easily or perform more diversified operations.

In one embodiment of the present example embodiment, the direction of the extension is decided along the direction of the path. More specifically, under the predetermined rule, the direction of extension is decided along the direction of operation, i.e., the direction of the path. It is therefore possible to extend the path in the direction of the player's slide operation. Thus, after the first requirement is satisfied, the operating path may be drawn with an aim at the first area, which allows the player to perform an operation of taking aim at an object to be hit.

In another embodiment of the present example embodiment, under the predetermined rule, the length of the extension is decided according to a distance per unit of time from one time-wise anterior operating position to one time-wise posterior operating position, out of a plurality of operating positions until the end of operation. More specifically, the length of the extension of the path (142) is decided according to a distance per unit of time from one time-wise anterior operating position to one time-wise posterior operating position, out of the plurality of operating positions until the end of operation. Consequently, it is possible to extend the path per unit of time by a distance between the operating position at the end of operation and the immediately preceding operating position, or extend the path by a distance resulting from multiplication of the former distance by a predetermined ratio, for example. As described above, the length of the extension is decided according to a moving distance per unit of time of a slide operation. Whether the operating path comes into contact with the first area depends on how quickly or slowly the path is drawn, which makes a game more attractive.

In another aspect of the present example embodiment, the coordinate system of the two-dimensional coordinates is set on the basis of the position of the first area on the operating surface. The first parameter setting means sets the first parameter to a larger value as the operating position related to the setting of the first parameter is more distant from the position of the first area. More specifically, the coordinate system of the two-dimensional coordinates is set on the basis of the position of a representative point of the first area (122) on the operating surface (14, 120). The first parameter setting means (42, S13, S19, S23, S319, S333, S337, S339) sets the first parameter to a larger value as the operating position related to the setting of the first parameter is more distant from the representative point of the first area (122). For example, the moving distance of the moving object (106) is made longer depending on the distance between the operating position and the first area (122). As stated above, the value of the first parameter is set on the basis of the distance between the operating position and the first area, this allows the player to set the value of the parameter by intuition. Also, the larger the first parameter, the longer the distance between the operating position and the first area becomes. Thus, in setting the first parameter with advantage, it is harder to bring the path into contact with the first area, which increases the entertaining characteristics of a game.

Additionally, when the first parameter setting means sets two parameters: one according to one element of the operating position and the other according to the other element, the one parameter may be set so as to become larger as the distance along the direction of the one element between the operating position and the first area is longer, and the other parameter may be set so as to become larger as the distance along the direction of the other element between the operating position and the first area is longer. Also, by using the orthogonal coordinate system in this case, the one parameter and the other parameter are set to larger values in a comprehensive manner as the distance between the operating position and the first area becomes longer.

In still another aspect of the present example embodiment, a second area is set on the operating surface in such a manner as to be outside the first area, adjacent to the first area, or contain a part of the first area. The first requirement determining means determines whether or not the operating position detected by the operating position detecting means exists within the second area and satisfies the first requirement. More specifically, the second area ((3)) is provided on the operating surface (14, 120) in such a manner as to be outside the first area (122), adjacent to (including both inscription and circumscription) the first area (122) or contain a part of the first area (122). For example, it is desirable that the second area ((3)) is set to a larger size than that of the first area (122). The first requirement determining means (42, S3, S283) determines whether or not the operating position detected by the operating position detecting means (22, 42, S1, S29, S51, S281, S351) exists within the second area ((3)) and satisfies the first requirement. In addition, it is preferable that the second area ((3)) is a relatively larger area than the first area (122). That is, the first parameter is set by making an operation within the second area, and then a game process is performed in such a manner as to draw an operating path with an aim at the first area existing outside the second area, etc., which allow a series of game operations to be natural and easy to understand.

In one embodiment of the present example embodiment, a third area is set on the operating surface so as to be adjacent to the second area. The first area is set at a center of a boundary portion between the second area and the third area. The second requirement determining means determines whether or not the path on the operating surface which is defined on the basis of the operating positions detected sequentially from the detection of the operating position related to the setting of the first parameter is in contact with the third area. More specifically, the third area ((4)) is set on the operating surface (14, 120) so as to be adjacent to the second area ((3)). The first area (122) is set at the center of the boundary portion between the second area ((3)) and the third area ((4)). The second requirement determining means (42, S53, S71, S77, S353, S483, S493, S497, S501) determines whether or not the path (142) and the third area ((4)) are in contact with each other on the operating surface (14, 120) based on the operating positions detected sequentially from the detection of the operating position related to the setting of the first parameter.

For example, the second area ((3)) and the third area ((4)) make contact with each other on one line or in such a manner as to fade out on two lines at a middle portion between them. In the case where they make contact on one line, the first area (122) is set in the middle of the line (typically, it is set in such a manner as to contain the midpoint of the line). In the case of the contact on two lines, the first area (122) is set on the fading-out portion. Besides, in the former case, the second area ((3)) and the third area ((4)) overlap with the first area (122). In the latter case, the second area ((3)) and/or the third area ((4)) do not overlap with the first area (122). Therefore, it is possible to make a determination on contact between the path and the first area in an appropriate and efficient manner.

In further another aspect, the present example embodiment further comprises a game parameter storing means which stores game parameters varying with the state of a game and a first area changing means which changes at least one of the position and the size of the first area according to the game parameters. More specifically, the game parameter storing means (42, 48) stores game parameters (indicative of the kind of a club, the lie state, the difficulty level of a game, etc.). The first area changing means (42, S261, S267) changes (sets) at least one of the position and the size of the first area (122) according to the game parameters. For example, the position of the first area (122) is moved in a direction perpendicular to the direction of a slide operation according to the lie state, and the first area (122) is made larger or smaller according to the game difficulty level (including the difficulty level by the kind of a club). In addition, the game difficulty level may be arbitrarily changed by the user or may be automatically set according to the situation. As stated above, it is possible to add diversity and difficulty (easiness) to game operations according to the game state, which makes a game more enjoyable.

In another embodiment, the first parameter setting means decides the first parameter according to the two-dimensional coordinates of the operating position with reference to the position of the first area. When the first area changing means has changed the position of the first area, the first parameter setting means decides the first parameter according to the two-dimensional coordinates of the operating position with reference to the changed position of the first area. More specifically, the first parameter setting means (42, S13, S19, S23, S319, S333, S337, S339) decides the first parameter according to the two-dimensional coordinates of the operating position with reference to the position of the first area (122). Accordingly, when the first area changing means (42, S261, S267) has changed the position of the first area (122), the first parameter setting means (42, S13, S19, S23, S319, S333, S337, S339) decides the first parameter according to the two-dimensional coordinates of the operating position with reference to the changed position of the first area (122). As described above, the reference for decision of the first parameter is altered according to a change in the position of the first area, and thus it is possible to put restrictions on the operating position at the start of operation and the following slide operations, thereby making a game more interesting.

In still another embodiment, the game processing means moves a moving object in the game world. The game parameters include a landform parameter for the current position of the moving object. The first area changing means changes at least one of the position and the size of the first area according to the landform parameter. More specifically, the game processing means (42, S93, S225) moves the moving object (106) in the game world. The game parameters include the landform parameter for the current position of the moving object (106). The first area changing means (42, S261, S267) changes the position of the first area (122) according to the landform parameter. The landform parameter is a parameter for height or inclination of a landform by which at least one of the position and the size of the first area (122) is changed. As stated above, the position of the first area is changed according to the landform parameter, which means that the position of the first area can be changed according to the game state, making it possible to provide more realistic game operations.

In one aspect, the present example embodiment further comprises a landform data storing means which stores landform data for defining a landform of the game world and an inclination state detecting means which detects the state of an inclination in a direction orthogonal to a reference movement direction of the moving object in the current position, by reference to the landform data. The first area changing means changes the position of the first area according to the inclination state detected by the inclination state detecting means. The first parameter setting means sets a distance parameter related to the moving distance of the moving object according to one element of the two-dimensional coordinates, and sets a degree-of-curve parameter affecting the degree of curve of the moving path of the moving object according to the other element of the two-dimensional coordinates. The game processing means moves the moving object based on at least the distance parameter, the reference moving direction and the degree-of-curve parameter. More specifically, the game apparatus (10) further comprises the landform game storing means (48) and the inclination state detecting means (42, S265). The landform data storing means (48) stores landform data for defining the landform of the game world (height or inclination of the ground). The inclination state detecting means (42, S265) detects (refers to or calculates) the state of an inclination in a direction orthogonal to the reference movement direction of the moving object (106) in the current position, by reference to the landform data. For example, if the landform data is data on the state of an inclination of the ground, this data is referred to as it is. If the landform data is data on the height of the ground, the state of the inclination is calculated. The first area changing means (42, S261, S267) changes the position of the first area (122) according to the inclination state detected by the inclination state detecting means (42, S265). Also, the first parameter setting means (42, S13, S19, S23, S319, S333, S337, S339) sets the distance parameter related to the moving distance of the moving object (106) according to one element of the two-dimensional coordinates, and sets the degree-of-curve parameter affecting the degree of curve of the moving path of the moving object (106) according to the other element of the two-dimensional coordinates. Additionally, the game processing means (42, S93, S225) moves the moving object (106) based on at least the distance parameter, the reference movement direction and the degree-of-curve parameter. For example, it moves the moving object (106) in the reference movement direction, and then changes the movement direction of the moving object (106) according to the degree-of-curve parameter. This makes it possible to produce variations in the path of the moving object according to the landform in the current position of the moving object, thereby avoiding a game from being monotonous.

In one embodiment, the first area changing means changes the position of the first area in an axial direction of the other element as the inclination detected by the inclination state detecting means is steeper. The game processing means sets the degree-of-curve parameter to a larger value as a length of the other element between the position of the first area and the two-dimensional coordinates becomes longer. More specifically, the first area changing means (42, S261, S267) changes the position of the first area (122) in the axial direction of the other element of the two-dimensional coordinates as the inclination detected by the inclination state detecting means (42, S265) becomes steeper. The game processing means (42, S93, S225) sets the degree-of-curve parameter to a larger value as the length of the other element along the axial direction between the first area (122) and the two-dimensional coordinates becomes longer. As stated above, the position of the first area is changed according to the amount of an inclination in the direction of the element by which the degree-of-curve parameter is determined. Therefore, in hitting a shot at an inclined position in a golf game, for example, it is possible to reproduce at the game a realistic situation in which it is difficult to make the ball curve (draw or fade).

In another embodiment, further comprises a reference movement direction setting means which sets the reference movement direction in response to the user's operation. More specifically, the reference movement direction setting means (42, S235) sets (changes) the movement direction of the moving object (106) according to a setting made by the user. As mentioned above, the reference movement direction of the moving object can be set or changed, which makes it possible to detect the inclination direction according to the setting or change of the reference movement direction and change the position of the first area (122).

In another aspect, the present example embodiment further comprises a third requirement determining means which determines whether or not, after it has been determined that the first requirement is satisfied, a result of the detection by the operating position detecting means satisfies a third requirement different from the first requirement, and a canceling means which, when the third requirement determining means has determined that the third requirement is satisfied, cancels the determination to the effect that the first determination is satisfied. More specifically, the third requirement determining means (42, S41, S61, S455, S457, S461) determines whether or not, after it has been determined that the first requirement is satisfied, the result of the detection by the operating position detecting means (22, 42, S1, S29, S51, S281, S351) satisfies the third requirement different from the first requirement. When it has been determined that the third requirement is satisfied, the canceling means (42, S63, S463) cancels the determination to the effect that the first determination is satisfied. As stated above, in the case where the third requirement is satisfied, the determination to the effect that the first requirement is satisfied is canceled, which makes it possible to restart the operation from the beginning.

In one embodiment, included in the third requirement is that the operating position detected by the operating position detecting means shall be in a resting state, after it has been determined that the first requirement is satisfied. More specifically, included in the third requirement is that the operating position detected by the operating position detecting means (22, 42, S1, S29, S51, S281, S351) shall be in a resting state after it has been determined that the first requirement is satisfied. For example, if the same operating position or neighboring operating positions are output for a certain period of time or a certain number of times, it is determined that the third requirement is satisfied. For example, in such a case where it is unable to decide whether or not to definitely establish the first parameter set by a touch-on operation, it is possible to cancel the determination to the effect that the first requirement is satisfied.

In another embodiment, included in the third requirement is that, after it has been determined that the first requirement is satisfied, a change in the operating position detected by the operating position detecting means shall be along a predetermined direction. More specifically, included in the third requirement is that, after it has been determined that the first requirement is satisfied, a change in the operating position detected by the operating position detecting means (22, 42, S1, S29, S51, S281, S351) shall be along a predetermined direction. Accordingly, it is possible to cancel the first parameter set at the time of touch-on by performing a slide operation in a predetermined direction.

In still another embodiment, the predetermined direction is a direction that moves away from the first area. More specifically, when a slide operation is performed in the direction that moves away from the first area, the determination to the effect that the first requirement is satisfied is canceled. That is, it is possible to easily cancel the determination to the effect that the first requirement is satisfied just by performing a slide operation in a direction opposite to the first area.

In still another aspect, the present example embodiment further comprises a time measuring means which, after the first requirement determining means has determined that the first requirement is satisfied, measures a time until the contact is determined by the contact determining means. The game processing means performs varied game processes depending on whether or not the time measured by the time measuring means is equal to or more than a predetermined time. More specifically, after the first requirement determining means (42, S3, S283) has determined that the first requirement is satisfied, the time measuring means (42, S295, S429) measures a time until contact is determined by the contact determining means (42, S71, S77, S483, S493, S497, S501). The game processing means (42, S93, S225) performs varied game processes depending on whether or not the time measured by the time measuring means is equal to or more than a predetermined time. For example, if the time measured by the time measuring means (42, S295, S429) is longer than the predetermined time, the game processing means (42, S93, S225) corrects the first parameter or does not perform a game process according to the first parameter. Thus, after the first requirement is satisfied and the operating position related to the setting of the first parameter is decided, it is required to draw the path toward the first area with some degree of haste, which makes a game more interesting.

In further another aspect, the present example embodiment further comprises a distance determining means which determines whether or not a distance per unit of time between one time-wise anterior operating position and one time-wise posterior operating position, which are detected sequentially from the detection of the operating position related to the setting of the first parameter, has become equal to or less than a predetermined value. The game processing means performs varied game processes according to a result of determination by the distance determining means. More specifically, the distance determining means (42, S39, S59, S365) determines whether or not a distance per unit of time between one time-wise anterior operating position and one time-wise posterior operating position, which are detected sequentially from the detection of the operating position related to the setting of the first parameter, has become equal to or less than a predetermined value. The game processing means (42, S93, S225) performs varied game processes according to the result of determination by the distance determining means (42, S39, S59, S365). For example, when the distance determining means (42, S39, S59, S365) has determined that a distance per unit of time between one time-wise anterior operating position and one time-wise posterior operating position has become equal to or less than the predetermined value, the game processing means (42, S93, S225) corrects the first parameter or does not perform a game process according to the first parameter. Typically, operating positions are sampled at specific time intervals, and then the distance determining means (42, S39, S59, S365) determines whether or not a distance per unit of time between the operating positions sequentially sampled has become equal to or less than the predetermined value. That is, after the first requirement is satisfied and the operating position related to the setting of the first parameter is decided, it is subsequently required to draw the path toward the first area with some degree of haste, which makes a game more entertaining.

Another game apparatus according to the present example embodiment comprises an operating position detecting means, a first requirement determining means, a parameter setting means, a contact determining means and a game processing means. The operating position detecting means detects a position of operation by the user on an operating surface. The first requirement determining means determines whether or not a result of detection by the operating position detecting means satisfies the first requirement. When the first requirement determining means has determined that the first requirement is satisfied, the parameter setting means sets at least one parameter according to the two-dimensional coordinates of the operating position detected by the operating position detecting means. The contact determining means determines with which of a plurality of areas set on the operating surface a path on the operating surface decided on the basis of operating positions sequentially from the detection of the operating position related to the setting of he parameter makes contact. The game processing means performs varied game processes according to the contacted area determined by the contact determining means, based on the parameter set by the parameter setting means.

As in the case of the above described game apparatus, this game apparatus of the present example embodiment also performs game processes dependent on the player's operation, which enhances the interesting characteristic of a game.

A storage medium stores a game program according to another example embodiment which is executed by a game apparatus. The game program causes a processor of the game apparatus to perform a parameter setting step of setting at least one parameter according to the two-dimensional coordinates of an operating position where a predetermined requirement is satisfied and a game processing step of performing varied game processes depending on whether or not a path decided on the basis of a slide operation subsequent to an input operation of the operating position passes through at least a predetermined area, using the parameter set in the parameter setting step.

As in the case of the above described game apparatus, the recording medium of the present example embodiment allows a game to be more interesting.

A recording medium stores another game program according to another example embodiment which is executed by a game apparatus. The game program causes a processor of the game apparatus to perform an operating position detecting step, a first requirement determining step, a parameter setting step, a contact determining step, and a game processing step. In the operating position detecting step, the position of operation by the user on the operating surface is detected. In the first requirement determining step, it is determined whether or not a result of determination in the operating position detecting step satisfies a first requirement. In the parameter setting step, when it has been determined in the first requirement determining step that the first requirement is satisfied, at least one parameter is set according to the two-dimensional coordinates of the operating position detected in the operating position detecting step. In the contact determining step, it is determined whether or not a path on the operating surface decided on the basis of operating positions detected sequentially from the detection of the operating position related to the setting of the first parameter makes contact with the first area provided on the operating surface. In the game processing step, varied game processes according to a result of determination in the contact determining step are performed, on the basis of the parameter set in the parameter setting step.

As in the case of the above described another game apparatus, this example embodiment also performs game processes dependent on the player's operations, which makes a game more interesting.

A storage medium stores a game program according to another example embodiment which is executed by a game apparatus. The game program causes a processor of the game apparatus to perform an operating position detecting step, a first requirement determining step, a parameter setting step, a first requirement determining step, a contact determining step, and a game processing step. In the operating position detecting step, the position of operation by the user on the operating surface is detected. In the first requirement determining step, it is determined whether or not a result of determination in the operating position detecting step satisfies the first requirement. In the parameter setting step, when it has been determined in the first requirement determining step that the first requirement is satisfied, at least one parameter is set according to the two-dimensional coordinates of the operating position detected in the operating position detecting step. In the contact determining step, it is determined with which of a plurality of areas set on the operating surface a path on the operating surface decided on the basis of operating positions detected sequentially from the detection of the operating position related to the setting of the parameter makes contact. In the game processing step, varied game processes according to the contacted area determined in the contact determining step are performed on the basis of the parameter in the parameter setting step.

As in the case of the above mentioned still another game apparatus of the other example embodiment, this example embodiment also performs game processes dependent on the player's operations, which allows a game to be more attractive.

A game control method according to still another example embodiment includes the following steps of: (a) setting at least one parameter according to the two-dimensional coordinates of an operating position where a predetermined requirement is satisfied; and (b) performing varied game processes depending on whether or not a path decided on the basis of a slide operation subsequent to an input operation of the operating position passes through at least a predetermined area, using the parameter set in the step (a).

As in the case of the above mentioned game apparatus, this example embodiment also makes a game more interesting.

Another game control method according to another example embodiment includes the following steps of: (a) detecting a position of operation by a user on an operating surface; (b) determining a result of determination in the step (a) satisfies a first requirement; (c) setting at least one parameter according to the two-dimensional coordinates of the operating position detected in the step (a) when it has been determined in the step (b) that the first requirement is satisfied; (d) determining whether or not a path on the operating surface decided on the basis of operating positions detected sequentially from the detection of the operating position related to the setting of the first parameter makes contact with the first area set on the operating surface; and (e) performing varied game processes depending on a result of determination in the step (d), based on the parameter set in the step (c).

As in the case of the above mentioned another game apparatus, this example embodiment also performs game processes dependent on the player's operations, which makes a game more attractive.

Still another game control method according to still another example embodiment includes the following steps of: (a) detecting a position of operation by a user on an operating surface; (b) determining a result of determination in the step (a) satisfies a first requirement; (c) setting at least one parameter according to the two-dimensional coordinates of the operating position detected in the step (a) when it has been determined in the step (b) that the first requirement is satisfied; (d) determining with which of a plurality of areas provided on the operation surface a path on the operating surface decided on the basis of operating positions detected sequentially from the detection of the operating position related to the setting of the parameter makes contact; and (e) performing varied game processes according to the contacted area determined in the step (d), based on the parameter set in the step (c).

As in the case of the above mentioned game apparatus of the other example embodiment, the present example embodiment also allows game processes dependent on the player's operations to be performed, which makes a game more pleasurable to play.

The above described features, aspects and advantages of the present example embodiments will become more apparent from the following detailed description of the present example embodiments when taken in conjunction with the accompanying drawings.

BRIEF DESCRIPTION OF THE DRAWINGS

FIG. 5 is an illustrative view showing a state in which a shot power line and a shot power value are presented in the game screen displayed on the second LCD provided in the game apparatus shown in FIG. 1;

FIG. 6 is an illustrative view showing a state in which a display position of an impact line is being changed in the game screen displayed on the second LCD provided in the game apparatus shown in FIG. 1;

FIG. 10 is an illustrative view for describing the degree of curve of a ball according to touch-on coordinates with respect to the game screen displayed on the second LCD provided in the game apparatus shown in FIG. 1;

FIG. 11 is an illustrative view showing another example of game screen displayed on the second LCD provided in the game apparatus shown in FIG. 1;

FIG. 12 is an illustrative view showing an example of a slide operation on a touch panel provided in the game apparatus shown in FIG. 1;

FIG. 15 is an illustrative view describing a impact determining method using the impact determination area shown in FIG. 14;

FIG. 16 is an illustrative view for describing changes in the size of the ball by a game difficulty level in the game screen displayed on the second LCD provided in the game apparatus shown in FIG. 1;

FIG. 17 is an illustrative view showing another example of impact determination area;

FIG. 30 is an illustrative view showing an example of data storage area of the RAM shown in FIG. 29;

DETAILED DESCRIPTION OF THE PREFERRED EMBODIMENTS

First Embodiment

Figure 1:
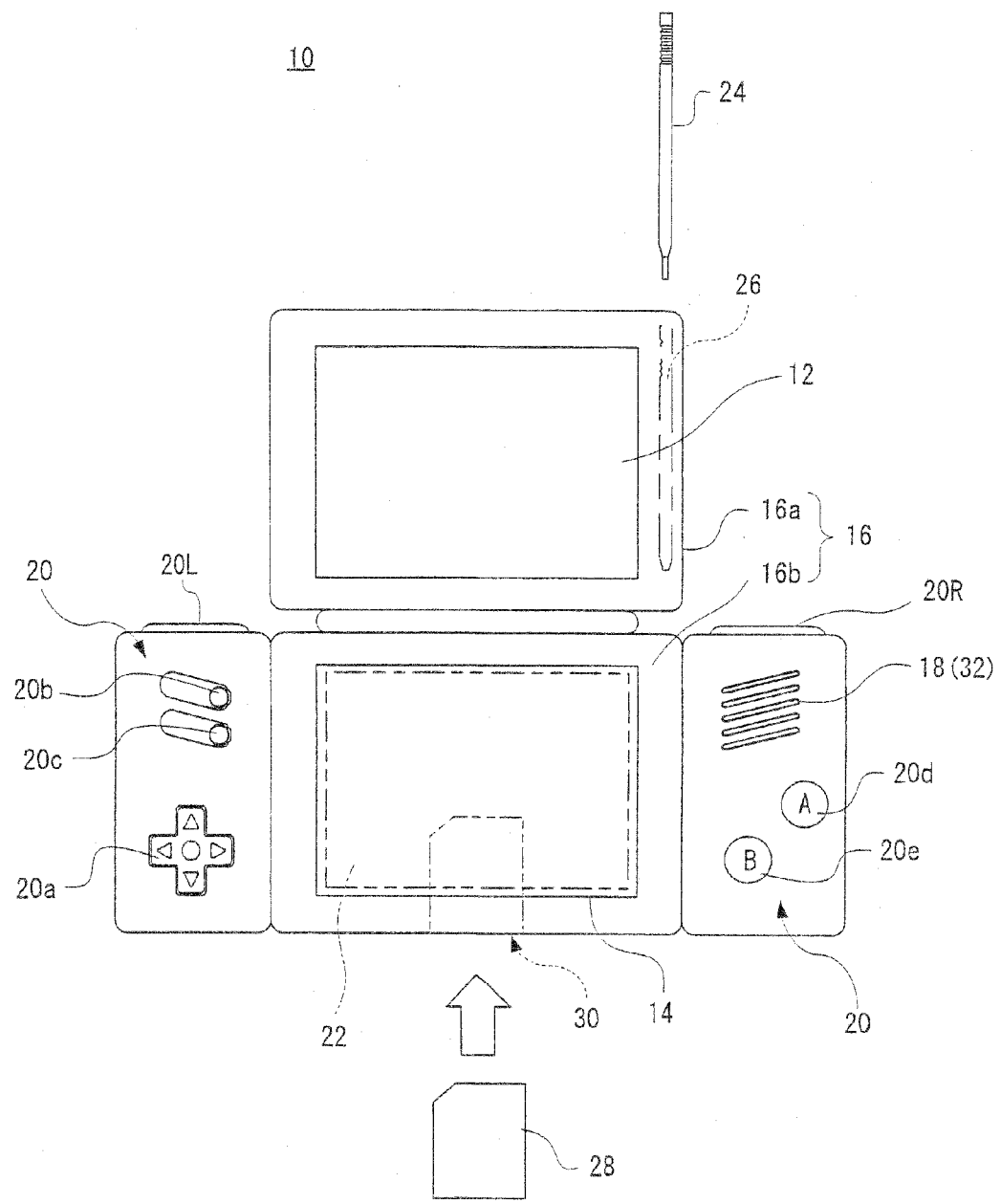
FIG. 1 is an illustrative view showing one example of game apparatus of the present example embodiment.

Referring to FIG. 1, a game apparatus 10 of one embodiment includes a first liquid crystal display (LCD) 12 and a second LCD 14. The LCD 12 and the LCD 14 are provided on a housing 16 so as to be arranged in a predetermined position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display and a plasma display may be used in place of the LCD. Also, a CRT display may be utilized for game consoles, arcade video game machines, etc.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of operating position of the stick 24, etc. and outputs coordinate data corresponding to the detected coordinates.

In the first embodiment, a resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). However, detection accuracy of the detection surface of the touch panel 22 may be lower than the resolution of the display surface of the LCD 14, or higher than it. Additionally, the following description is provided on the assumption that, in the detected coordinates of the touch panel 22, a point of origin (0, 0) is on an upper left corner, a right horizontal direction is an X-axis normal direction and a downward vertical direction is a Y-axis normal direction (the same applies to the coordinate system of the LCD 14 (12)). Also, the following description is based on the premise that a three-dimensional game space (golf course) has X and Y coordinates on the horizontal plane and a Z axis in a vertical direction.

It is possible to display different game images (game screens) on the LCD 12 and the LCD 14. This allows the player to point at (specify) or make active (move) character images displayed on the screen of the LCD 14, such as player characters, enemy characters, item characters, text information and icons, or select a command, by operating the touch panel 22 with the stick 24, etc. Besides, this also makes it possible to change an orientation of a virtual camera (viewpoint) provided in the three-dimensional game space or scroll through a game screen (the screen is displayed in a state of being gradually moved).

As stated above, the game apparatus 10 has the LCD 12 and the LCD 14 as a display portion of two screens, and by providing the touch panel 22 on an upper surface of any one of them (LCD 14 in the first embodiment), the game apparatus 10 has the two screens (LCD 12, 14) and the two operating portions (20, 22).

Additionally, in the first embodiment, the stick 24 can be inserted into a housing portion (housing slot) 26 provided in proximity to a side surface (right side surface) of the upper housing 16*a*, for example, and taken out therefrom as necessary. It is noted that in a case of preparing no stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16*b*. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound hole 18 inside the lower housing 16*b*.

Furthermore although omitted in FIG. 1, for example, a battery accommodating box is provided on a rear surface of the lower housing 16*b*, and a power switch, a volume switch, an external expansion connector, an earphone jack, etc. are provided on a bottom surface of the lower housing 16*b*.

Figure 2:
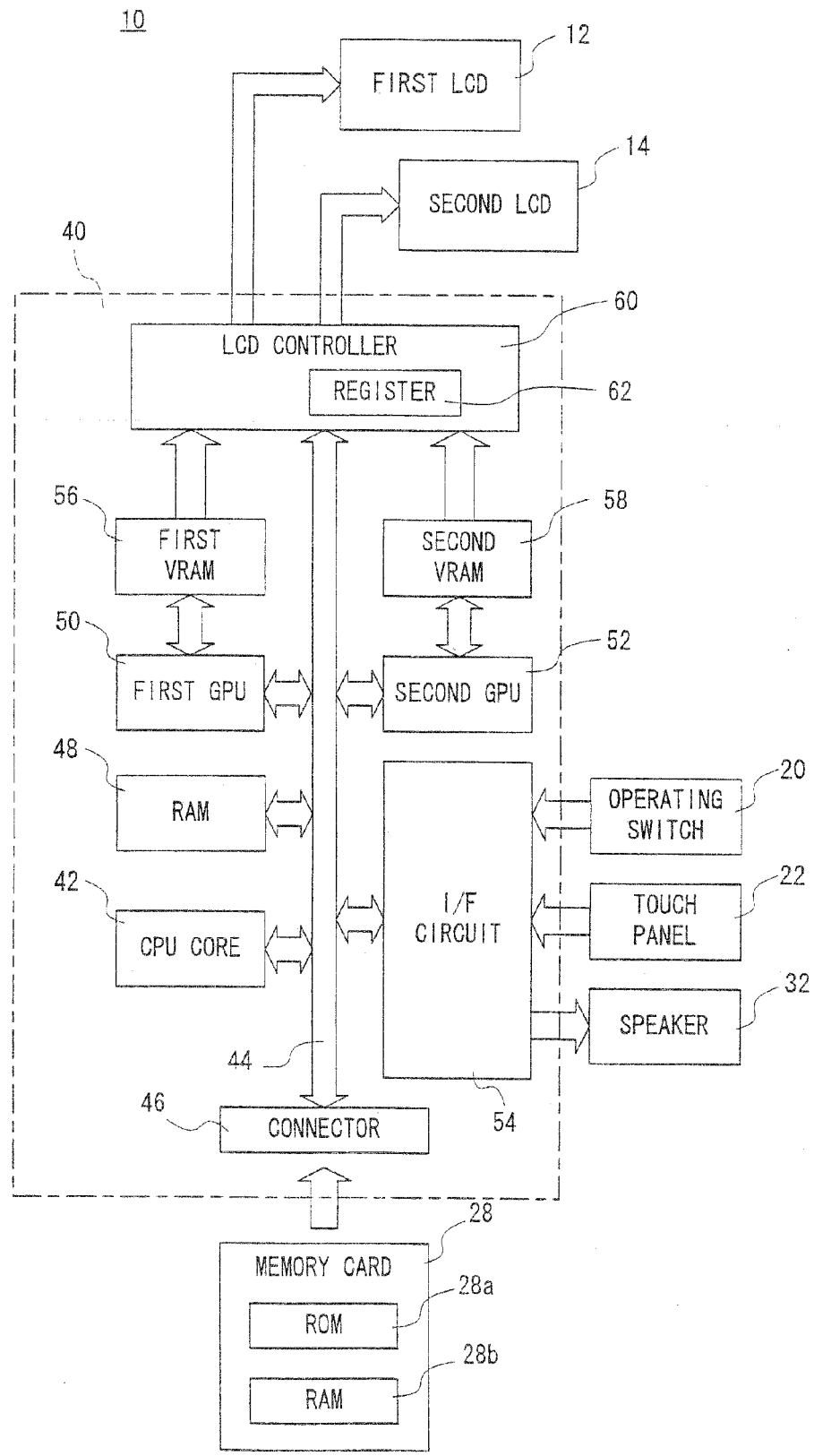
FIG. 2 is a block diagram showing an electric structure of the game apparatus shown in FIG. 1.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 gains access to the ROM 28*a* and the RAM 28*b* as described above.

The ROM 28*a* stores in advance a game program for a virtual game (golf game in this embodiment) to be executed by the game apparatus 10, image (character image, background image, item image, icon (button) image, message image, etc.) data, data of the sound (music) necessary for the game (sound data), etc. The RAM (backup RAM) 28*b* stores (saves) proceeding data and result data of the game.

The RAM 48 is utilized as a buffer memory or a working memory. That is, the CPU core 42 loads the game program, the image data, the sound data, etc. stored in the ROM 28*a* of the memory card 28 into the RAM 48, and executes the loaded game program. The CPU core 42 executes a game process while storing in the RAM 48 data (game data and flag data) temporarily generated in correspondence with a progress of the game.

It is noted that such the game program, the image data, the sound data, etc. are loaded from the ROM 28*a* entirely at a time, or partially and sequentially so as to be stored (loaded) into the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. However, the CPU core 42 provides each of the GPU 50 and the GPU 52 with an image generating program (included in the game program) required for generation of the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. Also, the CPU core 42 writes the image data required for graphics drawing into the first VRAM 56 and the second VRAM 58 via the GPU 50 and the GPU 52. The GPU 50 accesses the VRAM 56 to generate the game image data for graphics drawing, and the GPU 52 accesses the VRAM 58 to generate the game image data for graphics drawing.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. In a case that the data value of the register 62 is "0", the LCD controller 60 outputs the game image data generated by the GPU 50 to the LCD 12, and outputs the game image data generated by the GPU 52 to the LCD 14. Furthermore, in a case that the data value of the register 62 is "1", the LCD controller 60 outputs the game image data generated by the GPU 50 to the LCD 14, and outputs the game image data generated by the GPU 52 to the LCD 12.

Besides, the LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, the coordinates position data from the touch panel 22 is input to the CPU core 42 via the I/F circuit 54. In addition, the CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

Figure 3:
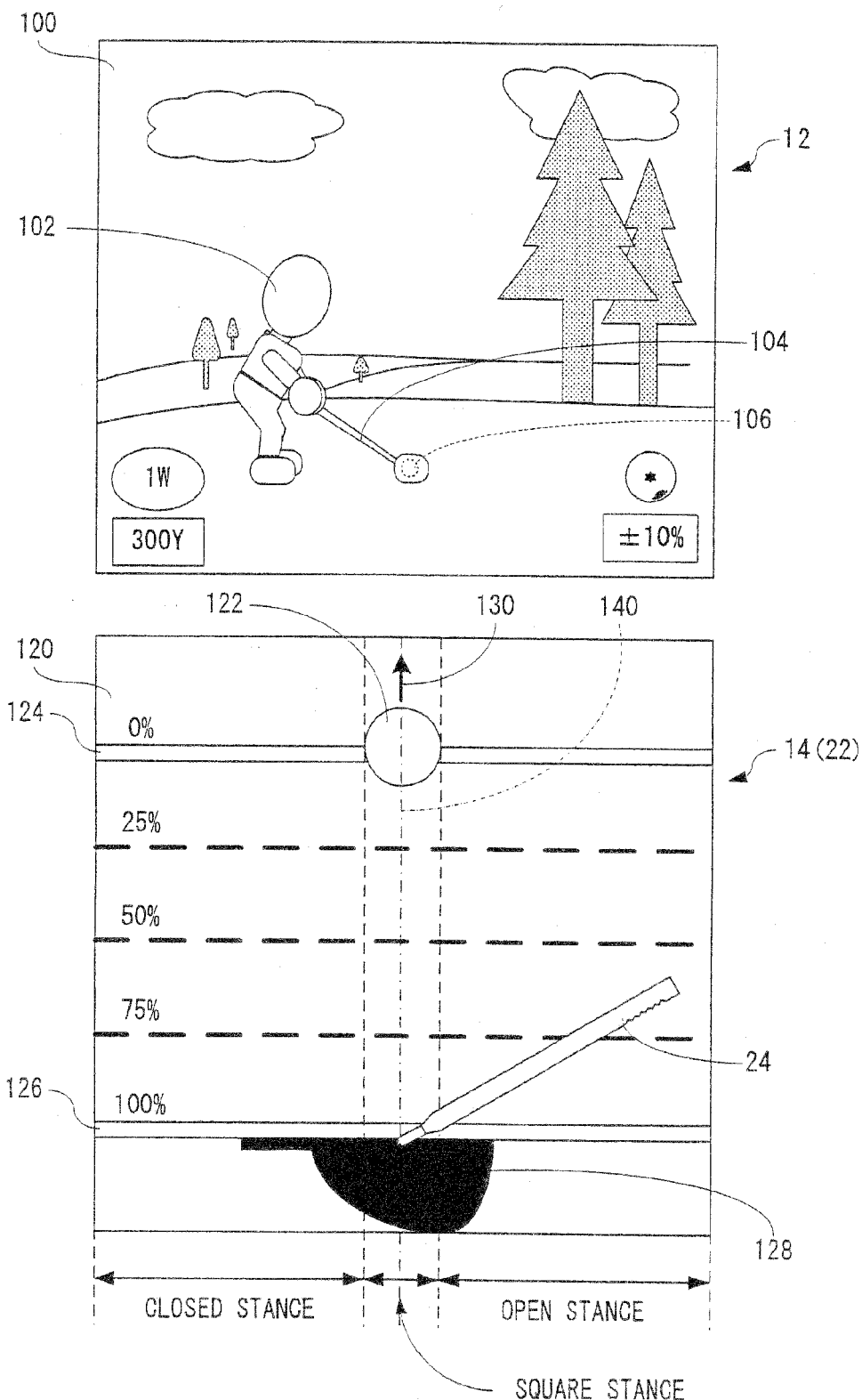
FIG. 3 is an illustrative view showing an example of game screen displayed on a first LCD and a second LCD provided in the game apparatus shown in FIG. 1.

FIG. 3 is an illustrative view showing examples of a game screen 100 and a game screen 120 displayed on the LCD 12 and the LCD 14 of the game apparatus 10 of the first embodiment. Referring to FIG. 3, the game screen 100 displayed on the LCD 12 shows a player character 102 at an approximately center and shows a part of a golf course as a background. More specifically, a virtual camera (not illustrated) is provided behind the player character 102, the player character and the one part of the golf course as a three-dimensional game space are photographed, and a photographed image is displayed as the game screen 100. Also, the game screen 100 shows a state where the player character 102 is in a stance of hitting (addressing) a golf ball (hereinafter referred to as just "ball") 106. The game screen 100 is changed in response to the player's operation using the game screen 120 described below. Mainly, the game screen 100 displays an animation in which the player character 102 swings a golf club (hereinafter referred to as just "club") 104 and hits the ball 106, and then the ball 106 makes a move (flies, rolls, cups in, etc.), and moves the virtual camera following the movement of the ball 106 and displays an image of the ball 106 and the golf course photographed by the virtual camera.

Additionally, the game screen 100 displays in a numerical manner, etc. the kind of the club 104 selected by the player, a carry of a drive hit by the player character 102 using the club 104, a hitting position of the ball 106, and influences of the ground (lie) on a carry. However, the information to be displayed are not limited to the above mentioned items, and a reduced image indicative of the entire hole, the direction of the wind, weather conditions, etc may be also displayed. Moreover, these items are not necessarily required to be displayed in the game screen 100 and may be displayed in the game screen 120 described later. Furthermore, they may be selectively displayed in the game screen 100 or the game screen 120, as required.

The game screen 120 is a screen for the player to perform an operation by which the player character 102 hits (shoots) the ball 106. The game screen 120 displays in an upper portion thereof a ball (hereinafter referred to as "target ball" for convenience of description) 122 different from the ball 106. More specifically, the target ball 122 is located on an impact line 124, and, in the example shown in FIG. 3, is displayed in the middle of the impact line 124. The target ball 122 is a target (predetermined area) for letting the ball pass or hitting the ball by a slide operation. In addition, the game screen 120 displays a full-shot line 126 which indicates a maximum value (100%) of power of the player character 102 to hit the ball 106 (hitting force). Moreover, the game screen 120 displays an image of a club head 128 at the position where touch-on is performed by the stick 24. Furthermore, displayed above the target ball 122 is an indicative image 130 that indicates the manner in which the ball 106 flies, that is, the line of the ball (straight, fade or draw), in the game screen 100.

In the first embodiment, as stated above, the player performs a touch input to the game screen 120 (the touch panel 22), which causes the player character 102 to hit the ball 106. In this embodiment, the game screen 120 for performing a hitting operation is displayed on the entire screen of the LCD 14. Alternatively, the game screen 120 may be displayed on a part of the LCD 14. Display examples and touch input examples of the game screen 120 are described below in detail with use of the drawings.

Figure 4:
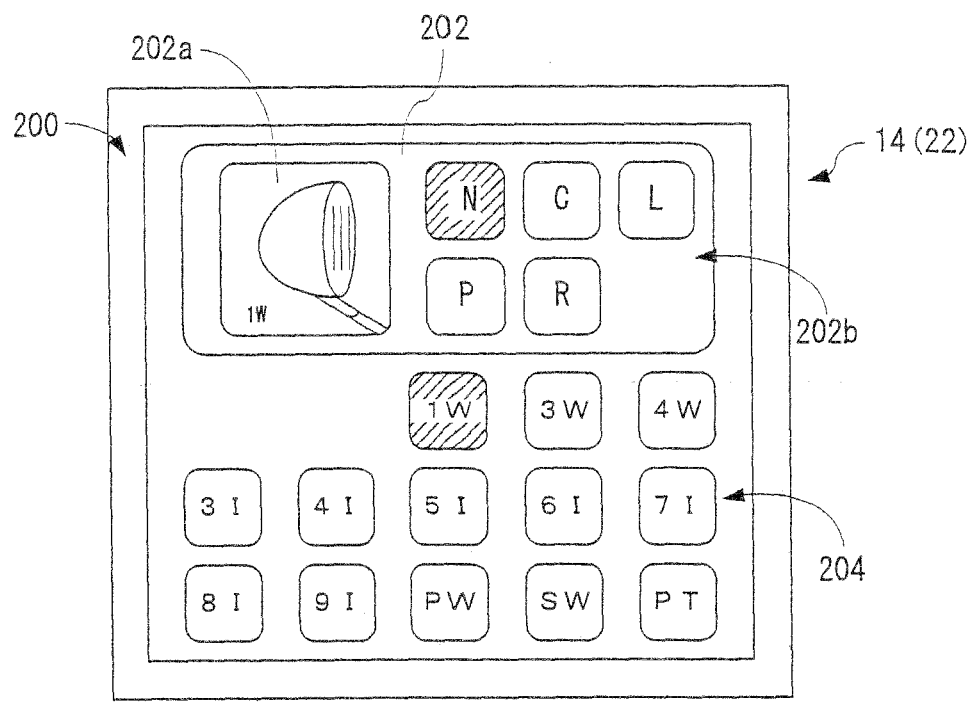
FIG. 4 is an illustrative view showing an example of menu screen displayed on the second LCD provided in the game apparatus shown in FIG. 1.

Firstly, the player can activate a menu screen 200 as shown in FIG. 4 on the LCD 14 to change (set) the kind of the club 104 to be used by the player character 102 and the type of a shot (stroke), before performing an operation of making the player character 102 hit the ball 106 (hitting operation). In the first embodiment, until the player character 102 hits the ball 106, the appropriate club 104 is automatically selected according to the state of the current position of the ball 106 (the state of the lie) and the distance from the current position to the pin. This allows the club 104 to be changed on the basis of the player's strategies, etc. Also, in the first embodiment, until the player character 102 hits the ball 106, the type of a shot (hereinafter referred to as "shot type") is set in advance at "normal shot" regardless of the kind of the selected club 104. This can be also changed according to the player's strategies, etc.

The menu screen 200 displays the kind of the selected club 104, and includes an upper display portion 202 for selecting and displaying the shot types (normal shot (N), chip shot (C), lob shot (L), pitch shot (P), and pitch-and-run shot (R)) and a button display portion 204 for selecting the kind of the club 104. Also, the upper display portion 202 includes a first display portion 202a for displaying the kind of the selected club 104 and a second display portion 202b for displaying the button for selecting the shot type. For example, the player can select the desired kind of the club 104 and the desired shot type by performing a touch input (touch operation).

FIG. 4 shows a state in which a driver (number 1 wood club (1W)) is selected for the kind of the club 104 and a normal shot (N) is selected for the shot type, with the insides of the respective buttons shaded with slant lines. Actually, the selected state is expressed in reversed colors, different brightness, etc.

In addition, the menu screen 200 is displayed on the LCD 14 by the player to perform a touch operation on a predetermined icon or button. Alternatively, it may be displayed by operating the switch 20 including the select switch 20c.

As described above, after the kind of the club 104 and the shot type are selected (changed), a shot direction (launch reference direction; the direction in which the club 104 hits straight the ball 106 and then the ball 106 flies straight) is set. The shot direction set here is a direction on the horizontal plane, is set as vector data in the XY plane of a three-dimensional virtual space, and is automatically set along with the direction in which the ball 106 moves from the current position toward the pin (cup). The player can change the shot direction by operating the cross switch 20a. More specifically, by operating a left instruction portion of the cross switch 20a, the shot direction rotates around the ball 106 counterclockwise. By operating a right instruction portion of the cross switch 20a, the shot direction rotates clockwise.

Additionally, the shot direction may be changed by operating the touch panel 22 displayed on the LCD 14, instead of operating the cross switch 20a. Besides, the launch angle of the ball 106 on the vertical plane is separately set on the basis of data on a loft angle of the club 104, etc.

After that, the player performs a hitting operation on the game screen 120. For example, when the player touches on an area below the impact line 124 of the game screen 120 shown in FIG. 3 (a shot area (1) described below or an area (3)) by means of the stick 24, the hitting force and the stance of the player character 102 are decided according to the coordinates of the touch-on position (touch-on coordinates). However, the display area of the target ball 122 may be excluded from the shot area. According to the decided stance, the launch (flying) direction of the ball 106 to be hit by the player character 102 is corrected, and a side-spin value (indicative of the horizontal rotating (spinning) direction and the amount of rotation) is determined. Alternatively, the launch direction alone may be decided or the side-spin value alone may be decided according to the stance.

The launch direction decided here is an angle (−90 to 90 degrees) of horizontal direction (side-to-side direction), with reference to the straight-ahead direction (the launch reference direction decided as stated above) of the ball 106 (as 0 degree). Also, the side-spin value decided here is a value that indicates the direction and amount of rotation in a transverse direction (side-spin; side-to-side rotation) of the ball 106. A longitudinal rotation (top-spin or back-spin) can be separately set in a setting screen (setting area) not illustrated.

Additionally, even if any place on a horizontal straight line in the game screen 120 is touched on (specified) by means of the stick 24, the same hitting force is established. That is, if the Y coordinates of the touch coordinates are the same, the set hitting forces are the same. Here, assuming that a hitting force corresponding to a straight distance (hereinafter referred to as "first straight distance" for convenience of description) between the impact line 124 and the full-shot line 126 is 100%, the ratio of a straight distance (hereinafter referred to as "second straight distance" for convenience of description) between the Y coordinate of the touch coordinates and the impact line 124 to the first linear line is calculated. By multiplying the calculated ratio by 100%, the hitting force (shot power value) is figured out (determined). However, if the touch coordinates are within the full-shot area (see FIG. 6), the above mentioned calculation is not necessary and the shot power value is determined as 100%. As stated above, the hitting force is set on the basis of the Y coordinate of the touch coordinates at the time of touch-on. More specifically, the hitting force is set on the basis of a difference between the Y coordinate at the time of touch-on and the Y coordinate of the impact line 124 (or the Y coordinate of the center of the target ball 122).

In the first embodiment, the shot power value can be visibly recognized. Besides, the shot power value is indicated in units of 10% within a range of 0 to 100% for the sake of simplicity by rounding down (or rounding off) it to the one place. More specifically, in the case of touching on the full-shot line 126 by means of the stick 24 as shown in FIG. 5 (A), the shot power value is determined as 100%. The shot power "100%" is displayed, and a shot power line 127 is also displayed. In the example of FIG. 5 (A), the shot power line 127 is displayed on the full-shot line 126. Additionally, in FIG. 5 (A) (and also FIG. 5 (B)), the shot power line 127 is shaded with slant lines for making it more understandable. In actuality, however, the shot power line 127 is distinguished from the impact line 124 and the full-shot line 126 by changing the line color or design. Besides, if touch-on is performed between the impact line 124 and the full-shot line 126 by means of the stick 24, the shot power value is calculated in the above mentioned manner. For example, FIG. 5 (B) shows a state in which, if the shot power value is determined as 30%, the shot power value "30%" and the shot power line 127 are displayed.

A carry F of the ball 106 is calculated according to an equation 1 by use of the hitting force (shot power value), etc. In this equation, a value K shows a maximum carry (club carry) set according to the club (1W to PT) 104, and a value P denotes the shot power value (hitting force) within a range of 0 to 100% that is calculated in the above described manner. A value T indicates a correction value (swing time correction value) that ranges 1 to 100% and is used for a negative correction in the case where a swing time has exceeded a specified time. In addition, the swing time will be described later. A value L shows a correction value (the lie correction value) that ranges 0 to 99% and is determined for a negative correction according to the state of the lie in the current position of the ball 106.

$$F = K \times P \times (100-T) \times (100-L) \times \alpha \qquad \text{[Equation 1]}$$

A value α is a correction value different from the above mentioned correction values, and shows a correction value related to wind or/and rain in the course (hole), a correction value related to a hitting point setting (height of a trajectory), i.e. a correction value related to shot type, a correction value (power loss correction value) related to hitting force (shot power) based on a swing speed, a launch angle correction value (at the time of impact), a spin correction value (top-spin or back-spin), etc. It also includes gravity, air resistance, lifting power, restitution coefficient, friction coefficient, etc. The correction value α may be determined as one of these items or with a combination of two or more items.

Moreover, in the first embodiment, as a distance along a Y direction from the target ball 122 increases, the shot power value becomes larger and also the carry F becomes longer, as shown in FIG. 5 (A) and FIG. 5 (B). Alternatively, depending on the kind of a game, the parameter is made smaller in value as the distance to the target ball 122 increases (becomes longer). In this case, for example, the game can be performed more favorably with the smaller parameter.

In this embodiment, if the Y coordinates are the same, the same hitting force is set. Alternatively, the hitting force may be made larger as a two-dimensional distance to the target ball 122 becomes longer. In this case, the coordinates with the same hitting forces are set on a concentric circle (half round) around the target ball 122.

In addition, as stated above, the stance of the player character 102 is decided on the basis of the touch-on coordinates (more specifically, the X coordinate at the time of touch-on). More specifically, returning to FIG. 3, the stance is set as closed stance if the position of the touch-on with the stick 24 is on the left side of the game screen 120 (left-of-center position). Also, the stance is set as open stance if the position of the touch-on with the stick 24 is on the right side of the game screen 120 (right-of-center position). Furthermore, the stance is set as square stance if the position of the touch-on with the stick 24 is on the center or near the center of the game screen 120. The center and its vicinity of the game screen 120 where the square stance is set is a range indicated by dotted lines in FIG. 3. That is, in the first embodiment, the width of the range in which the square stance is the same or approximately the same as the width of the target ball 122.

As described later, the position of the target ball 122 may be moved, and thus, in the strict sense, the stance is set on the basis of a straight line that passes through the center of the target ball 122 and extends in a vertical direction (hereinafter referred to as "stance reference line 140"). Therefore, the stance is set as open stance if touch-on is performed on a place at a specific distance (which equals to the radius of the target ball 122 in this embodiment. The same applies to the following specific distances.) or more to the right from the stance reference line 140. In addition, the stance is set as closed stance if touch-on is performed on a place at the specific distance or more to the left from the stance reference line 140. Moreover, the stance is set as square stance if touch-on is performed on a place at less than the specific distance to the left or right from the stance reference line 140. The same can be said even if the target ball 122 is moved. The stance reference line 140 is moved with the movement of the target ball 122. However, the stance reference line 140 is not displayed on the game screen 120.

The stance decided in the above stated manner has an influence on the launch direction of the ball 106, and is also used to determine the side-spin value of the ball 106. The launch direction of the ball 106 is determined by correcting the above stated launch reference direction (vector) according to the stance decided in the above mentioned manner. Specifically, in the case of the open stance, the launch reference direction is corrected to the left along a horizontal direction. More specifically, a vector of the horizontal direction to the left (a direction to the left with reference to the launch reference direction seen from the front side) is added to a vector of the launch reference direction. The magnitude of the additional vector varies depending on the X coordinate of the touch coordinates. In the case of closed stance, the launch reference direction is corrected to the right along the horizontal direction.

In addition, the side-spin value of the ball 106 shows the direction and amount of a spin. In the case of open stance, the set value indicates a fade ball (rightward spin). In the case of closed stance, the set value indicates a draw ball (leftward spin). The side-spin value decided in this manner is used to change the horizontal movement direction of the hit ball 106. Typically, a vector of the spin direction indicated by the side-spin value is added to a movement direction vector in the horizontal direction of the ball 106 in the previous frame, thereby determining a movement direction vector in the horizontal direction in the current frame. The magnitude of the vector of the spin direction varies depending on the X coordinate of the touch coordinates. Also, the side-spin value (the amount of a spin) may be attenuated with the movement of the ball 106.

As a difference becomes larger between the X coordinate at the time of the touch-on and the X coordinate of the center of the target ball 122 (X coordinate of the stance reference line 140), the launch direction is corrected more widely and the side-spin value (the amount of a spin) is made larger.

Besides, the launch direction and the movement direction of the hit ball 106 may be corrected according to the correction value related to wind speed and wind direction, gravity, air resistance, lifting power, restitution coefficient, or friction coefficient.

As described above, when the player touches on the game screen 120 (the touch panel 22) by means of the stick 24, the hitting force and the stance are set on the basis of the touch-on coordinates (two-dimensional coordinates). More specifically, the hitting force is set on the basis of the Y coordinate of the touch coordinates, and the stance is set on the basis of the X coordinate of the touch coordinates. Also, according to the stance, the launch direction is corrected and the side-spin value is set. However, as discussed below, the touch-on coordinates may be updated by doing over a swing operation (slide operation) again.

Besides, only the launch direction may be corrected or only the side-spin value may be set, on the basis of the X coordinate of the touch coordinates.

Additionally, as stated earlier, the resolution of the LCD 14 and the detection accuracy of the touch panel 22 are the same, and their coordinate systems are also the same, which makes it easy to identify the touch position (operating position) on the LCD 14 based on the touch coordinates.

Also, the size of an area for setting the hitting force (shot area) varies depending on the club to be used. FIG. 6 (A) shows the game screen 120 indicative of the shot area (1) where the driver (1W) is to be used. FIG. 6 (B) shows the game screen 120 indicative of the shot area (1) where a putter (PT) is to be used. In the examples shown in FIG. 6 (A) and FIG. 6 (B), the shot area (1) is composed of a full-shot area (2) and the other area (3). Also, an impact area (4) is provided in addition to the shot area (1). As stated above, the size of the shot area (1) may be changed, but the full-shot area (2) is fixedly provided. That is, the other area (3) and the impact area (4) may be changed in size. In this embodiment, the distance between the impact line 124 and the full-shot line 126 is changed by moving vertically the position of the impact line 124 according to the club 104 to be used. Alternatively, the distance between the impact line 124 and the full-shot line 126 may be changed by moving vertically the position of the full-shot line 126. As a matter of course, the both lines may be vertically moved. Thus, when the impact line 124 or/and the full-shot line 126 are moved, the hitting force corresponding to each of the Y coordinates is changed.

In playing real golf, generally, as a longer club is used, the difficulty level of a shot (impact) becomes higher. On the contrary, as a shorter club is used, the difficulty level of a shot becomes lower. Accordingly, in using a PT, the shot area (1) is reduced to shorten the distance from the full-shot line 126 to the target ball 122, thereby making easier a slide operation (swing operation), i.e., a hitting operation, as shown in FIG. 6 (B). Also, the size of the shot area (1) is changed partly in order to decide the length of the moving distance of the ball 106 (carry and rolling distance). However, the magnitude of the hitting force is set within a range of 0 to 100% regardless of the kind of the club 104. The hitting force expressed within a range of 0 to 100% is the club carry K that is set according to the player character 102 and the kind of the club 104 used by the player character 102. However, the actual carry F is calculated according to the equation 1, as described above.

Besides, the size of the shot area (1) becomes minimum in the case of using the PT. For the clubs 104 of sizes between the 1W and the PT, although not illustrated, as the shorter club 104 is used in a range of the 1W to the PT, the shot area (1) is gradually made smaller. However, the size of the shot area (1) in the case of using the PT may be regarded differently from the other clubs 104. For example, in the case of using the PT, the shot area (1) may be made larger to some extent.

Figure 7:
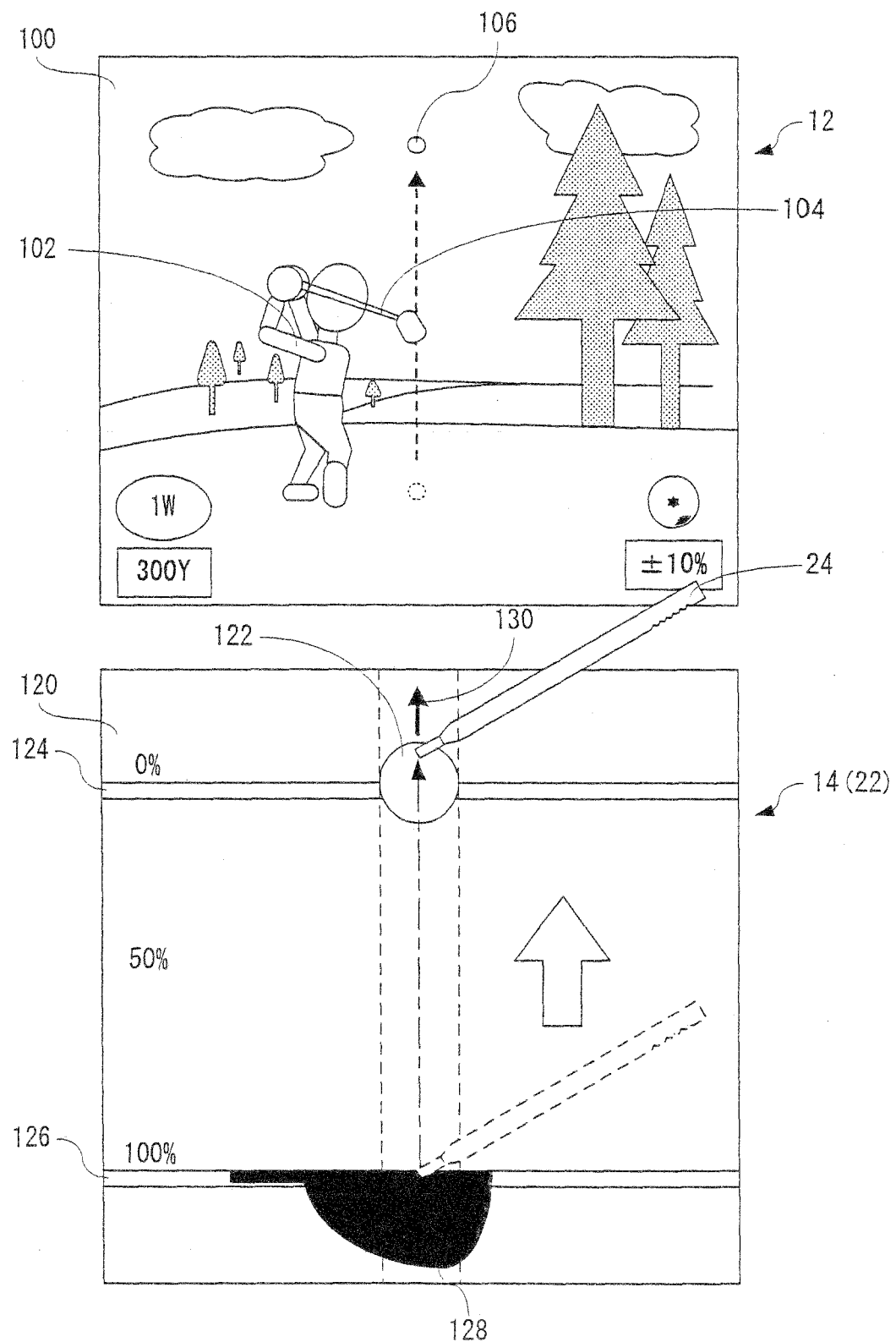
FIG. 7 is an illustrative view showing another example of game screen displayed on the first LCD and the second LCD provided in the game apparatus shown in FIG. 1.

In addition, as stated above, the stance is set according to the X coordinate of the touch-on coordinates. When the stance is set according to the X coordinate of the touch-on coordinates, the orientation of the club head image 128 displayed on the game screen 120 is changed according to the set stance so that the orientation of face of the club 104 displayed on the game screen 100 can be recognized, as described below (see FIG. 7 to FIG. 9). Therefore, when touch-on is performed on the center or its vicinity of the game screen 120 (the full-shot area (2) here) by means of the stick 24, for example, the square stance is set and the club head image 128 is displayed in such a manner that the club face looks toward the target ball 122, as shown in FIG. 7. Also, when touch-on is performed on the right side of center of the game screen 120 (the full-shot area (2) here) by means of the stick 24, for example, as indicated by dotted lines in FIG. 8, the open stance is set and the club head image 128 is displayed in such a manner that the club face looks toward the target ball 122. Moreover, when touch-on is performed on the left side of center of the game screen 120 (the full-shot area (2) here) by means of the stick 24, as shown in FIG. 9, the closed stance is set and the club head image 128 is displayed in such a manner that the club face looks toward the target ball 122.

Figure 8:
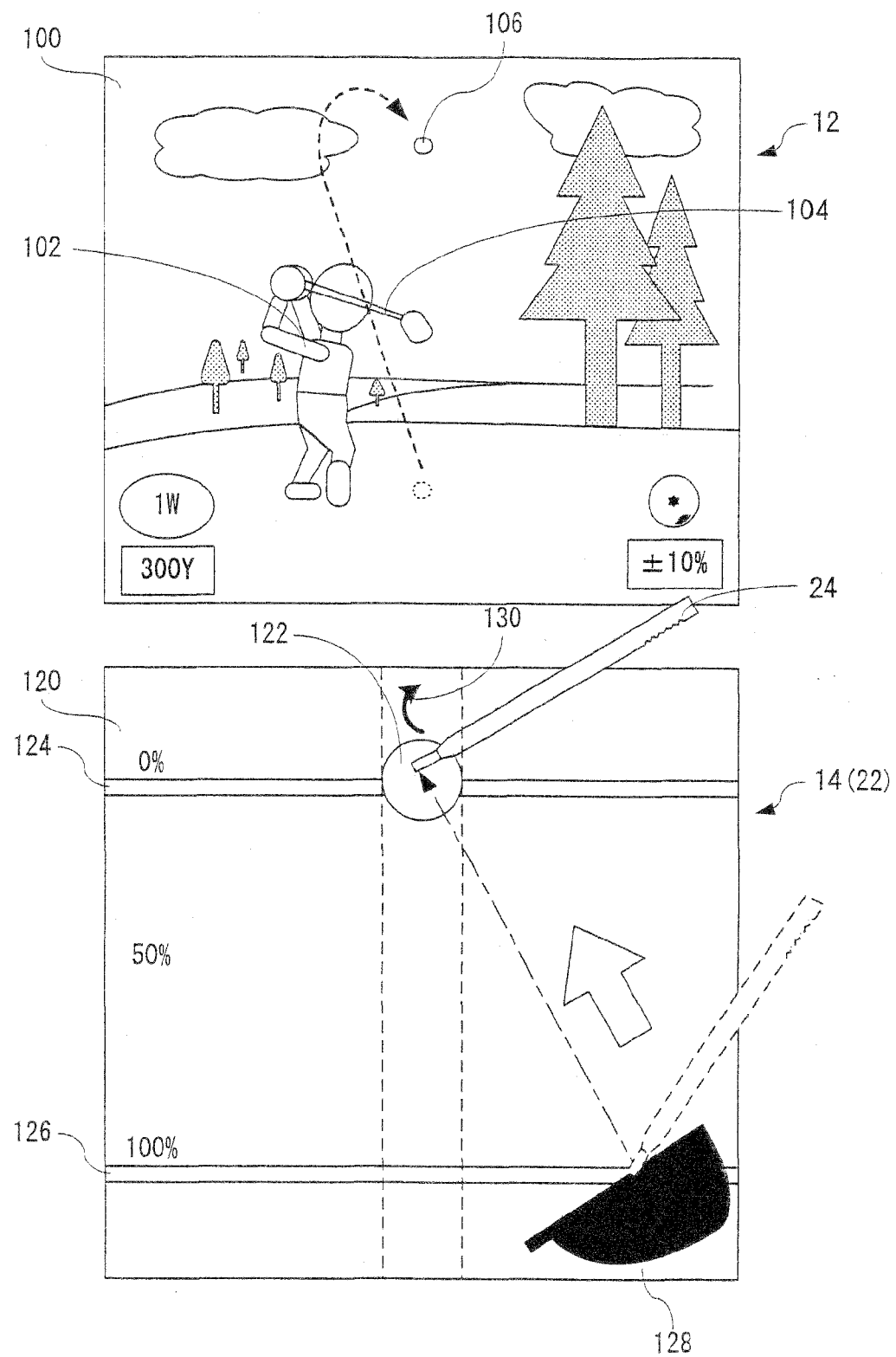
FIG. 8 is an illustrative view showing still another example of game screen displayed on the first LCD and second LCD provided in the game apparatus shown in FIG. 1.
Figure 9:
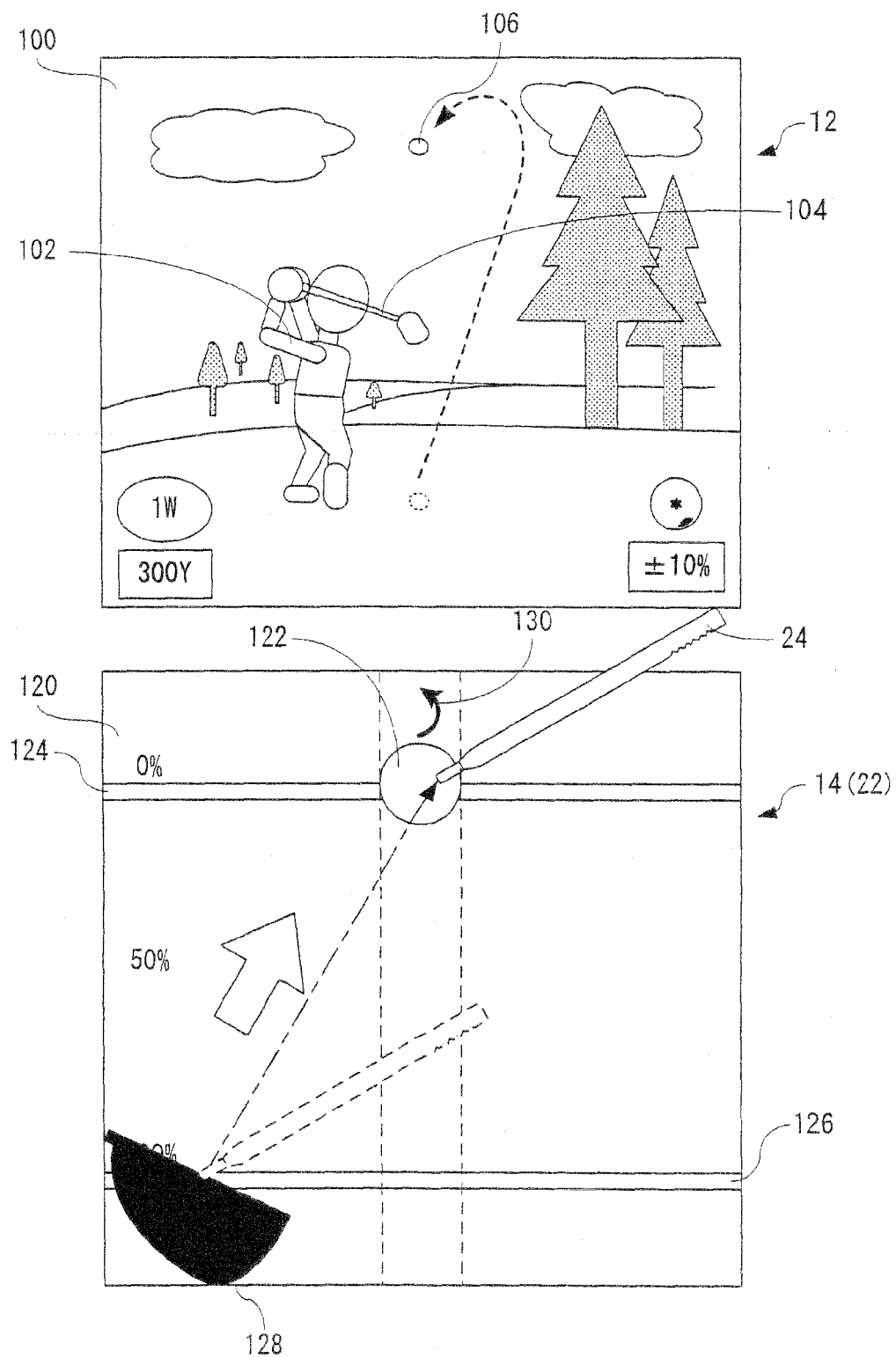
FIG. 9 is an illustrative view showing further another example of game screen displayed on the first LCD and the second LCD provided in the game apparatus shown in FIG. 1.

FIG. 7 to FIG. 9 shows examples of display of the club head image 128 where the target ball 122 is displayed in the center of the game screen 120.

In this manner, when the hitting force and the stance of the player character 102 have been set by a touch-on, the player slides the stick 24, etc. following the touch-on operation (continuously from the touch-on, that is, without doing a touch-off) to operate the target ball 122 in such a manner as to hit the ball by the stick 24, etc. (hitting operation).

The hitting operation is described below with use of FIG. 7 to FIG. 9. The game screen 120 shown in FIG. 7 indicates a situation in which the player uses the stick 24 to touch on the center of the game screen 120 as the full-shot area (2), and then slides the stick 24 over the game screen 120 straight from bottom up, as indicated by the hollow arrow, thereby passing the stick 24 (the path of slide operation) through the target ball 122. In this case, after the hitting operation, the game screen 100 presents an animation in which the ball 106 hit by the player character 102 flies off in a straight line. That is, this is a so-called straight ball.

Besides, FIG. 7 describes the line of the ball 106 in the case where the path of a slide operation passes through the center or its vicinity of the target ball 122. As described later, according to a position at which the path of a slide operation passes through the target ball 122 (impact position or impact point), the impact is classified as a good shot, push ball shot, pull ball shot, or missed shot, and a change is made to the line of the ball 106. The same applied to the cases shown in FIG. 8 and FIG. 9.

Also, the game screen 120 shown in FIG. 8 shows a situation in which the player uses the stick 24 to touch on the right of center of the game screen 120 as the full-shot area (2), and then slides the stick 24 over the game screen 120 from bottom to upper diagonal left, as indicated by the hollow arrow, thereby passing the stick 24 (the path of a slide operation) through the target ball 122. That is, a slide operation is performed by an outside-in swing. In this case, the game screen 100 shows the line of the ball in which the ball 106 hit by the player character 102 flies out in an upper left direction with reference to the launch reference direction, takes a flight in the direction partway, and then curves to the right. That is, this is a fade ball.

The degree of curve of the ball 106 here is determined depending on how far the touch-on coordinates are distant from the center (the swing reference line 140) of the target ball 122 displayed on the game screen 120. For example, the degree of curve of the ball 106 becomes higher (the above mentioned side-spin value is set to a larger value) in the case where touch-on coordinate P2 is located at a distance D=d2 from the center of the target ball 122 as shown in FIG. 10 (B), when compared to the case where touch-on coordinates P1 are located at a distance D=d1 (<d2) from the center of the target ball 122 as shown in FIG. 10 (A), even if a slide operation is performed on the same impact point (the center of the target ball 122, for example). Additionally, as shown in FIG. 10 (A) and FIG. 10 (B), the degree of curve of the indicative image 130 is changed according to the touch-on coordinates, which allows the player to know the degree of curve of the ball 106 by intuition.

As understood from FIG. 10 (A) and FIG. 10 (B), however, as the touch-on coordinates are increasingly distant in a transverse direction from the center of the target ball 122, the distance to the target ball 122 becomes longer and thus the difficulty level of a hitting operation (slide operation) becomes higher. That is, in using a fade ball or a draw ball many times, the difficulty level of game operation is made higher. FIG. 10 (A) indicates a distance of slide operation, i.e., a distance L between the touch coordinates and the center (central coordinates) of the target ball 122 with l1 (<l2), and FIG. 10 (B) shows the distance L with l2.

Besides, as described above, a hitting operation becomes harder to perform with an increasing slide distance. However, by getting skillful in doing the operation, it becomes possible to freely control the line of the ball 106 to be hit and play a game without making a missed shot even in a golf course of a high difficulty level or at a difficult place of a golf course.

Returning to FIG. 9, the game screen 120 shows a situation in which the player uses the stick 24 to touch on the left of center of the game screen 120 as the full-shot area (2), and then slides the stick 24 over the game screen 120 from bottom to upper diagonal right, as indicated by the hollow arrow, thereby passing the stick 24 (the path of slide operation) through the target ball 122. That is, a slide operation is performed by an inside-out swing. In this case, the game screen 100 shows the line of the ball in which the ball 106 hit by the player character 102 flies out in an upper right direction, takes a straight flight in the direction partway, and then curves to the left. That is, this is a draw ball.

This is the same as the case in FIG. 10 in that the degree of curve of the ball 106 is changed according to the touch-on coordinates, and that the difficulty level of a hitting operation becomes higher with an increasing slide distance. Therefore, the overlapping descriptions are omitted.

FIG. 11 (A) and FIG. 11 (B) are illustrative view showing other examples of game screen 120. The game screen 120 shown in FIG. 11 (A) displays the target ball 122 on the left of its center (the ball is moved from usual position in an X-axis negative direction). On the other hand, the game screen 120 shown in FIG. 11 (B) displays the target ball 122 on the right of its center (the ball is moved from usual position in an X-axis positive direction). FIG. 11 (A) shows the game screen 120 that is displayed in the case where the right-handed player character 102 makes a shot at a downhill place (an uphill place for the left-handed player). On the contrary, FIG. 11 (B) shows the game screen 120 that is displayed in the case where the right-handed player character 102 makes a shot at an uphill place (a downhill place for the left-handed player).

As described above, when the player character 102 makes a shot, the position of the target ball 122 is changed according to the inclination state of the ground in the current position of the ball 106 (the state of the lie) or the posture of the player character 102 in order to express the difficulty of hitting a shot, as in the case of playing real golf. More specifically, it is difficult for the right-handed player to hit a draw ball at a downhill place, and, conversely, it is difficult for the right-handed player to hit a fade ball at an uphill place. Also, in the cases of hitting a draw ball at a downhill place and hitting a fade ball at an uphill place, the ball hardly makes a curve. On the contrary, making a shot at a downhill place often leads to a fade ball (or a slice), and making a shot at an uphill position often results in a draw ball (or a hook). Thus, in order to express realistic hitting operations in these cases, the position of the target ball 122 can be moved from side to side. More specifically, in the game screen 120 shown in FIG. 11 (A), it is difficult to hit a draw ball because the area on the left side of the target ball 122 is narrow. Also, even if a draw ball is hit under this condition, the ball hardly makes a curve. On the other hand, in the game screen 120 shown in FIG. 11 (B), it is difficult to hit a fade ball because the area on the right side of the target ball 122 is narrow. Also, even if a fade ball is hit under this condition, the ball hardly makes a curve.

In addition, the position of the target ball 122 is calculated in a manner described below. For example, in the case where map data for a virtual game (landform data) is data only on height, it is possible to obtain from the landform data a height h1 of the landform in the position of the player character 102 and a height h2 of the landform in the position of the ball 106, and calculate a height difference d according to an equation 3. Then, an X coordinate x (dot) of the display position (target ball coordinates) of the target ball 122 is determined according to an equation 4.

Additionally, the position of the player character 102 is set as a ground surface position (X, Y, Z) corresponding to an XY position at a predetermined distance from the position of the ball 106 in a direction orthogonal to the launch reference direction (to the left for a right-hander and to the right for a left-hander). That is, a horizontal direction in which the XY position of the player character 102 and the XY position of the ball 106 are linked to each other is orthogonal to the launch reference direction. Besides, by allowing the player to select a right-handed hit or left-handed hit and storing data on the selection, the image of the player character 102 may be changed and also the above mentioned method of deciding the position of the player character 102 may be changed based on the stored data.

$d$ (m)=$h2-h1$ [Equation 3]

If $d<-0.1$ (m), $x=96+(d+0.1)\times k\times 96$

If $d>0.1$ (m), $x=96+(d-0.1)\times k\times 96$ [Equation 4]

However, if $-0.1\leq d\leq 0.1$, that is, if a height difference d=±10 cm or less, the display position of the target ball 122 is not changed. In addition, in the equation 4, "96" is half of the number of dots (192) along a transverse direction of the LCD 14. In this case, the numerical value "96" is used because the display position of the target ball 122 is moved from the center to the left or right of the screen of the LCD 14 according to the height difference d. Additionally, in the equation 4, "k" is an adjustment value for determining the movement range of the display position of the target ball 122, and is set to "3", for example.

If the target ball 122 lies off the game screen 120 as the result of calculations according to the equation 3 and the equation 4, the target ball coordinates are corrected in such a manner to come within the game screen 120.

As stated above, the position of the target ball 122 is moved according to the calculated height difference d. If the map data (landform data) includes an angle of inclination, the calculation shown in the equation 3 is not required. By referring to the landform data, it is possible to obtain lateral inclination and inclination amount in the current position of the ball 106, from a relationship between the current position of the player character 102 and the current position of the ball 106. It is also possible to move the position of the target ball 122 according to the lateral inclination and inclination amount.

FIG. 12 (A) and FIG. 12 (B) are illustrative views for describing a hitting operation (slide operation). In FIG. 12 (A) and FIG. 12 (B), the path 142 of a slide operation by the player is indicated by solid lines. Besides, in FIG. 12 (B), as stated below, the path 142 of a virtual slide operation extended on the basis of the player's slide operation is indicated by a dotted line. Moreover, shown in FIG. 12 (A) and FIG. 12 (B) is a point (position coordinates) corresponding to coordinate data detected in the game apparatus 10 when the player has performed a slide operation. Here, a point in time of the end of slide operation is set at 0 frame (frame: a unit of time for screen update (1/60 second)).

FIG. 12 (A) is an illustrative view in which, in the case where touch-on is performed on the full-shot area (2) and then a slide operation is performed in an upward left diagonal direction over the game screen 120 in such a manner as to go beyond the impact line 124, some points corresponding to the coordinate data detected for each frame are drawn. In the example of FIG. 12 (A), the coordinates of the point in time of the end of a slide operation (touch-off) are a point indicted as a position A, and the coordinates of the point in time of the start of a slide operation (touch-on) are a point indicated as a position F. Each of position B, position C, position D and position E existing between the position A and the position F corresponds to the coordinates detected for each frame from the start to end of a slide operation. As stated above, if the coordinates at the end of a slide operation, i.e., the coordinates at the time of touch-off (touch-off coordinates) go beyond the impact line 124, an impact determination described below is made on the path 142 of the slide operation.

Also, in this case, the swing speed is determined on the basis of the distance between the coordinates at the time of going beyond the impact line 124 (the position A here) and the immediately preceding (by one frame) coordinates (the position B here). For example, by storing all the coordinate data input for each frame from touch-on to touch-off the screen, it becomes possible to obtain the coordinate data detected at the time of going beyond the impact line 124 and the coordinate data detected immediately before that, and calculate the distance between the coordinate points indicated by the two coordinate data. Then, the swing speed is determined by dividing the calculated distance by one frame (1/60 second). The swing speed can be used for calculation of the carry F, as mentioned above. More specifically, as the swing speed becomes lower or if the swing speed is equal to or less than a specific value, the above described a may be set to decrease the hitting force. Also, if the swing speed is equal to or less than a specific value, the shot may be determined as a missed one or the hitting operation may be made invalid.

Besides, the swing speed may be an average value of the distances between the coordinates, or may be a value obtained by dividing the distance between the coordinates at the time of going beyond the impact line 124 and the touch-on coordinates by the passed time.

Figure 13:
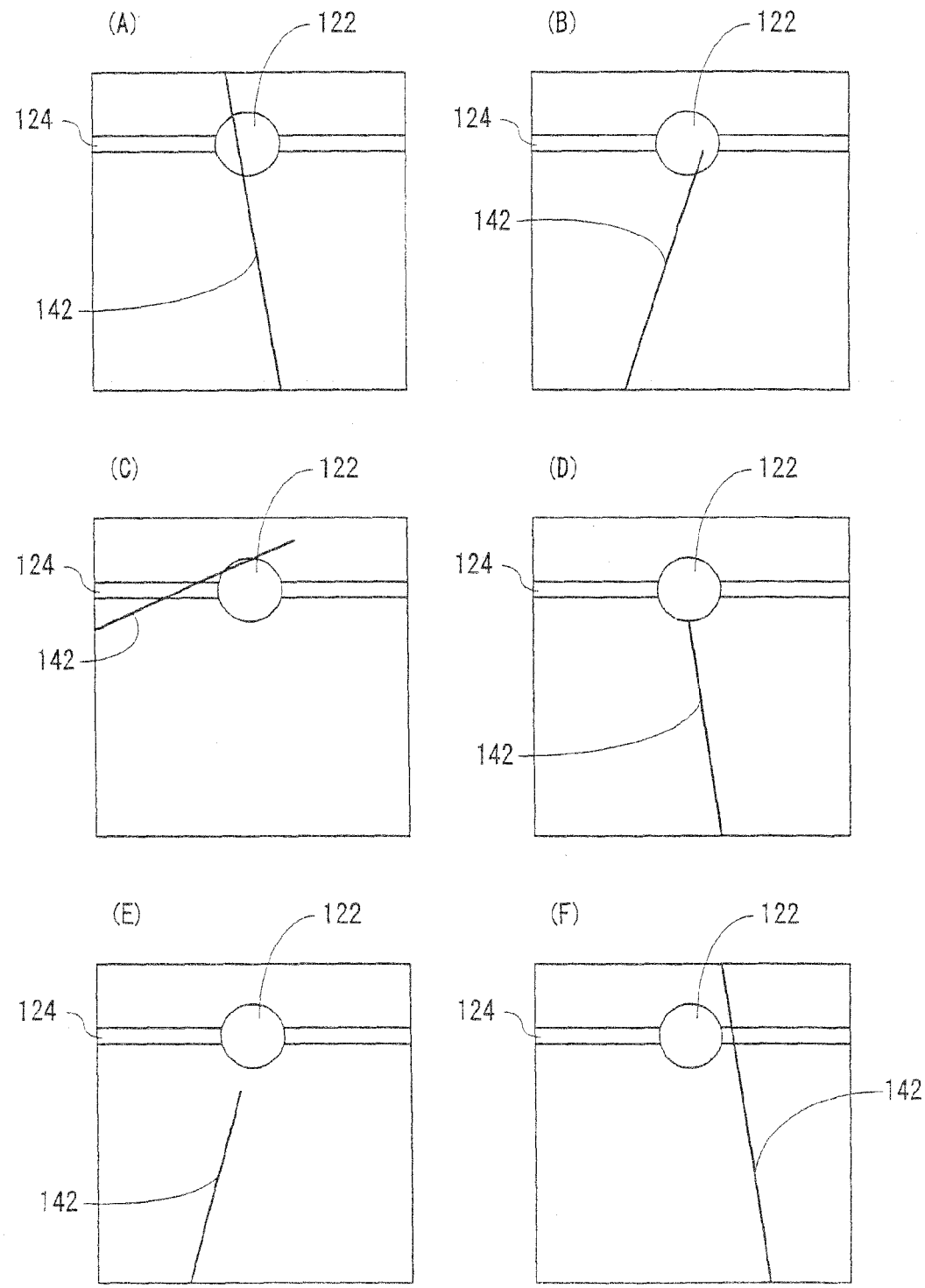
FIG. 13 is an illustrative view showing another example of a slide operation on the touch panel provided in the game apparatus shown in FIG. 1.

However, as shown in FIG. 13 (A) to FIG. 13 (D), there are various manners in which the target ball 122 is hit by a slide operation, that is, the slide operation path 142 touches the target ball 122. In FIG. 13 (A), as in the case of FIG. 12 (A), the slide operation (the path 142) ends (touch-off) after it has passed through the target ball 122. In FIG. 13 (B), the slide operation ends within the target ball 122. In FIG. 13 (C), the slide operation firstly goes beyond the impact line 124 and then passes through the target ball 122, unlike the cases of FIG. 13 (A) and FIG. 13 (B). In FIG. 13 (D), the slide operation ends on the surface (outline) of the target ball 122.

Since a contact determination is required for all these manners, it is determined whether or not the slide operation path 142 makes contact with the target ball 122. More specifically, it is firstly determined for each frame whether or not the current touch coordinates come within the display area of the target ball 122. If the current touch coordinates come within the display area of the target ball 122, it is concluded that the slide operation path 142 is in contact with the target ball 122. However, if the current touch coordinates do not come within the display area of the target ball 122, it is determined whether or not the current touch coordinates are beyond the impact line 124. If the current touch coordinates are not beyond the impact line 124, the state of the slide operation is determined as ongoing, ended or stopped, and some process is performed according to that. On the other hand, if the current touch coordinates are beyond the impact line 124, it is determined whether or not the slide operation path 142 makes contact with the target ball 122 in such a manner as described below. That is, it is determined whether or not a line segment linking the touch coordinates at the time when the path has gone beyond the impact line 124 or come within the display area of the target ball 122 (hereinafter referred to as "first coordinates" for convenience of description. The same applies to the following touch coordinates.) and the coordinates detected immediately preceding the first coordinates (by one frame) (hereinafter referred to as "second coordinates" for convenience of description) passes through the display area of the target ball 122. This makes it possible to address such a case where, although the slide operation path 142 has passed through the target ball 122, the touch coordinates within the display area of the target ball 122 cannot be detected. However, if the sampling cycle of the touch coordinates is sufficiently short, etc., it may be just determined whether or not the current touch coordinates come within the display area of the target ball 122 or whether or not the current touch coordinate is beyond the impact line 124.

Additionally, in obtaining a virtual slide operation path as an extension of the slide operation path as shown in FIG. 12 (B), it is determined whether or not virtual touch coordinates described later has come within the display area of the target ball 122 or whether or not it has gone beyond the impact line 124, and then it is determined whether or not a line segment linking the virtual touch coordinates beyond the impact line 124 and the immediately preceding touch coordinates passes through the display area of the target ball 122.

Moreover, in this embodiment, it is determined whether or not the line segment linking the first coordinates and the second coordinate passes through the display area of the target ball 122. However, it is impossible to make the determination appropriately if the slide operation (the path 142) goes beyond the impact line 124 and then passes through the display area of the target ball 122, as shown in FIG. 13 (C). In the strict sense, therefore, if the current touch coordinates have gone beyond the impact line 124 before coming within the display area of the target ball 122, the line segment linking the first coordinates and the second coordinates is extended, and it is determined whether or not the extended line segment, i.e., the straight line passes through the display area of the target ball 122. If the straight line passes through the display area of the target ball 122, the detection of the touch coordinates is continued. Then, when the touch coordinates have come within the display area of the target ball 122, the touch coordinates are set as the first coordinates, and the touch coordinates detected one frame before that are set as the second coordinates. On the contrary, if the extended line segment (straight line) does not pass through the display area of the target ball 122, the detection of the touch coordinates is terminated, and it is concluded that the path 142 is not in contact with the target ball 122. For example, this is concluded as an air shot, as in the case of FIG. 13 (F) described later.

Also, if the slide operation is ended without making contact with the target ball 122 or going beyond the impact line 124 as shown in FIG. 13 (E), it is determined that the swing is discontinued halfway, and then a slide operation is started from the beginning again. In addition, if the slide operation makes no contact with the target ball 122 but goes beyond the impact line 124 as shown in FIG. 13 (F), this is determined as an air shot, and then an air shot process described later is carried out.

Moreover, although not illustrated, a slide operation can be started from the beginning again in the case where the slide operation has been performed in a direction opposite to the direction in which the target ball 122 is displayed. Whether or not the slide operation has been performed in a direction opposite to the direction in which the target ball 122 is displayed can be determined depending on how far the currently detected touch coordinates are distant from the target ball 122, as compared to the previously detected touch coordinates. Alternatively, this determination may be made on whether or not the Y coordinate of the currently detected touch coordinates is larger than the Y coordinate of the previously detected touch coordinates.

If the slide operation has been performed in a direction opposite to the direction in which the target ball 122 is displayed, it is assumed that the coordinates at the time of stopping the slide operation in the opposite direction are the touch-on coordinates, i.e., the start point of the hitting operation (slide operation), and then the hitting force and the stance are decided according to the coordinates. Assumed as the start point are, for example, the currently detected touch coordinates that become closer to the target ball 122 as compared to the previously detected touch coordinates, or the Y coordinate of the currently detected touch coordinates that become smaller than the Y coordinate of the previously detected touch coordinates.

This is because, in playing real golf, a swing may be stopped halfway and then started from the beginning again. Additionally, it is also possible to start a swing from the beginning again in the case where the slide operation is stopped or performed at a low speed. It is concluded that the slide operation is stopped or performed at a low speed in the case where the currently detected touch coordinates matches the previously detected coordinates, or where the distance between the currently detected touch coordinates and the previously detected coordinates is shorter than a threshold value, for example.

If a swing (slide operation) is stopped halfway and started from the beginning again, the currently detected touch coordinates that do not match the previously detected coordinates, or the currently detected touch coordinates at a distance from the previously detected coordinates which is longer than a threshold value, are assumed to be the coordinates at the time of the touch-on, i.e., the start point of the hitting operation, and the hitting force and the stance are decided accordingly.

Besides, the same contact determination as shown in FIG. 13 (A) to FIG. 13 (F) is carried out in the case of extending the slide operation path 142 described later. In this case, however, the first coordinates are not the touch-off coordinates but the virtual touch coordinates of each extended frame. The second coordinates are coordinates predicted as a position immediately preceding (by one frame) the first coordinates.

FIG. 13 (A) to FIG. 13 (F) each show a part of the game screen 120 for simplicity.

Returning to FIG. 12 (B), a description is given as to the case where a slide operation is stopped halfway and the slide operation path 142 is extended before going beyond the impact line 124. In FIG. 12 (B), one part of the slide operation path 142 is indicated by a dotted line, and the part indicated by the dotted line is an extended virtual slide path. FIG. 12 (B) is an illustrative view in which, in the case where touch-on is performed on the full-shot area (2), a slide operation is performed in an upward left diagonal direction over the game screen 120, and then the slide operation is ended before the impact line 124, some points corresponding to the coordinate data detected for each frame and some points corresponding to the coordinate data (virtual touch coordinate data) detected for each frame extended after the end of the slide operation are drawn. In this case, unlike the case of FIG. 12 (A), the slide operation is not beyond the impact line 124, and thus the path 142 after the end of the slide operation is determined by calculation.

More specifically, the distance from the touch-on position to the touch-off position (slide distance) is calculated, and also the time from touch-on to touch-off (slide time) is obtained. Although not illustrated, in the first embodiment, the game apparatus 10 is provided with a timer for counting the time from touch-on to touch-off by a predetermined multiplying factor. Then, an initial speed for extending the slide operation path 142 is calculated from the slide distance and the slide time (slide distance/slide time). Also, the direction of extension of the slide operation path 142 is determined as the direction of a vector which has the touch-off coordinates as the end point (the movement position E here) and the touch coordinate detected at an immediately preceding frame (the movement position F) as the start point. Then, the virtual touch coordinates of each frame after touch-off are calculated in such a manner that a vector having the calculated initial speed as a scalar (speed vector) is gradually slowed down by a predetermined multiplying factor (0.94 time).

Alternatively, the coordinates of each frame may be simply extended (calculated) in such a manner as to shorten the slide distance for each frame after touch-off by a predetermined multiplying factor. In this case, a position (the position D here) with the addition of the length of a distance obtained by multiplying the length of a line segment that is on a straight line passing through two points at the touch-off coordinates and the touch coordinates detected at an immediately preceding frame (the points at the position E and the position F here) and is delimited by the two points in the direction of the slide operation by the predetermined multiplying factor (0.94 time), is determined as coordinates of the frame next to the frame at which the touch-off coordinates are detected. Then, the coordinates of each frame after touch-off are predicted in such a manner that the length of the line segment delimited by the two points is shortened for each frame by a predetermined multiplying factor. As shown in FIG. 12 (B), therefore, the spacing between the virtual touch coordinates becomes gradually narrower as the path moves from the position D through the position C and the position B toward the position A. More specifically, the length of a line segment DC is 0.94 time of the length of a line segment ED, the length of a line segment CB is 0.94 time of the length of the line segment DC, and the length of a line segment BA is 0.94 time of the length of the line segment CB.

Although not illustrated, if the distance of a slide for a period of one frame (between the coordinate points) becomes less than a specific value before the virtual touch coordinates extended by calculation goes beyond the impact line 124 (or before it makes contact with the target ball 122), the extension of the slide operation path 142 is ended, that is, it is concluded that the slide operation is stopped halfway, and a slide operation (swing) is performed from the beginning again.

Also, a swing may be done whenever a slide operation is performed. In this case, for example, it is possible to extend the coordinates for each frame after touch-off, without attenuating the length of the line segment linking the two points at the touch-off coordinates and the one frame-preceding coordinates or by increasing the same. On the contrary, even if a slide operation is performed, no swing may be made unless the slide operation goes beyond the impact line 124. In this case, a slide operation is to be performed again without extending the slide operation path 142.

A description of the impact determination process will be provided later and thus is omitted here. Also, the method of calculating the swing speed is the same as in the case of FIG. 12 (A), and thus no overlapping description is provided here.

In addition, although no detailed description is given here, for accurate determination on a slide operation (hitting operation), every time touch coordinates are detected, a difference (distance) between the touch coordinates and the touch coordinates detected one frame before is calculated. If the difference is equal to or less than a specific value, it is concluded that this is not a slide operation. In other words, if the slide speed is equal to or less than a specific value, it is concluded that this is not a slide operation (hitting operation). This makes it possible to prevent an operation mistake due to a shake in the hand, etc., and also stop a slide operation (including the extension of the slide operation path 142) halfway and start a swing from the beginning again.

Figure 14:
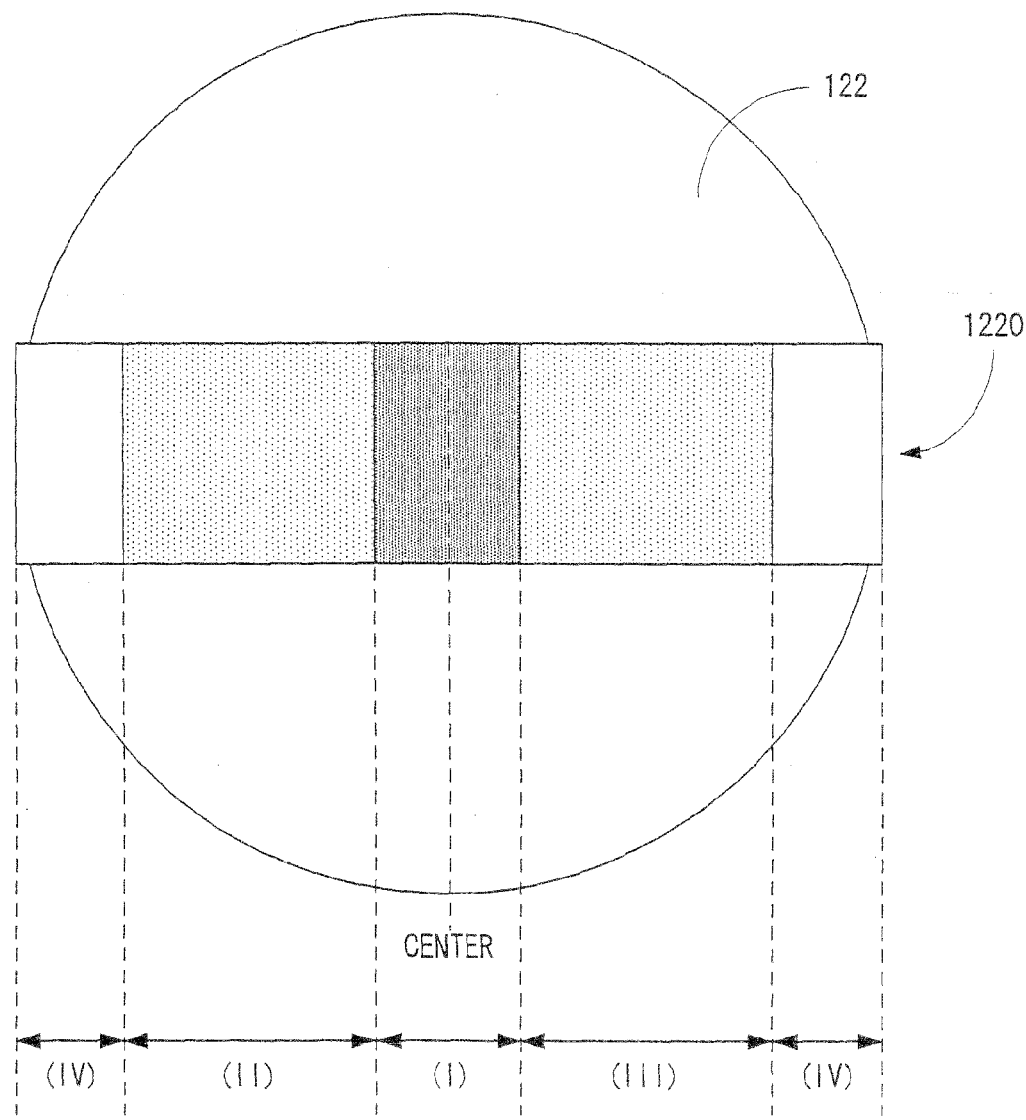
FIG. 14 is an illustrative view showing an impact determination area set with respect to a ball in the game screen displayed on the second LCD provided in the game apparatus shown in FIG. 1.

FIG. 14 is an illustrative view showing a determination area 1220 for impact determination. The determination area 1220 is provided corresponding to the target ball 122. In the first embodiment, this area is set so as to be the same or approximately the same in length as the radius of the target ball 122. The determination area 1220 includes a good shot area (I) in its center. Provided on sides of the good shot area (I) are a push shot area (II) (or (III)) and a pull shot area (III) (or (II)). More specifically, for the right-handed player character 102, an area on the left side of the good shot area (I) is the push shot area (II), and an area on the right side of the same is the pull shot area (III). On the other hand, for the left-handed player character 102, the area on the left side of the good shot area (I) is the pull shot area (II), and the area on the right side of the same is the push shot area (III). For the sake of simplicity, a description is given below for the case where the player character 102 is a right-hander. Furthermore, a missed shot area (IV) is provided outside the push shot area (II) and the pull shot area (III).

As stated above, impact determination is carried out when the slide operation path 142 has gone beyond the impact line 124 or when the slide operation path 142 has made contact with the target ball 122 without going beyond the impact line 124. In other words, impact determination is made when the slide operation path 142 has come from the shot area (1) into the impact area (4) or the display area of the target ball 122. More specifically, impact determination is made depending on which area within the above described determination area 1220 a straight line q1 passing through first coordinates kn and second coordinates km (hereinafter referred to as "swing reference line") has passed through. By the determination method shown in FIG. 15 (A), the impact determination area 1220 is rotated in such a manner that the impact determination area 1220 lies on a straight line q2 that is orthogonal to the swing reference line q1 passing through the first coordinates kn and the second coordinates km and that passes through the center of the target ball 122, and then impact determination is made according to the area through which the swing reference line q1 passes. In addition, impact determination is also performed according to the area including a point at which the swing reference line q1 and the impact determination area 1220 intersect with each other (the above mentioned "impact point").

Besides, impact determination is made according to the swing reference line q1 with consideration given to the case where the slide operation path 142 ends at a place that makes contact with the target ball 122 or ends within the ball 122, etc.

However, the method of impact determination is not limited to the one shown in FIG. 15 (A), and may be any other one. For example, the determination may be made according to the distance between the central coordinates of the target ball 122 and the impact point (the point at which the swing reference line q1 and the straight line q2 intersects). Also, in the example of FIG. 15 (B), the impact determination area 1220 is fixedly set on the impact line 124 (the line segment q2), and the impact determination is made according to an area that lie on the swing reference line q1 and through which a line segment (or straight line) q3 drooped to the impact line 124 from a midpoint between the first coordinates kn and the second coordinates km passes. In this case, determined as impact point is a point of intersection of the straight line q3 and the impact determination area 1220 (impact line 124).

For example, if it is determined that the impact is within the good shot area (I), the ball 106 flies straight toward the target (predicted landing point) (the above mentioned launch direction and side-spin value are not corrected). That is, a straight ball flies off straight as it is. Also, in the case of a draw ball or fade ball, the ball 106 is given a spin in advance but causes no displacement from the target. That is, a curve such as a hook and a slice does not take place.

Additionally, if it is determined that the impact is within the push ball area (II), the ball 106 is hit rightward with respect to the target. More specifically, the above described launch direction is corrected so as to be the right horizontal direction, and/or the side-spin value is corrected so that the ball 106 curves to the right. Also, in this case, as a place in the determination area 1220 through which the slide operation path 142 passes shifts leftward from the center (the center of the target ball 122), the launch angle to the right is made larger. On the other hand, if the slide operation path passes through the pull ball area (III), the ball 106 is hit to the left with regard to the target. More specifically, the above mentioned launch direction is corrected so as to be the left horizontal direction, and/or the side-spin value is corrected so that the ball 106 curves to the left. Additionally, as a place in the determination area 1220 through which the slide operation path 142 passes shifts rightward from the center (the center of the target ball 122), the launch angle to the left is made larger.

Moreover, if it is determined that the impact is within the missed shot area (IV), the shot may become a shank (the ball 106 is hit against near the neck of the club face. In this case, the ball 106 flies sharply to the right.) or a weak grounder (a kind of missed shot. The ball 106 rolls over only slightly.) according to the hitting force (shot power value). Also, regardless of the shot power value, the shot may become a pop-up (a skied shot. This is also a missed shot and the ball 106 is popped up too high) at random. In the first embodiment, the shot becomes a shank if the shot power value is within a range of 40 to 100%, and becomes a weak grounder if the shot power is within a range of 0 to 39%.

In this manner, the player causes the player character 102 to hit the ball 106 by performing a slide operation, and then impact determination is made by means of the determination area 1220 provided in correspondence with the target ball 122, on the basis of the slide operation path 142. Thus, the game difficulty level (the game level or the difficulty level of the ball 106) can be changed by altering the size of the target ball 122. In addition, the size of the determination area 1220 is adjusted according to the size of the target ball 122. Besides, the different-sized images of the target ball 122 may be stored in advance, or the size of the image may be changed by calculation. The same applies to area data for the determination area.

For example, as shown in FIG. 16 (A), if the size of the target ball 122 is large, it is relatively easy to let the target ball 122 pass and perform a slide operation in such a manner as to pass through the central area of the ball. That is, the game difficulty level is low. Also, as shown in FIG. 16 (B), if the target ball 122 is of medium size, the game difficulty level is medium. Moreover, as shown in FIG. 16 (C), if the target ball 122 is small in size, it is relatively hard to perform a slide operation on the target ball 122 and it is necessary to become skillful in performing a slide operation in such a manner as to pass through the central area of the target ball 122. That is, the game difficulty level is high. For example, it is possible to change the size of the target ball 122, that is, the size of the impact determination area 1220, according to the kind of the used club 104. Additionally, in advance of the start of a game, it is possible to allow the selection of the game difficulty level among "Practice (game difficulty level: low)", "Amateur (game difficulty level: medium)" and "Professional (game difficulty level: high)", and change the size of the target ball 122 according to the selected game difficulty level. Furthermore, it is possible to decide (set) the game difficulty level during a game according to the progress of the game, and change the size of the target ball 122 according to the set game difficulty level. For example, under such a situation where the ball 106 is in a deep rough, the game difficulty level is set higher in the case of selecting a wood club than in the case of selecting an iron club.

Besides, in FIG. 16 (A) to FIG. 16 (C), the size of the target ball 122 is expressed as large, medium and small, and the game difficulty level is presented as high, medium and low. These are the relative sizes of the target ball 122 and the relative game difficulty levels in three illustrated kinds of situations. Also, the size of the target ball 122 is here changed in three stages so that the game difficulty level can be set in three stages. It is acceptable to alter the size of the target ball 122 at least in two stages or more in order to change the game difficulty level.

Alternatively, it is possible to alter the game difficulty level by making a change to the size ratio among the areas within the impact determination area 1220, without having to change the size of the target ball 122. As shown in FIG. 17 (A), for example, if the good shot area (I) is enlarged, it becomes easy to make an impact but difficult to achieve a long carry of the ball 106. Also, as shown in FIG. 17 (B), if the push shot area (II) and the pull shot area (III) are made larger, it becomes easy to put a curve in the ball 106. Moreover, as shown in FIG. 17 (C), if the missed shot area (IV) is made larger, it becomes hard to make an impact but easy to achieve a long carry of the ball 106.

Besides, FIG. 17 (A) to FIG. 17 (C) show just examples and the methods for changing the game difficulty are not limited to them. In order to further lower the game difficulty level, for example, it is conceivable to eliminate the missed shot area (IV) and make the good shot area (I) larger than shown in FIG. 17 (A).

As described above, the game difficulty level can be changed by changing the size of the target ball 122 or the size ratio among the areas provided within the determination area 1220. These settings can be made by the player or automatically, depending on the progress of a game or the level of the player or the player character 102.

Figure 18:
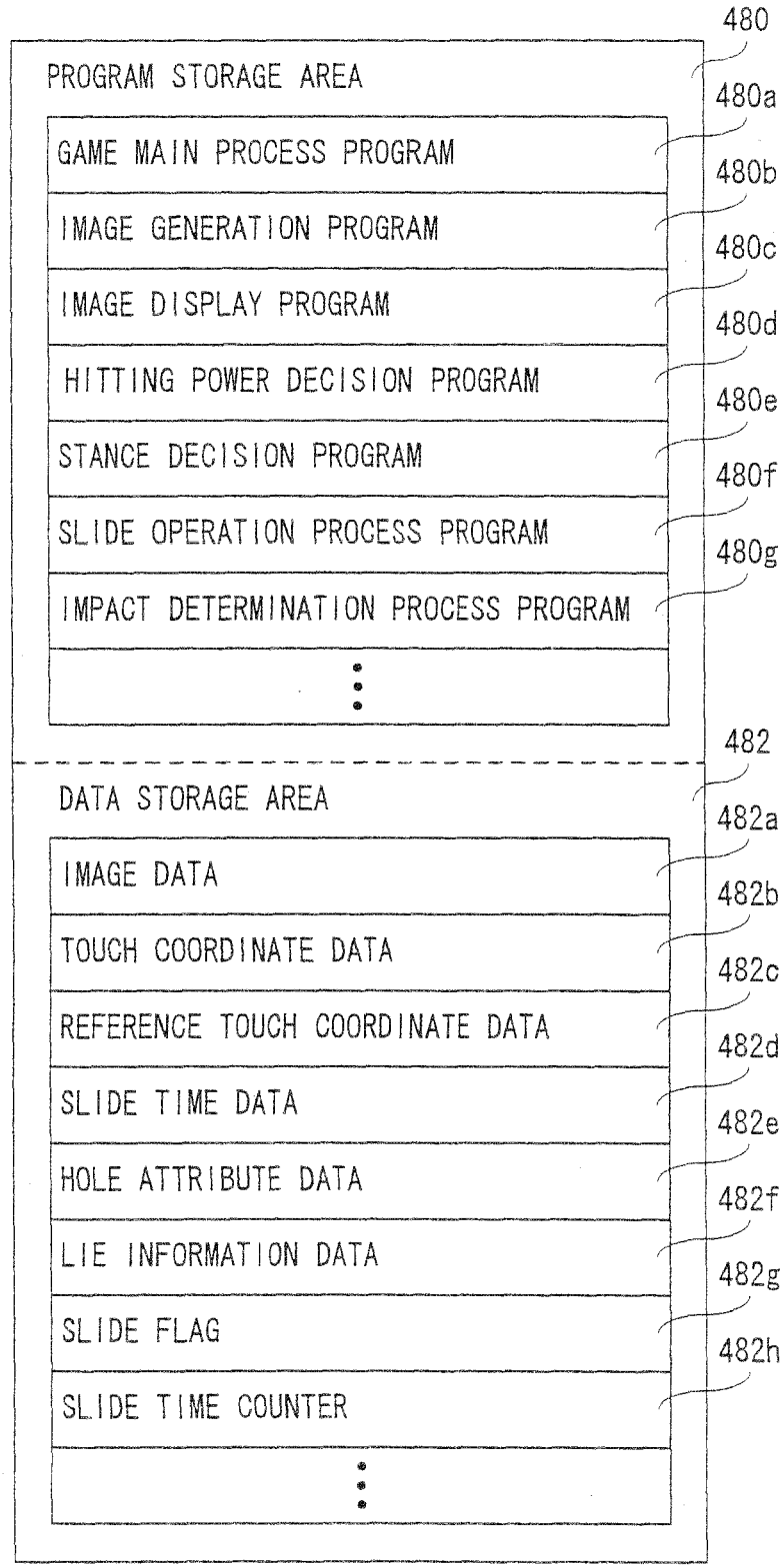
FIG. 18 is an illustrative view showing an example of a memory map of a RAM contained in the game apparatus shown in FIG. 2.

FIG. 18 is an illustrative view showing one example of a memory map of the RAM 48 shown in FIG. 2. Referring to FIG. 18, the RAM 48 includes a program storage area 480 and a data storage area 482. The program storage area 480 stores game programs (including a hitting process program) that composed of a game main process program 480a, an image generation program 480b, an image display program 480c, a hitting force decision program 480d, a stance decision program 480e, a slide operation process program 480f, an impact determination process program 480g, etc.

The game main process program 480a is a program for processing a main routine of a virtual game (a golf game in this embodiment). The image generation program 480b is a program for generating a game image corresponding to each of the game screen 100 and the game screen 120 by means of image data 482a described later. The image display program 480c is a program for displaying on the LCD 12 or the LCD 14 the game image generated according to the image generation program 480b. This program also displays motion (animation) of a game character, and displays (expresses) a screen effect (presentation) as required.

The hitting force decision program 480d is a program for deciding the hitting force of the player character 102 according to the touch coordinates based on the player's touch input. The stance decision program 480e is a program for deciding the stance of the player character 102 according to the touch coordinates based on the player's touch input. The slide operation process program 480f is a program for detecting the player's slide operation and causing the player character 102 to make a swing according to the detected slide operation, that is, to hit the ball 106. As stated above, however, if the player's slide operation does not go beyond the impact line 124, the virtual extended slide operation path 142 is calculated. Also, if the speed of a slide operation is lower than a specific value (including the stopped sate) or if the direction of a slide operation is opposite to the position in which the target ball 122 is displayed, a slide operation is performed from the beginning again. The impact determination process program 480g is a program for determining an impact according to the path 142 of the player's slide operation. More specifically, as described above, it is determined whether the shot is a good shot, push shot, pull shot or missed shot, depending on through which area of the determination area 1220 the path 142 of the player's slide operation has passed. In the case of the missed shot, it is further determined whether it is a shank, weak grounder, or pop-up.

Besides, although not illustrated, the program storage area 480 also stores a sound reproduction program, a backup program, etc. The sound reproduction program is a program for reproducing (outputting) sounds required for the game such as game music (BGM), sounds (sound effects) and voices (imitation voices). The backup program is a program for storing (saving) game data (in-progress data, result data) on the memory card 28 according to a predetermined event or under an instruction from the player.

Additionally, the data storage area 482 stores image data 482a, touch coordinate data 482b, reference touch coordinate data 482c, swing time data 482d, hole attribute data 482e, lie information data 482f, etc., and also stores landform data for a virtual space of golf course.

The image data 482a is data for generating images (polygon data, texture data, etc.) of the player character 102, other characters such as the club 104 and the ball 106, background objects such as courses and holes. It also includes target ball image data, etc. for displaying the game image 120. The touch coordinate data 482b is coordinate data input from the touch panel 22 in response to the player's touch input, and is stored (temporarily) as a plurality of pieces of coordinate data input during the time from touch-on to touch-off. The touch coordinate data 482b is used in performing a hitting process described later (see FIG. 19 to FIG. 23), and is erased at the end of the hitting operation. The reference touch coordinate data 482c is coordinate data as a reference for calculating the slide speed, and is updated during the hitting process.

The slide operation time data 482d is data (numerical data) on the time between the start of a slide operation (touch-on) and the end of the slide operation (touch-off). The hole attribute data 482e is data (or flag) on attributes such as weather conditions (fair, cloudy, rainy, etc.) and wind (direction and strength) at the hole in play. The lie information data 482f is data on information indicative of the position (place) in which the ball 106 stands still at the hole and the state of the position of the ball 106. More specifically, the data applies to the information that indicates at what place the ball 106 stands still, fairway, rough, banker or water hazard, or the information that shows how deep the ball 106 is buried at the rough or the banker.

In addition, the data storage area 482 is provided with a slide flag 482g and a slide time counter 482h. The slide flag 482g is a flag for determining whether a slide operation (swing operation) is being performed or not. If the slide operation is being performed, the slide flag 482g is turned on (established). On the other hand, if no slide operation is being performed, the slide flag 482g is turned off (not established). The slide flag 482g consists of a one-bit register, for example. When it is turned on, a data value of the register is set to "1". When it is turned off, a data value of the register is set to "0". The slide time counter 482h is a counter (timer) for counting the time of a slide operation. When the slide flag 482g is turned on, the counter starts counting (it is reset and started). When the slide flag 482g is turned off, the counter ends the counting.

Besides, although not illustrated, the data storage area 482 also stores sound data, and other game data and flags that are generated during the game.

More specifically, the CPU core 42 shown in FIG. 2 performs a hitting process according to the flowchart provided in FIG. 19 to FIG. 23. Although not illustrated, the hitting process shown in FIG. 19 to FIG. 23 is a sub routine included in the main routine for the golf game. In the main routine, as well as the hitting process, an image generation process, image display process, sound reproduction process, backup process, game end process, etc. are carried out. Additionally, as aforesaid, the processes related to shot inputs include a club selection input, a shot direction input, a vertical spin value input, a shot type input, etc. in addition to the hitting operation process. The hitting process described in FIG. 19 to FIG. 23 refers to only the process related to a hitting operation.

Figure 19:
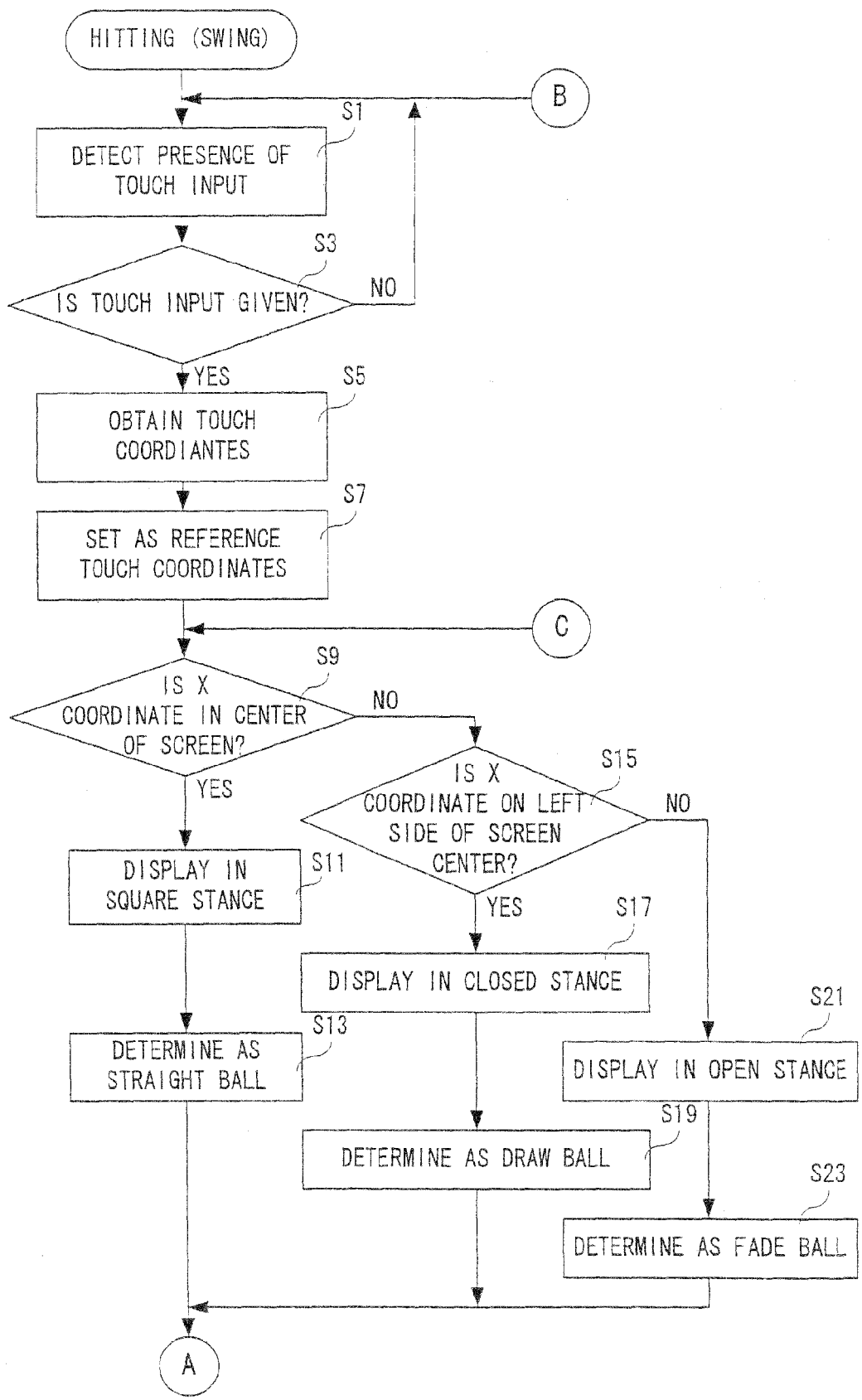
FIG. 19 is a flowchart showing a part of a hitting process by a CPU core shown in the FIG. 2.

Referring to FIG. 19, after starting a hitting process, the CPU core 42 detects the presence of a touch input in a step S1. That is, it detects the presence of a coordinate data input from the touch panel 22. In a succeeding step S3, it is determined whether a touch input is given or not. That is, it is determined whether or not coordinate data is input from the touch panel 22. If "NO" in the step S3, that is, if no coordinate data is input, it is concluded that no touch input is given, and the process returns directly to the step S1. Touch input is detected for each frame (S1). Also, input detection may be done a number of times in one frame.

On the other hand, if "YES" in the step S3, that is, if some coordinate data is input, it is concluded that a touch input is given, and the touch coordinates are obtained in a step S5. More specifically, the detected coordinate data is stored in the data storage area 482. In a succeeding step S7, the touch coordinates detected in the step S5 is set as reference touch coordinates. More specifically, the coordinate data detected in the step S5 is stored (copied) as reference coordinate data 482c in the data storage area 482.

Subsequently, in a step S9, it is determined whether or not an X coordinate of the touch coordinates (reference touch coordinates) detected in the step S5 is positioned in the center of the screen (game screen 120). That is, it is determined whether or not the X coordinate of the touch coordinates falls within the width of the target ball 122. If "YES" in the step S9, that is, if the X coordinate of the touch coordinates is positioned in the center of the screen, the player character 102 is displayed in a square stance in a step S11, the path of the ball 106 is determined as straight in a step S13, and the process goes to a step S25 shown in FIG. 20.

On the other hand, if "NO" in the step 9, that is, if the X coordinate of the touch coordinates is not in the center of the screen, it is determined in a step S15 whether or not the X coordinate of the touch coordinates is on the left side of center (left-of-center position) of the screen. If "YES" in the step S15, that is, if the X coordinate of the touch coordinates is on the left side of center of the screen, the player character 102 is displayed in a closed stance in a step S17, the path of the ball 106 is determined as draw in a step S19, and the process moves to the step S25. However, if "NO" in the step 15, that is, if the X coordinate of the touch coordinates is on the right side of center (right-of-center position) of the screen, the player character 102 is displayed in an open stance in a step S21, the path of the ball 106 is determined as fade in a step S23, and the process goes to the step S25.

As stated above, in the steps S9 to S23, the stance of the player character 102 is decided and also the path of the ball 106 to be hit is decided, on the basis of the X coordinate of the touch coordinates.

Figure 20:
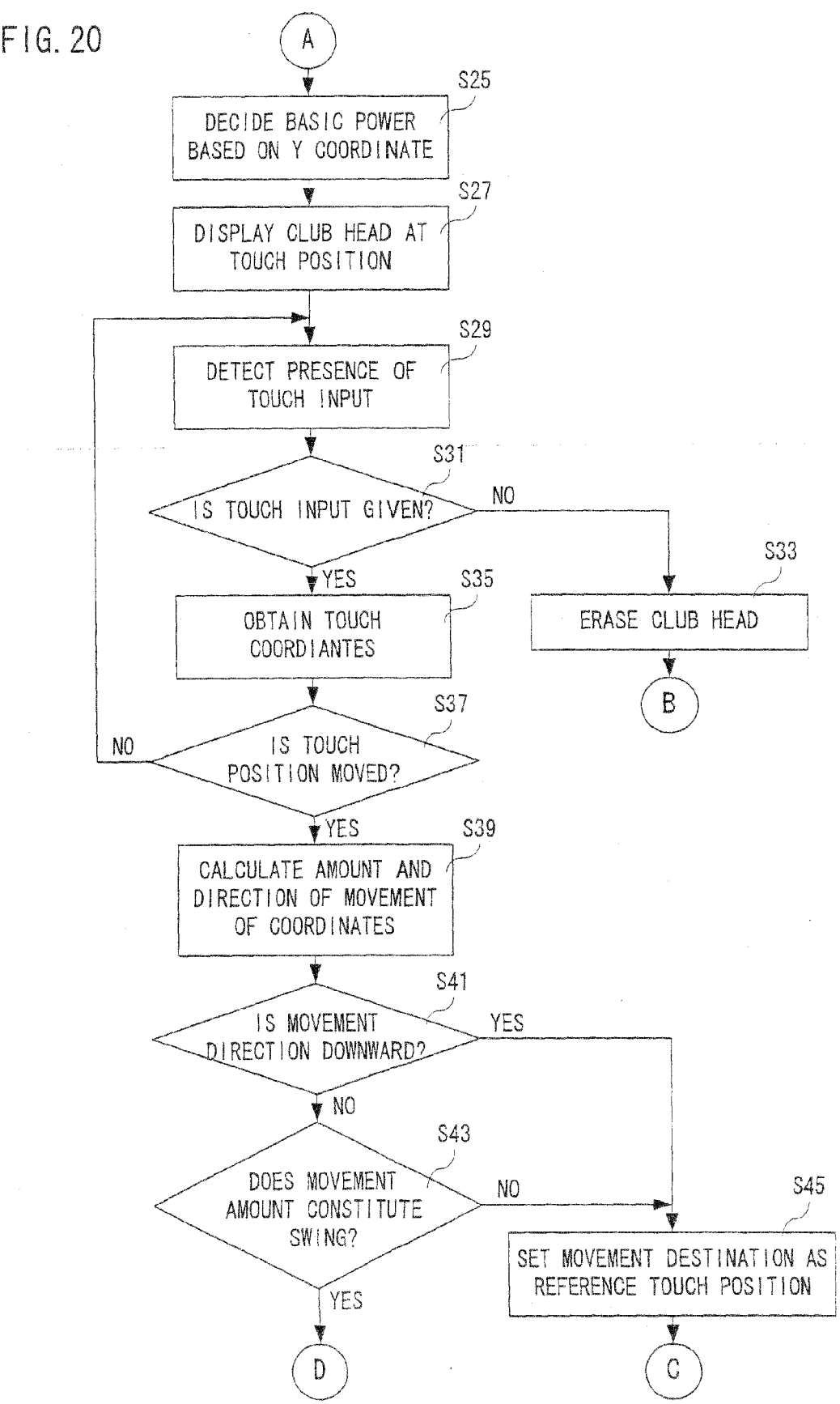
FIG. 20 is a flowchart showing another part of the shooting process by the CPU core shown in the FIG. 2 and continued from FIG. 19.

As shown in FIG. 20, in the step S25, the basic power (hitting force) is determined on the basis of a Y coordinate of the touch coordinates (reference touch coordinates). In a succeeding step S27, the club head image 128 is displayed at the touch position. At this time, in the square stance, the club face is displayed in such a manner as to front on at the target ball 122. Also, in the closed stance, the club face is displayed in such a manner as to front on at the target ball 122. Moreover, in the open stance, the club face is displayed in such a manner as to front on at the target ball 122.

Touch input is detected in a succeeding step S29, and it is determined in a step S31 whether any touch input is given or not. If "NO" in the step S31, that is, if no touch input is given, the club head image 128 is erased in a step S33, and the process returns to the step S1 shown in FIG. 19 to wait for resetting of the hitting force and the stance. That is, a slide operation is started from the beginning again. On the other hand, if "YES" in the step S31, that is, if a touch input is given, the touch coordinates are obtained in a step S35. Then, it is determined in a step S37 whether the touch position is moved or not. Additionally, it is determined here whether or not the touch position is moved by a specific distance (3 to 5 dots, for example) or more as compared with the previously detected touch position, in order to prevent the movement in the touch position due to a shake in the hand from being determined as a slide operation (swing operation) by mistake.

If "NO" in the step S37, that is, if the touch position is not moved, it is concluded that this is not a slide operation, and the process returns to the step S29. On the other hand, if "YES" in the step S37, that is, if the touch position is moved, it is concluded that this is a slide operation, and the amount of movement (difference) of the coordinates and the direction of the movement are calculated in a step S39.

In a succeeding step S41, it is determined whether the movement direction is downward or not. More specifically, it is determined whether or not the direction of the slide operation (movement direction) is opposite to the direction in which the target ball 122 is displayed. That is, it is determined whether or not the Y coordinate of the touch position after the movement is larger than the Y coordinate of the touch position before the movement. If "YES" in the step S41, that is, if the movement direction is downward, it is concluded that a slide operation is to be started from the beginning again, and the process proceeds to a step S45. On the other hand, if "NO" in the step S41, that is, if the movement direction is not downward, it is determined in a step S43 whether or not the amount of the movement constitutes a swing. More specifically, it is determined whether or not the distance (difference) between the coordinates of the sequential frames is equal to or more than a specific value. In other words, it is determined whether or not this is an operation for the player character 102 to make a swing, depending on whether or not the slide speed is equal to or more than a specific value.

Figure 21:
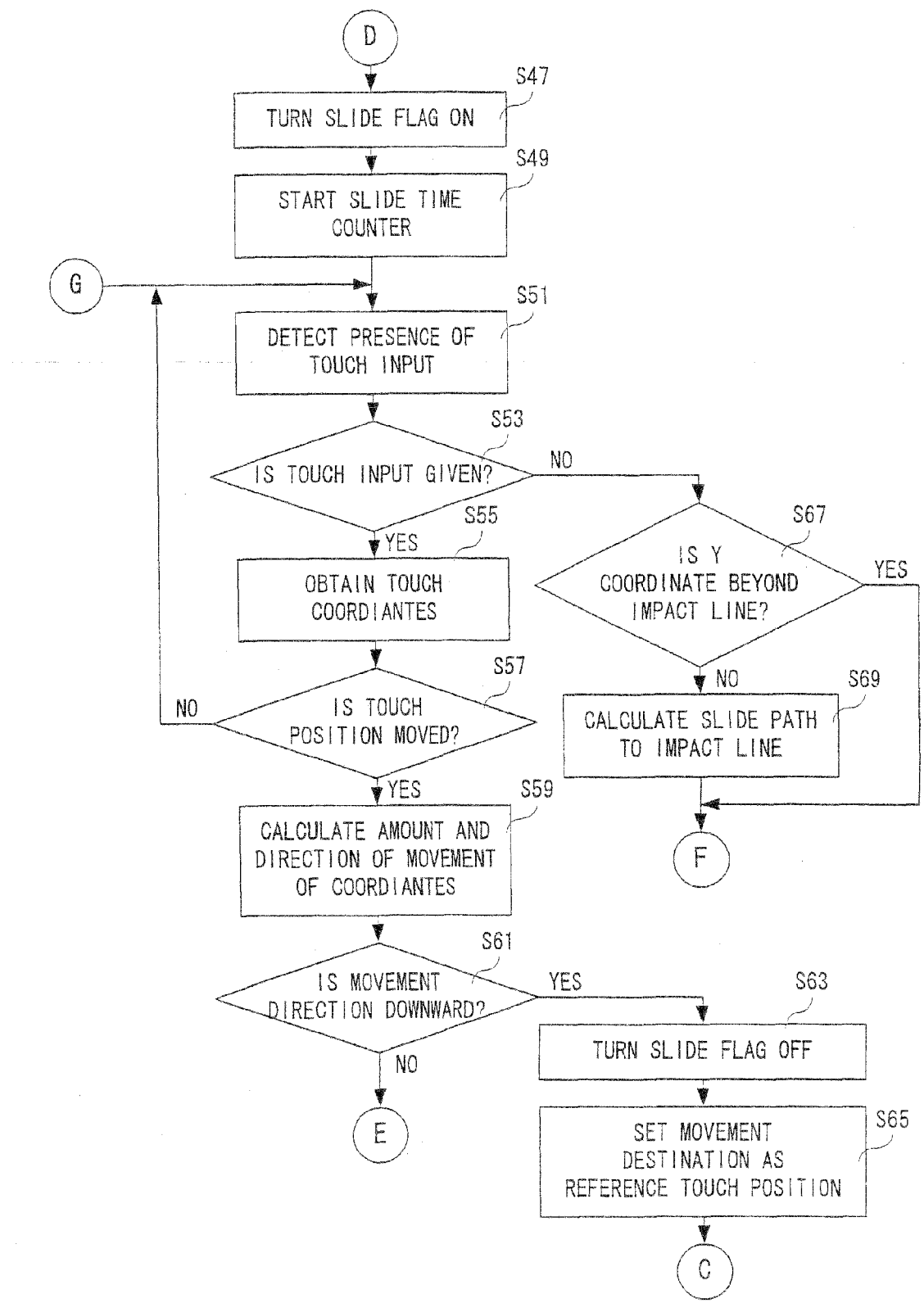
FIG. 21 is a flowchart showing still another part of the shooting process by the CPU core shown in the FIG. 2 and continued from FIG. 20.

If "YES" in the step S43, that is, if the amount of the movement constitutes a swing, the process goes to a step S47 shown in FIG. 21. However, if "NO" in the step S43, that is, if the amount of the movement does not constitute a swing, it is concluded in the step S45 that the movement destination is a reference touch position (reference touch position data 482c), and the process returns to the step S9 shown in FIG. 19. That is, if the slide operation is not for making a swing, it is concluded that a slide operation is to be performed from the beginning again, and the stance and the hitting force are set again on the basis of the touch position of the movement destination (after the movement).

As shown in FIG. 21, the slide flag 482g is turned on in the step S47. The slide time counter 482h is started in a succeeding step S49, and it is detected whether or not any touch input is given in a step S51. Subsequently, in a step S53, it is determined whether any touch input is given or not. If "NO" in a step S53, that is, if no touch input is given, the process goes to a step S65. On the other hand, if "YES" in the step S53, that is, if a touch input is give, touch coordinates are obtained in a step S55. Then, it is determined in a step S57 whether the touch position is moved or not. If "NO" in the step S57, that is, if the touch position is not moved, the process returns directly to the step S51.

However, if "YES" in the step S57, that is, if the touch position is moved, the amount and direction of movement of the coordinates are calculated in a step S59, and it is determined in a step S61 whether the movement direction is downward or not. If "NO" in the step S61, that is, if the movement direction is not downward, the process proceeds to a step S71 shown in FIG. 22. On the other hand, if "YES" in the step S61, that is, if the movement direction is downward, the slide flag 482g is turned off in a step S63, the touch coordinates at the movement destination is determined as a reference touch position in a step S65, and the process returns to the step S9 shown in FIG. 19.

On the contrary, if "NO" in the step S53, that is, if no touch input is given (when touch-off is performed), it is determined in a step S67 whether or not the Y coordinate of the last detected touch coordinates is beyond the impact line 124. Although not illustrated, it is also determined here whether or not the Y coordinate of the touch coordinates have made contact with the target ball 122 without going beyond the impact line 124. The same applies to a step S71 described later. If "YES" in the step S67, that is, if the Y coordinate of the last detected touch coordinates is beyond the impact line 124, the process goes directly to a step S75 shown in FIG. 22. On the other hand, if "NO" in the step S67, that is, if the Y coordinate of the last detected touch coordinates is not beyond the impact line 124, the slide operation path 142 to the impact line 124 is calculated in a step S69, and the process proceeds to the step S75.

In the first embodiment, when the slide path 142 to the impact line 124 is calculated in the step S69, the process goes to the step S75 for the sake of simplicity. Actually, as stated above, after the speed of the slide operation is calculated, it may be determined whether or not to start a slide operation from the beginning again, depending on the speed of the slide operation.

Figure 22:
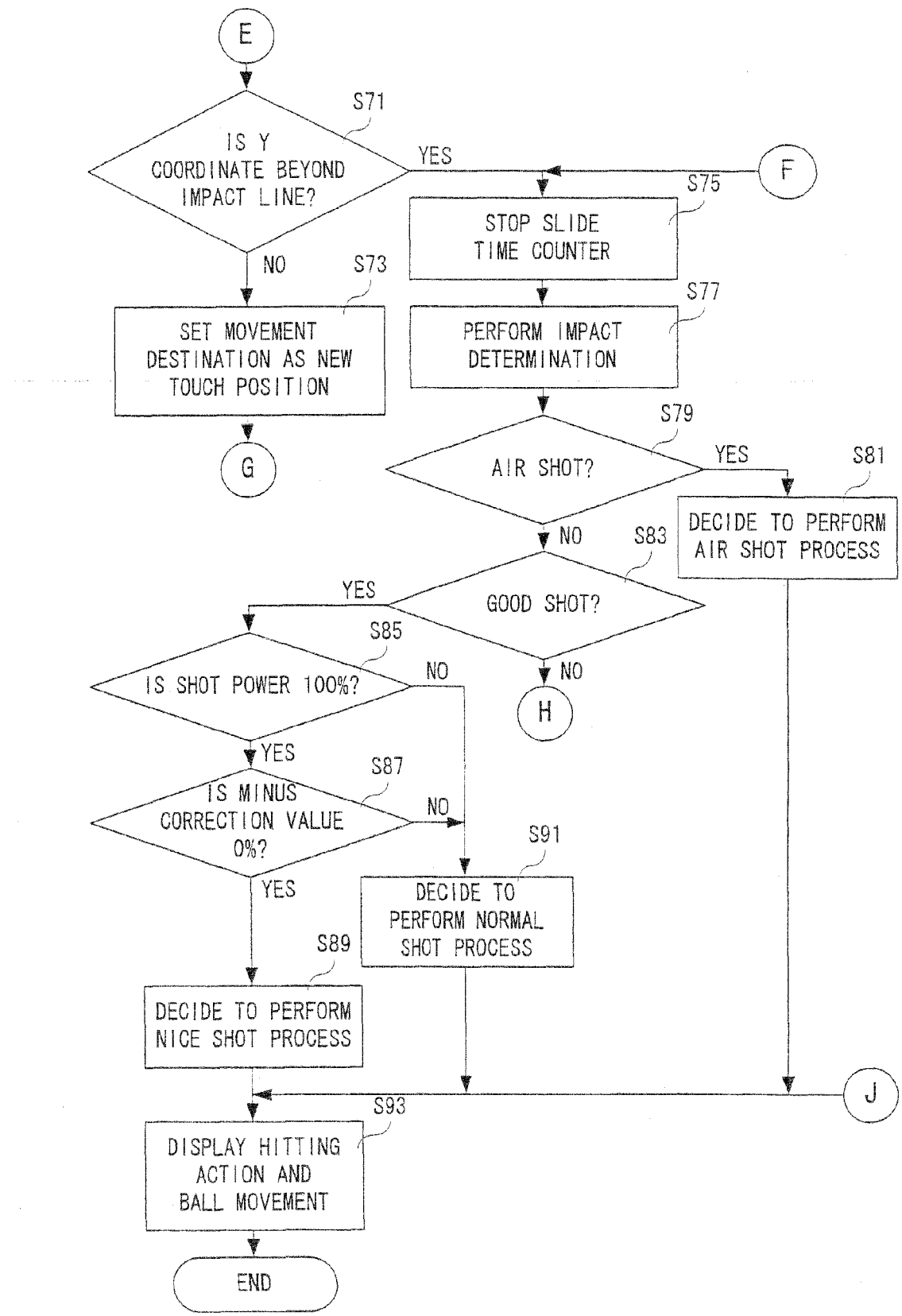
FIG. 22 is a flowchart showing further another part of the shooting process by the CPU core shown in the FIG. 2 and continued from FIG. 21.

As shown in FIG. 22, it is determined in the step 71 whether or not the Y coordinate of the last detected touch coordinates is beyond the impact line 124. If "NO" in the step S71, that is, if the Y coordinate of the last detected (in the step S55) touch coordinates is not beyond the impact line 124, it is concluded that the slide operation is ongoing, the touch coordinates (touch position) is determined as a new touch position in a step S73, and the process returns to the step S51. In this case, it is detected in the step S51 whether or not a touch input is given for the next frame.

However, if "YES" in the step S71, that is, if the Y coordinate of the last detected touch coordinates is beyond the impact line 124, or if the last detected touch coordinates are in contact with the target ball 122, the slide time counter 482h is stopped in a step S75. A count value of the slide time counter 482h is the above mentioned swing time correction value T that is used for calculation of the carry F. Subsequently, impact determination is carried out in a step S77. More specifically, impact determination is performed by detecting whether or not the slide operation path has passed through the target ball 122, and, if the slide operation path has passed through the target ball 122, detecting which area within the determination area 1220 the path has passed through.

In a succeeding step S79, it is determined whether this is an air shot or not. That is, it is determined whether the slide operation path has not passed through the target ball 122. If "YES" in the step S79, that is, if the slide operation path has not passed through the target ball 122, this is concluded to be an air shot. It is thus decided to perform an air shot process in a step S81, the hitting action of the player character 102 and the movement of the ball 106 are displayed in a step S93, and then the hitting process is terminated. For example, when it is decided to perform an air shot process, the game screen 100 shows an animation in which the player character 102 starts a swing and makes an air shot. As described above, a swing operation of the player character 102 is started after a decision is made on how a hit will be performed. This allows the player to perform a hitting operation (slide operation) using the game screen 120 and then check how the ball 106 moves, watching the game screen 100. The same applies to the cases described below. However, in the case of an air shot process, the ball 106 makes no move.

However, if "NO" in the step S79, that is, if the slide operation path has passed through the target ball 122, it is determined in a step S83 whether or not the impact is concluded to constitute a good shot. If "NO" in the step S83, that is, if the impact is not concluded to constitute a good shot, the process goes to a step S95 shown in FIG. 23. However, if "YES" in the step S83, that is, the impact is concluded to constitute a good shot, it is determined in a step S85 whether the shot power (hitting force) is 100% or not.

If "NO" in the step S85, that is, if the shot power is not 100%, it is decided in a step S91 to perform a normal shot process, and the process goes to a step S93. In this case, in the step S93, an animation is displayed in which the player character 102 makes a swing according to the stance and hits the ball 106 is displayed, and then an animation is displayed in which the ball 106 moves (flies, bounces, rolls, and stops) with a path according to the stance. In addition, the carry F of the ball 106 is calculated according to the equation 1. The same applied to the cases described below. On the other hand, if "YES" is a step S85, that is, if the shot power is 100%, it is determined in a step S87 whether a minus correction value (the swing time correction value T and the lie correction value L in the first embodiment) is 0% or not. If "NO" in the step S87, that is, if the minus correction value is not 0%, the process proceeds to the step S91.

Besides, in calculating the carry F with consideration given to the correction value related to swing speed (included in the correction value α), it is also determined whether the correction value related to swing speed is 0% or not, as well as the swing time correction value T and the lie correction value L.

On the other hand, if "YES" in the step S87, that is, if the minus correction value is 0%, it is decided in a step S89 to perform a nice shot process, and the process moves to the step S93. In this case, in the step S93, an animation is displayed in which the player character 102 makes a swing according to the stance and hits the ball 106, as in the case of the above described normal shot process, and after that, an animation is displayed in which the ball 106 moves with a path according to the stance, for example. Additionally, in expressing a nice shot, sound effects are used, the movement of the ball 106 is displayed in a showy manner, and the phrase "a nice shot" is presented in text. It is acceptable to use at least one of these expressive forms or to use a combination of two or more thereof.

Figure 23:
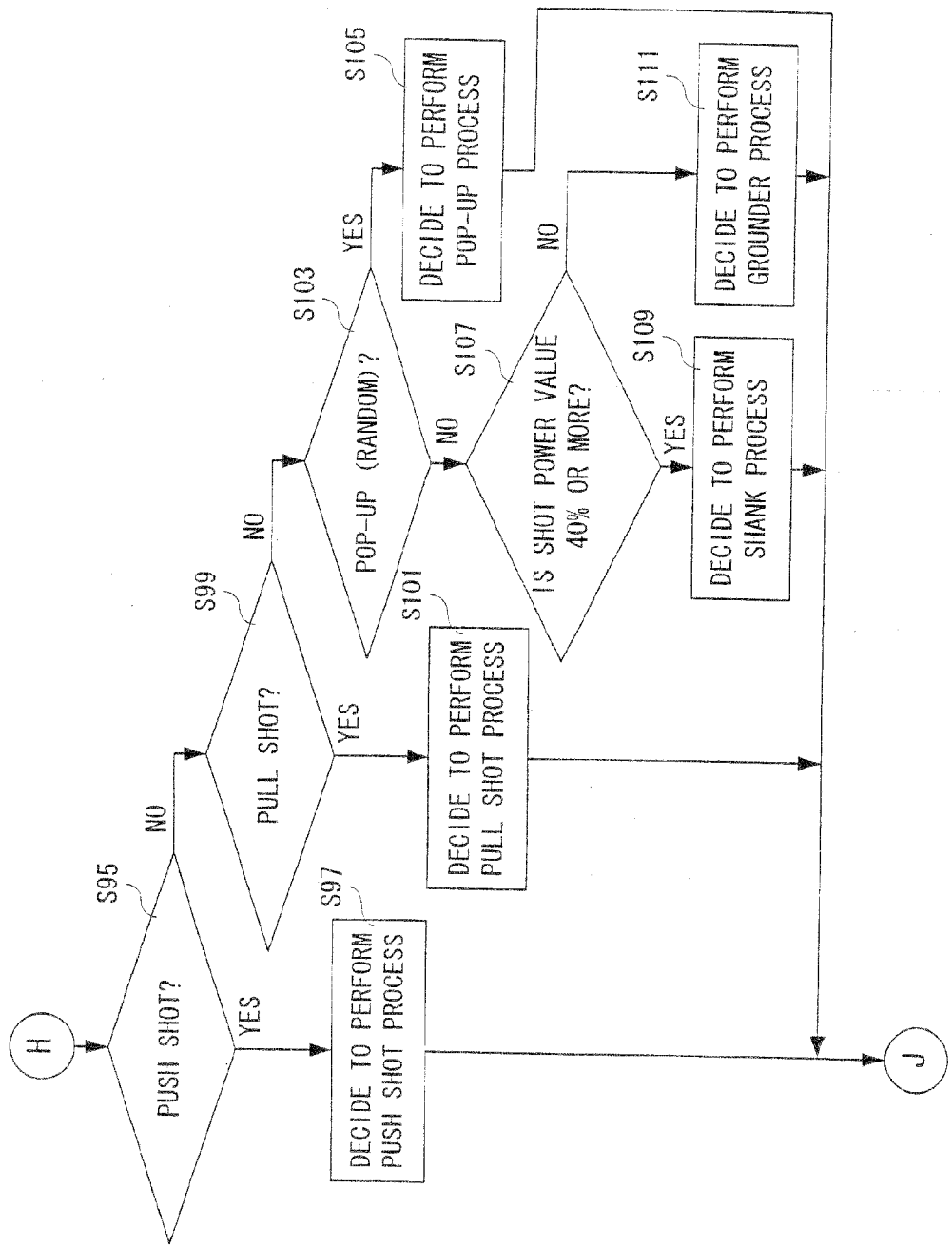
FIG. 23 is a flowchart showing another part of the shooting process by the CPU core shown in the FIG. 2 and continued from FIG. 22.

Referring to FIG. 23, it is determined in a step S95 whether or not the impact is concluded to constitute a push shot. If "YES" in the step S95, that is, if the impact is concluded to constitute a push shot, it is decided in a step S97 to perform a push shot process, and the process returns to the step S93 as shown in FIG. 22. In this case, in the step S93, an animation is displayed in which the player character 102 makes a swing and hits the ball 106, as in the case of the above mentioned normal shot process, and after that, an animation is displayed in which the ball 106 flies off with a path according to the stance and then slices after making a flight a certain distance, for example. In addition, the amount of the slice is determined according to the distance between the center of the determination area 1220 and the place through which the slide operation path passes, as described above.

On the other hand, if "NO" in the step S95, that is, if the impact is not concluded to constitute a push shot, it is determined in a step S99 whether or not the impact is concluded to constitute a pull shot. If "YES" in the step S99, that is, if the impact is concluded to constitute a pull shot, it is decided in a step S101 to perform a pull shot process, and the process returns to the step S93. In this case, in the step S93, an animation is displayed in which the player character 102 makes a swing and hits the ball 106, as in the case of the above mentioned normal shot process, and after that, an animation is displayed in which the ball 106 flies off with a path according to the stance and then hooks after making a flight a certain distance, for example. In addition, the amount of the hook is determined according to the distance between the center of the determination area 1220 and the place through which the slide operation path passes, as described above.

However, if "NO" in the step S99, that is, if the impact is not concluded to constitute a pull shot, it is determined in a step S103 whether this is a pop-up or not. That is, it is determined whether or not the impact is concluded to constitute a missed shot and this is concluded to be a pop-up at random. If "YES" in the step S103, that is, if the missed shot is concluded to be a pop-up, it is decided in a step S105 to perform a pop-up process, and the process proceeds to the step S93. In this case, in the step S93, an animation is displayed in which the player character 102 makes a swing and hits the ball 106, as in the case of the above mentioned normal shot process, and after that, an animation is displayed in which the ball 106 moves with an ultra-high path, for example. In this case, however, the carry is made shorter than that in the case of a normal shot, even if the shot powers are the same.

On the other hand, if "NO" in the step S103, that is, if the missed shot is not concluded to be a pop-up, it is determined in a step S107 whether or not the impact is concluded to constitute a missed shot and the basic power value (hitting force) is 40% or more. If "YES" in the step S107, that is, the impact is concluded to constitute a missed shot and the basic power value is 40% or more, it is decided in a step S109 to perform a shank process, and the process goes to the step S93. In this case, in the step S93, an animation is displayed in which the player character 102 makes a swing and hits the ball 106, as in the case of the above mentioned normal shot process, and after that, an animation is displayed in which the ball 106 flies off sharply to the right, for example. In contrast, if "NO" in the step S107, that is, if the impact is concluded to constitute a missed shot and the basic power value is less than 40%, it is decided in a step S111 to perform a weak grounder process, and the process goes to the step S93. In this case, in the step S93, an animation is displayed in which the player character 102 makes a swing and hits the ball 106, as in the case of the above mentioned normal shot process, and after that, an animation is displayed in which the hit ball 106 rolls (flies) a little, for example.

According to the first embodiment, it is possible to cause the player character to hit the ball by performing a slide operation in such a manner as to hit the ball displayed on the LCD provided with the touch panel. This makes it possible to perform an easy and intuitive operation.

Also, in the first embodiment, by means of the touch-on coordinates, it is possible to decide the stance and hitting force of the player character, that is, it is possible to decide the carry and path of the ball. In addition, the impact is determined by performing a slide operation, and the result of the determination affects the trajectory of the ball. This allows the player to feel as if actually playing golf and enjoy a realistic game.

As for the first embodiment, a description is given for the case where two game screens are displayed on two LCDs. Alternatively, it is possible to provide a single LCD and a touch panel corresponding to that, and display one game screen on the LCD. In this case, for example, it is possible to display the game screen 120 described in relation to the embodiment until a hitting operation is completed, and then display the game screen 100 described in relation to the embodiment upon completion of the hitting operation.

Also, regarding the first embodiment, a description is given as to a game apparatus provided with two LCDs. Alternatively, it is possible to split the display area of a single LCD in two and provide a touch panel corresponding to at least one of the display areas. In this case, for a portrait-oriented LCD, the display area of the LCD may be split in such a manner that two split display areas are vertically aligned. For a landscape-oriented LCD, the display area of the LCD may be split in such a manner that two split display areas are horizontally aligned.

Moreover, the first embodiment uses a pointing device such as a touch panel, but the pointing device is not limited to this. Touch pads used for lap-top PCs, pen tablets, computer mouse are also applicable for this purpose. In using a computer mouse, mouse button operations can be associated with the touch operations.

Furthermore, in the first embodiment, the stance and the hitting force are decided on the basis of the touch-on coordinates. Alternatively, it is possible to decide at least one of the parameters. It is also possible to decide at least one of the parameters using one or two or more of the coordinates detected during the time between touch-on and touch-off. Besides, although the parameters are decided in the first embodiment on the basis of the elements of the orthogonal coordinates at the touch position. Alternatively, it is possible to decide the parameters based on the elements of the polar coordinates.

Figure 24:
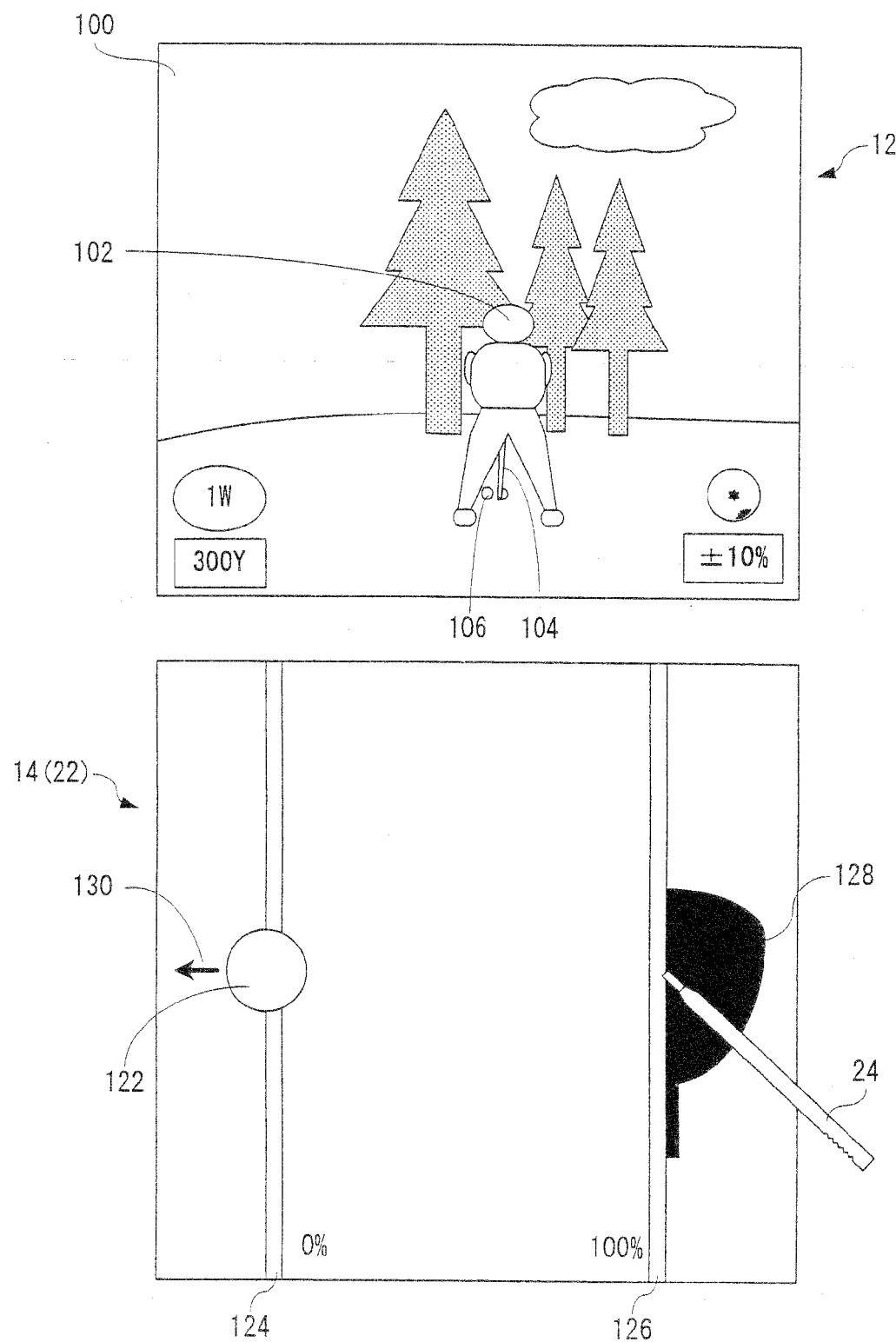
FIG. 24 is an illustrative view showing another example of game screen (operating screen) displayed on the second LCD provided in the game apparatus shown in FIG. 1.
Figure 25:
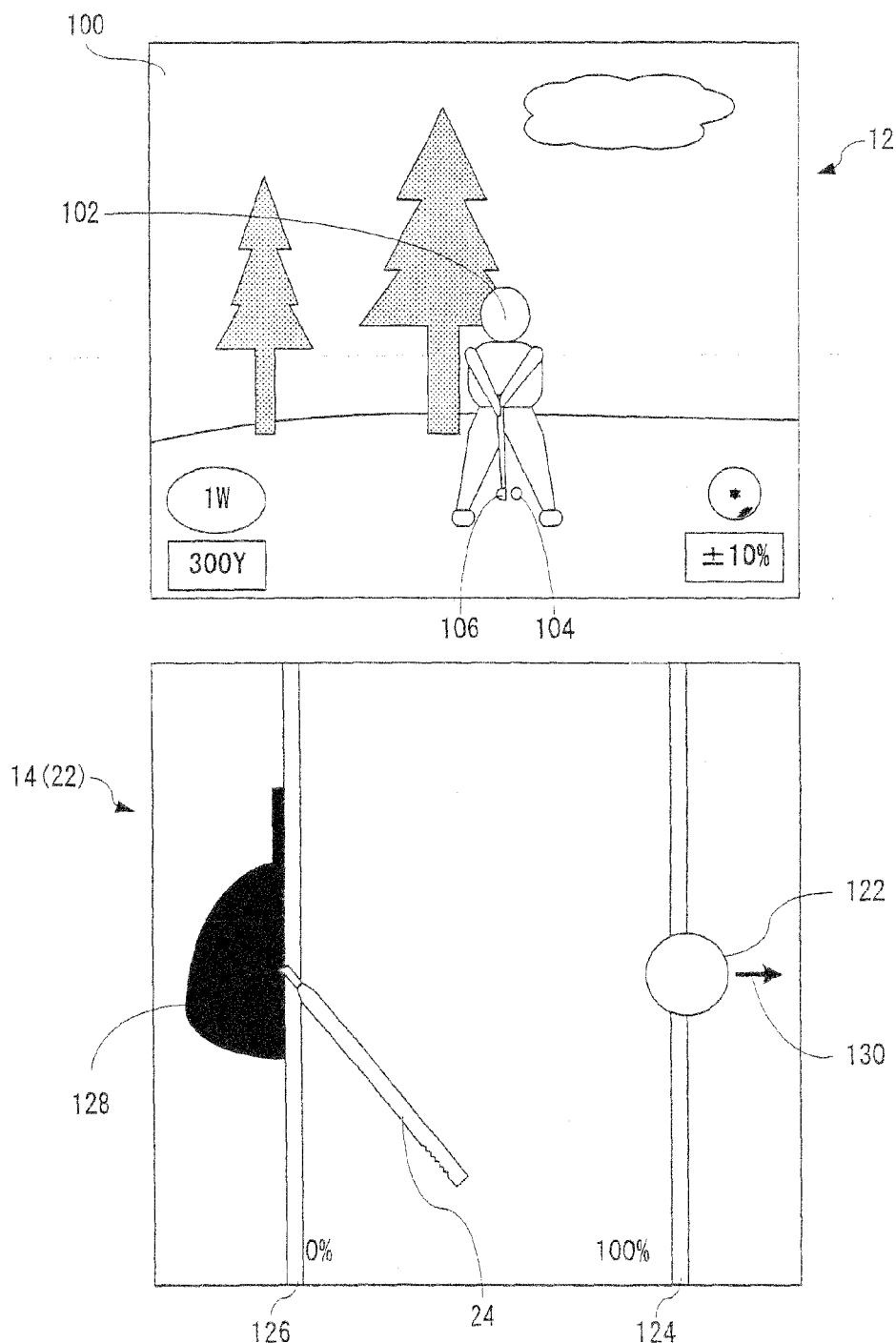
FIG. 25 is an illustrative view showing still another example of game screen (operating screen) displayed on the second LCD provided in the game apparatus shown in FIG. 1.

Additionally, the first embodiment makes it possible to cause the player character 102 to hit the ball 106 by performing a slide operation in a longitudinal direction (from the lower portion to the upper potion of the screen). It is also possible to cause the player character 102 to hit the ball 106 by performing a slide operation in a transverse direction (from left to right or from right to left). For example, it is possible to select the direction of a slide operation by displaying a button or icon for selecting the direction of a slide operation in the menu screen 200 and specifying (turning on) the button (icon). When the direction of a slide operation is decided, a flag of the corresponding slide operation direction (stored in the RAM 48, although not illustrated) is turned on, and the display of the game screen 120 is controlled on the basis of this flag. In this case, the game screen 100 and the game screen 120 as shown in FIG. 24 or FIG. 25 may be displayed. In the example of FIG. 24, the player causes the player character 102 to hit the ball by performing a slide operation from the right to left of the game screen 120. In this case, the game screen 100 on the LCD 12 displays the right-handed player character 102 in such a manner as to turn his back on the player. However, after the player character 102 has completed the hitting, the LCD 12 switches to the game screens 100 as shown in FIG. 7 to FIG. 9 in order to show the line of the ball in an easy-to-understand manner. The same applies to the case shown in FIG. 25. In the example of FIG. 25, the player causes the player character 102 to hit the ball by performing a slide operation from the left to right of the game screen 120. In this case, the game screen 100 on the LCD 12 displays the right-handed player character 102 in such a manner as to face the front of the player.

Image data for displaying the game screens 120 in FIG. 24 and FIG. 25 may be stored separately from image data for displaying the game screen 120 shown in FIG. 3, or may be generated by an arithmetic operation from the image data shown in FIG. 3. Also, data for defining the display area of the target ball and the positions, etc. of shot area, impact line and full shot line may be stored separately or may be generated by an arithmetic operation.

As stated above, in performing a slide operation in a transverse direction, the hitting force is decided on the basis of the X coordinate of the touch-on coordinates, and the stance is decided on the basis of the Y coordinate of the touch-on coordinates. Actually, in order to carry out the processes, etc. of calculating the hitting force and the stance in the same manner as in the case of performing a slide operation from bottom to top as shown in FIG. 3, etc., the coordinates of the touch input (touch input X coordinate and touch input Y coordinate) are subjected to a conversion. The equations for the conversion are provided as an equation 5 and an equation 6. The equation 5 is an equation for the case of making the player character 102 hit the ball by performing a slide operation from right to left, as shown in FIG. 24. The equation 6 is an equation for the case of making the player character 102 hit the ball by performing a slide operation from left to right, as shown in FIG. 25.

Touch input $X$ coordinate after conversion=192−touch input $Y$ coordinate+32

Touch input $Y$ coordinate after conversion=touch input $X$ coordinate−32 [Equation 5]

Touch input X coordinate after conversion=touch input Y coordinate+32

Touch input Y coordinate after conversion=192−touch input X coordinate+32 [Equation 6]

where "192" is the number of transversely aligned dots of the LCD 14, and "32" is the number of dots that is equivalent to the width of the menu screen (or icon and button) displayed in an area other than the shot area (1) and the impact area (4) of the game screen 120 (for example, the right or left side area), although not illustrated for the above mentioned first embodiment. These values are taken into consideration in carrying out a coordinate conversion.

Moreover, with regard to the first embodiment, the examples of the game screen 120 for playing a golf game are provided and the methods for operating the screens are described. However, the game screens and the methods for operating them are not limited to the above described ones. Examples of the game screen 120 displayed at other games are shown and described below. For the sake of simplicity, the same items and components as those of the game screens 120 in the above described embodiment are given the same reference numerals and the same designations.

Figure 26:
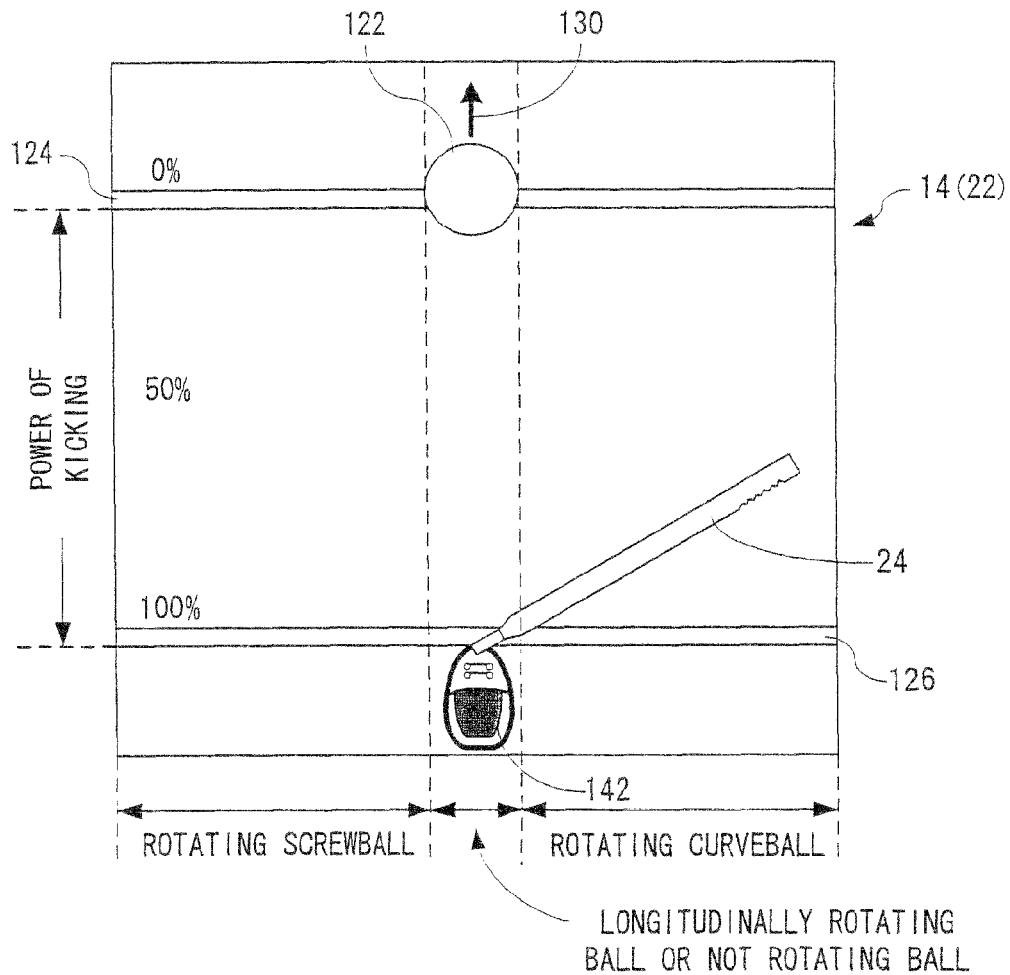
FIG. 26 is an illustrative view showing one example of game screen (operating screen) that is displayed on the second LCD provided in the game apparatus shown in FIG. 1 in performing a soccer game on the game apparatus.

At a soccer game, for example, it is possible to make the player character kick a ball. In this case, the game screen 120 as shown in FIG. 26 is displayed on the LCD 14. In this game screen 120, a ball ("soccer ball" here, although it may be hard to recognize in the drawing) 122 is displayed on the impact line 124, as in the case of the above described embodiment. When touch-on is performed on the LCD 14 (touch panel 22) by means of the stick 24, a spike shoes image 142 is displayed. In the game screen 120 shown in FIG. 26, a decision on the kind of a ball is made among a longitudinally rotating ball, a not rotating ball, a rotating curveball, and a rotating screwball, according to the X coordinate of the touch position (touch-on coordinates). When touch-on is performed on the center or its vicinity of the game screen 120, a longitudinally rotating ball or a not rotating ball is selected. However, it is possible to make the decision according to the power of a kick or at random. Also, as in the case of the above stated embodiment, the degree of curve of the ball to be kicked by the player character is changed according to the lateral distance between the touch-on coordinates and the center of the game screen 120. Besides, the power of a kick is determined according to the Y coordinate of the touch-on coordinates.

In the soccer game as well, the determination area 1220 is provided corresponding to the target ball 122, which affects the path of the ball according to the area through which the slide operation path passes. For example, when the slide operation path passes through the good shot area (I), the ball kicked by the player character moves as the player's intension. If a certain requirement is satisfied, it is possible to make a special shot. When the slide operation path passes through the push shot area (II) or the pull shot area (III), the path of the ball kicked by the player character shifts to the right or left from the course intended by the player. When the slide operation path passes through a missed shot area (IV), the ball kicked by the player character does not move (fly) in the direction intended by the player, flies off with a high or ultra-high trajectory, or makes a move only a little bit. Moreover, if the slide operation path does not pass through the target ball 122 (determination area 1220), the player character makes an air shot.

Although not illustrated, the LCD 12 displays a soccer game screen in the form of an animation featuring the player characters, for example. Therefore, the player performs an operation of kicking the target ball 122 (slide operation) on the LCD 14 (touch panel 22) using the stick 24, in a timing with the player character who kicks the ball displayed in the game screen. For example, the LCD 12 displays a game screen in the form of an animation in which the player character makes a free kick, throws a pass, or makes a shot at the goal, etc.

Figure 27:
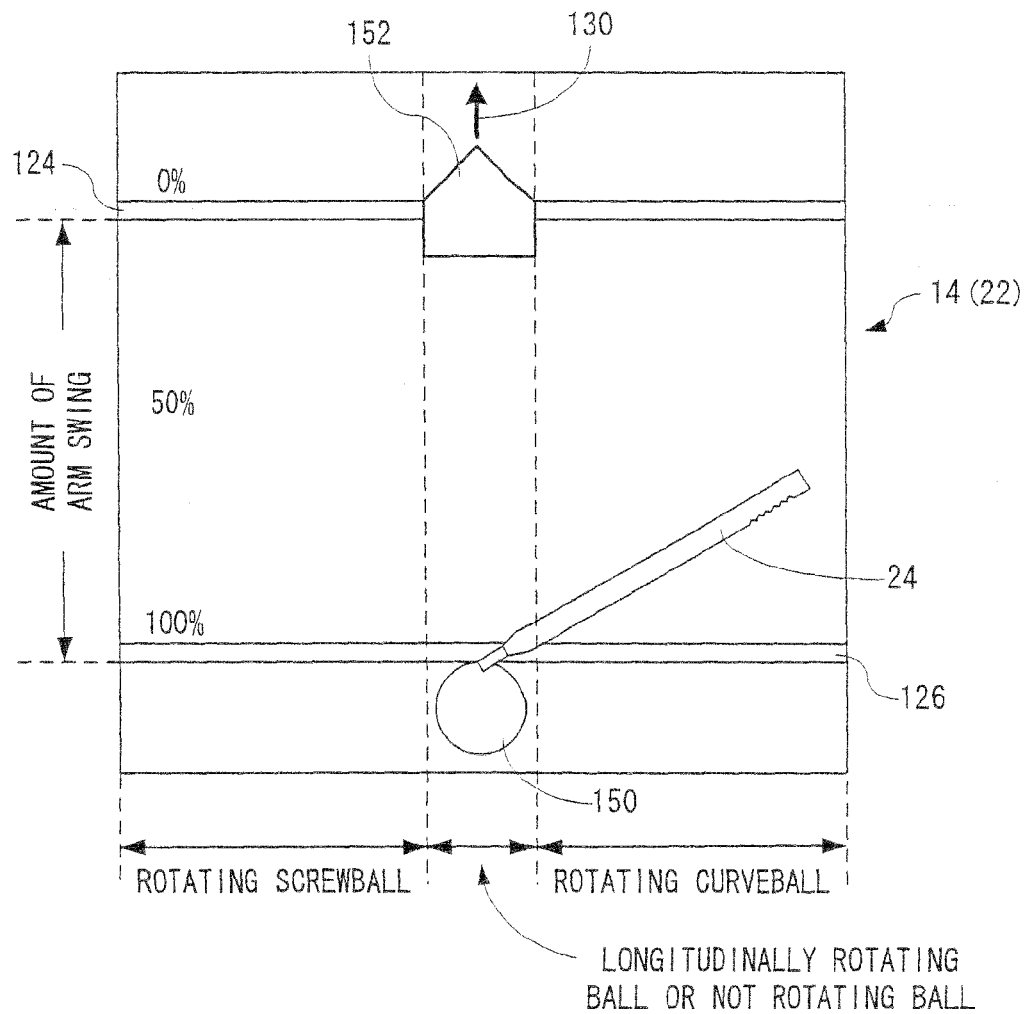
FIG. 27 is an illustrative view showing one example of game screen (operating screen) that is displayed on the second LCD provided in the game apparatus shown in FIG. 1 in performing a baseball game on the game apparatus.

FIG. 27 is an illustrative view showing the example of the game screen 120 displayed on the LCD 14 in a baseball game. This game screen 120 displays a home base 152 on the impact line 124. For example, when the player touches on the LCD 14 (touch panel 22) using the stick 24, a ball (baseball ball here) 150 is displayed in the position corresponding to the touch-on coordinates. In the baseball game (more specifically, in pitching a ball in the field of the baseball game), a decision on the kind of a ball to be pitched is made among a longitudinally rotating ball (straight or knuckle), a not rotating ball (forkball), a rotating curveball (curve or slider), and a rotating screwball (shooter or sinker), according to the X coordinate of the touch-on coordinates. That is, the kind of a ball to be pitched by the player character such as a pitcher is decided. Also, the amount of the player character's arm swing in pitching a ball is decided according to the Y coordinate of the touch-on coordinates. This is because the maximum speed of a ball pitched by the player character varies depending on the kind of a ball, and thus it is possible to provide realistic pitching by multiplying the maximum speed set for each kind of a ball by the amount of an arm swing. As in the case of the above described embodiment, the degree of curve of the ball pitched by the player character is changed according to the lateral distance between the touch-on coordinates and the center of the game screen 120.

Also, as in the case of the above mentioned embodiment, the determination area 1220 is provided corresponding to the home base 152. Accordingly, when the slide operation path 142 passes through the good shot area (I), the ball pitched by the player character, which is of the kind (the line) intended by the player, moves in the intended course. In the case where a certain requirement is satisfied, it is possible to throw an unhittable pitch. Also, when the slide operation path passes through the push shot area (II) or the pull shot area (III), the path of the ball pitched by the player character shifts to the right or left from the course intended by the player. Moreover, when the slide operation path passes through the missed shot area (IV), the ball pitched by the player character flies in the direction just opposite to the course intended by the player, shows no change in course corresponding to the selected kind, or makes no move at the speed equivalent to the amount of an arm swing decided by touch-on. Otherwise, the ball pitched by the player flies along the intended course but is higher or lower than the strike zone. Furthermore, when the slide operation path does not passed over the home base 152 (determination area 1220), the ball pitched by the player character shifts to the course that apparently does not pass through the home base, and may hit a batter in some cases.

Although not illustrated, the LCD 12 displays a game screen in the form of an animation in which a player character (pitcher) stands on the pitcher's mound in such a manner as to face toward the player, a batter (a character of the opponent team) is in the batter's box, and the pitcher pitches a ball and the batter swings a bat, for example. Thus, the player performs an operation of making the pitcher throw a pitch (slide operation) when the selected team takes to the field. When a batter hits a ball, a game screen is displayed in the form of an animation in which the batted ball flies off, and then a character in the field runs after the batted ball, makes a catch, and returns the ball, for example. On the other hand, when the batter does not hit the ball, a game screen is displayed in the form of an animation in which the batter lets the pitch go by or swings at the ball and misses, or a catcher catches a batted ball.

Figure 28:
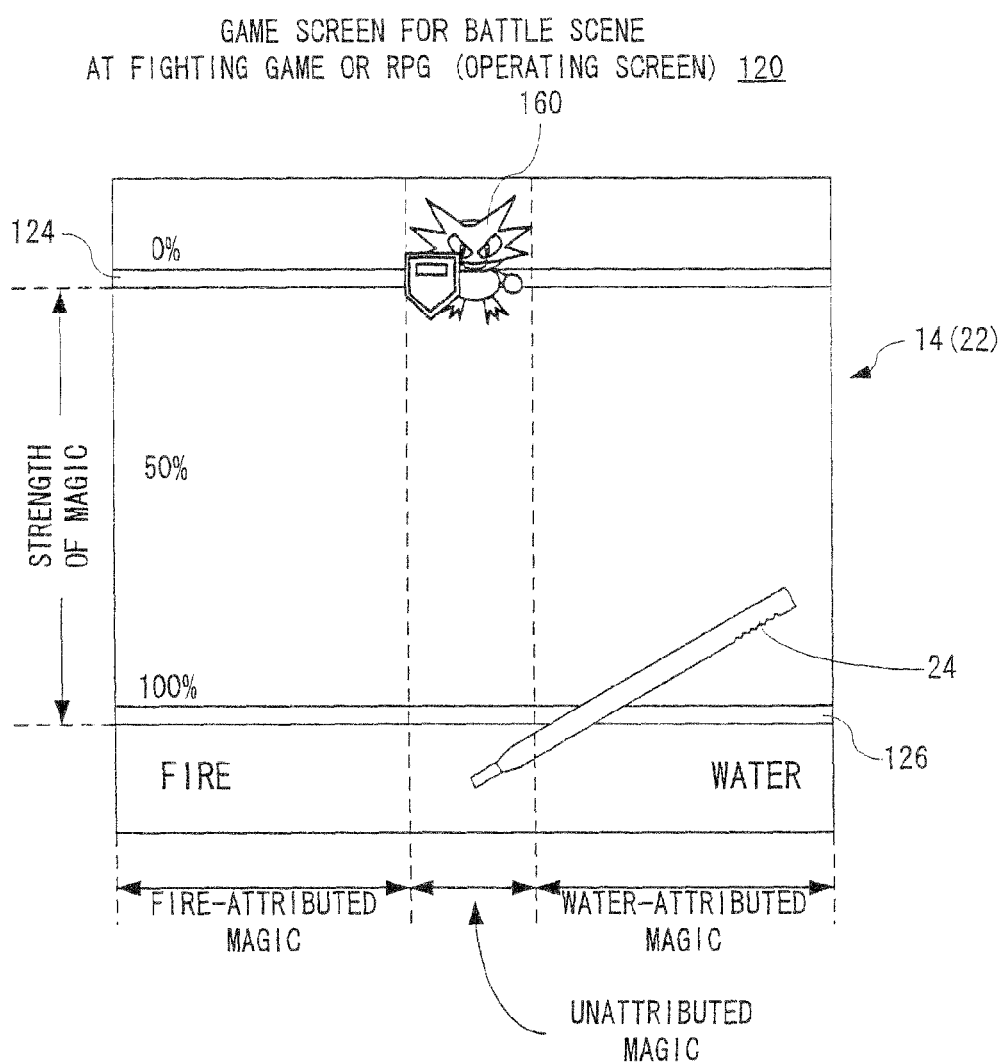
FIG. 28 is an illustrative view showing one example of game screen (operating screen) displayed on the second LCD provided in the game apparatus shown in FIG. 1 for a battle scene in performing a match game or an RPG on the game apparatus.

For a battle scene in a fighting game or a role-playing game (RPG), it is possible to display a game screen 120 shown in FIG. 28 on the LCD 14 so that an attack can be made against an enemy character by performing a slide operation. In the game screen 120 shown in FIG. 28, an enemy character 160 is displayed on an impact line 124. For example, when the player touches on the LCD 14 (touch panel 22) using the stick 24 in a battle scene, an image predetermined according to the attribute (kind) of a magic (or an image of a player character) is displayed in a position according to the touch-on coordinates. Such an image is not shown in FIG. 28 for the sake of simplicity. Here, the attribute (kind) of a magic is decided according to the X coordinate of the touch-on coordinates. That is, varied magic are selected depending on the lateral distance from the center of the game screen 120. Also, the strength of the magic is determined according to the Y coordinate of the touch-on coordinates.

However, this is not limited to magic, and the kind and strength of an attack may be decided according to the touch-on coordinates. For example, the kind of an attack such as a punch, kick and throw can be selected (decided) according to the X coordinate of the touch-on coordinates. At the same time, the strength of the punch or kick can be decided according to the Y coordinate of the touch-on coordinates. Additionally, for a battle scene using some weapons, it is possible to select (decide) a weapon to be used according to the X coordinate of the touch-on coordinates and decide the strength of an attack by the weapon according to the Y coordinate of the touch-on coordinates.

Besides, as in the case of the above described embodiment, for a battle scene in a fighting game or RPG, the determination area 1220 is provided corresponding to the enemy character 160, which has an influence on the effect of an attack according to the area through which the slide operation path passes. For example, when the slide operation path passes through the good shot area (I), the player character's attack is made against the enemy character as intended by the player. Therefore, it is possible to reduce the vital power of the enemy character by a preset value, for example. However, if a specific requirement is satisfied, it is also possible to decrease the vital power by more than the preset value or bring the enemy character into extinction by a single attack.

When the slide operation path passes through the push shot area (II) or the pull shot area (III), the attacking power of the player character is decreased a little and the vital force of the enemy character is reduced by a little smaller value than the preset one. Also, when the slide operation path passes through the missed shot area (IV), the attacking power of the player character is substantially decreased and the vital force of the enemy character is reduced by a considerably smaller value than the preset one. Moreover, when the slide operation path does not pass through the target ball 122 (determination area 1220), the player character cannot use magic, and fails in making an attack or attacks a character on his side by mistake.

Alternatively, the areas within the determination area 1220 may be associated with the respective body parts of the enemy character (including protective items such as a shield). For example, it is possible to assign the vital point of the enemy character (head or chest) to the center of the determination area 1220, and assign the body parts other than the vital point and protective items such as a shield to the remaining areas of the determination area 1220 so that damage would be relatively lessened in the areas closer to the outside of the determination area 1220. As stated above, it is possible to produce variations in damage to be caused to the enemy character, that is, in the influence of the player character's attack, according to the slide operation path 142.

Although not illustrated, the LCD 12 displays a game screen showing a battle scene of the player character and the enemy character in the form of an animation, for example. Thus, the player performs an operation of casting magic (making an attack) on the enemy character 160 (slide operation) on the LCD 14 (touch panel 22) by means of the stick 24, in a timing with the player character's attack. For example, the LCD 12 displays a game screen in the form of an animation in which the player character or the enemy character makes an attack, the player character or the enemy character suffers damage, either of them succeeds in or fails in his attack, etc.

As in the case of the golf game shown in FIG. 24 and FIG. 25, it is possible to change the orientations, etc. of the game screens 120 shown in FIG. 26 to FIG. 28, in performing a slide operation in the transverse direction.

Second Embodiment

With regard to a game apparatus 10 of the second embodiment, a more detailed description is given as to a hitting process in the golf game. For the second embodiment, the setting of the parameters related to the movement of the ball 106 as a moving object is described below more specifically than done for the first embodiment. Overlapping descriptions between the two embodiments are omitted below. The first embodiment and the second embodiment are the same in that the parameters related to the movement of the ball 106 are to be set according to a touch operation and a slide operation, except there is a difference in the setting method (setting requirements) for the parameters between the two embodiments.

Figure 29:
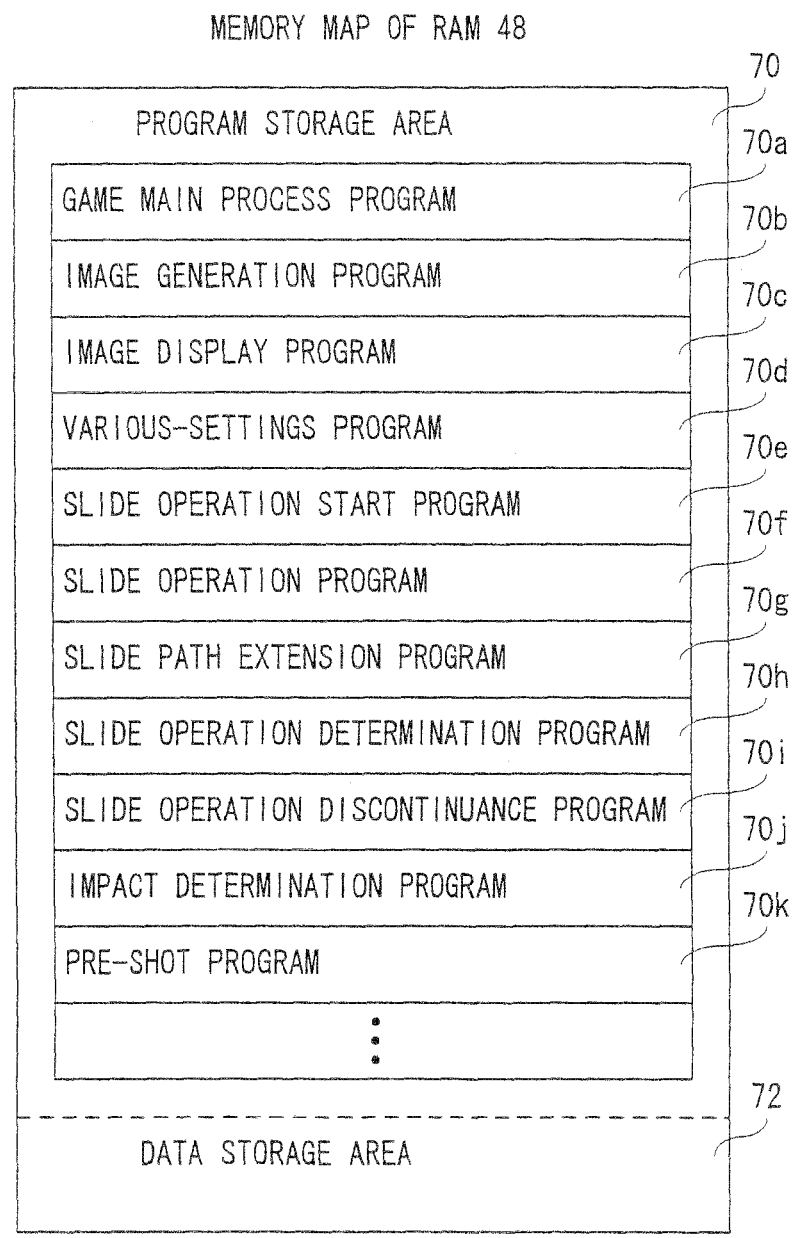
FIG. 29 is an illustrative view showing an example of a memory map of a RAM in another embodiment of the present invention.

FIG. 29 is an illustrative view showing an example of a memory map of the RAM 48. For convenience in description, even the same programs and data as those of the first embodiment are given reference numerals different from those used in the first embodiment. As shown in FIG. 29, the RAM 48 includes a program storage area 70 and a data storage area 72. The program storage area 70 stores game programs which composed of a game main program 70a, an image generation program 70b, an image display program 70c, a various-settings program 70d, a slide operation start program 70e, a slide operation program 70f, a slide path extension program 70g, a slide operation determination program 70h, a slide operation stop program 70i, an impact determination program 70j, a pre-shot program 70k, etc.

The game main process program 70a, the image generation program 70b, the image display program 70c and an impact determination program 70j are identical to the game main process program 480a, the image generation program 480b, the image display program 480c and the impact determination process program 480g shown in relation to the first embodiment, respectively, and thus overlapping descriptions are omitted here.

The various-settings program 70d is a program for deciding (changing) the club 104 to be used by the player character 102, deciding (changing) the direction of a shot, setting (changing) a spin of the ball 106 (top-spin or back-spin), and deciding (changing) a shot type. The slide operation start program 70e is a program for detecting a touch input from the player in advance of the start of a slide operation, storing the position coordinates at the time of touch-on, and starting timers (a slide operation time reference timer 762 and a slide operation stop time reference timer 764 described later) that count the time related to a slide operation (swing).

The slide operation program 70*f* is a program for deciding the shot power value P, displaying the shot power value P, displaying the impact line 124 according to the kind of the club 104, displaying the club head image 128, deciding the stance of the player character 102, and displaying the path 142 corresponding to the slide operation. The slide path extension program 70*g* is a program for extending the slide operation path 142 when the slide operation is ended (touch-off) without going beyond the impact line 124 or making contact with the target ball 122.

The slide operation determination program 70*h* is a program for making a determination on the continuance, stop and restart of a slide operation. The slide operation discontinuance determination program 70*i* is a program for, after it has determined by the slide operation determining program 70*h* that a slide operation is ongoing, stopping the slide operation in the case where the slide operation is performed in the direction opposite to the target ball 122, where the time during when the slide operation is stopped is equal to or more than a specific time, or where the amount of change in the touch-on coordinates is equal to or more than a specific distance.

The pre-shot program 70*k* is a program for deciding the parameters related to the movement of the ball 106 (the launch direction correction value, the launch angle correction value, the spin correction value and the power loss correction value) depending on the impact determined by the impact determination program 70*j*, the state of the lie, and the kind of the selected club 104. Based on these parameters, a decision on shot is made among a nice shot, a good shot, missed shots (hook, slice, pop-up, shank, and weak grounder) and air shot.

Although not illustrated, the program storage area 70 of the second embodiment is the same as that of the first embodiment, in that it stores a sound reproduction program, a backup program, etc.

The data storage area 72 stores various data and flags, and is provided with timers. The specific contents of the data storage area 72 are shown in FIG. 30. Referring to FIG. 30, the data storage area 72 stores image data 720, map data (landform data) 722, selected club data 724, shot direction data 726, ball spin data 728, shot type setting data 730, full shot line position data 732, impact line position data 734, target ball size data 736, target ball position data 738, lie state data 740, initial touch position data 742, current touch position data 744, immediately preceding touch position data 746, shot power value data 748, stance value data 750, swing speed correction data 752, impact result data 754, impact point data 756, launch direction correction data 758, launch angle correction data 760, power loss correction data 762, spin correction data 764, etc. In addition, the data storage area 72 is provided with such timers as the slide operation time reference timer 766 and the slide operation stop time reference timer 768. Moreover, the data storage area 72 stores such flags as a swing process flag 770, a touch-on flag 772, a swing speed correction flag 774, a nice shot flag 776, etc.

The image data 720 is identical to the image data 482*a* described in relation to the first embodiment, and thus overlapping descriptions are omitted here. The map data (landform data) 722 is map data for a virtual game (golf game, for example). The map data (landform data) 722 includes the shape of a golf course, the height or inclination of the ground in the course (rise and fall), the positions of fairways, roughs, bare grounds, bankers, greens (including green edges), trees, cart roads, etc. arranged in the course.

The selected club data 724 is parameters (data) for the club 104 that is predetermined by the distance between the ball 106 and the pin or is set (or changed) by the player, that is, the club 104 to be used by the player character 102. The parameters for the club 104 applies to numerical values for carry, loft angle, launch angle, initial speed, back-spin, side-spin, etc. The shot direction data 726 is data indicative of the launch reference direction in the first embodiment, and is predetermined by a straight line linking the current position of the ball 106 and the pin or is set (or changed) by the player. Before the player character 102 hits the ball 106, the direction of the straight line linking the current position of the ball 106 and the pin (hole) is determined as a shot direction. The player can change the shot direction according to his strategies. However, the shot direction does not have to be changed.

The ball spin data 728 is data on a longitudinal spin (top-spin or back-spin, for example) to be put on the ball 106 to be hit. More specifically, the ball spin data 728 is data indicative of the direction and amount of a spin (hereinafter referred to collectively as "spin value" in some cases) that are set (or changed) by the player. Spin value is not set unless specified by the player.

The shot type setting data 730 is data of correction values related to the shot type selected by the player (normal shot, chip shot, lob shot, pitch shot, or pitch & run). Corrected by the correction values are the values (numerical values) for the initial speed and the loft angle that are included in the parameters for the club 104 indicated by the selected club data 724.

The full shot line position data 732 is coordinate data indicative (horizontal coordinate (Y coordinate) in the direction of the swing operation shown in FIG. 3) for displaying the full shot line 126 that separates the full shot area (2) from the other area (3) in the shot area (1) provided in the game screen 120 displayed on the LCD 14. Additionally, the full shot line 126 is predetermined (fixed).

In the direction of the swing operation shown in FIG. 24 and FIG. 25, the coordinate for displaying the full shot line 126 is a vertical coordinate (X coordinate). For the sake of simplicity, a description is given below as to the game screen 120 shown in FIG. 3. The description can be applied to the game screens 120 shown in FIG. 24 and FIG. 25 by turning the game screen 120 shown in FIG. 3 by 90 degrees to the left or right.

The impact line position data 734 is data indicative of a horizontal coordinate (Y coordinate) for displaying the impact line 124 that separates the shot area (1) from the impact area (4). As described above in relation to the first embodiment, the position (display position) of the impact line 124 varies depending on the kind of the club 104 to be used by the player character 102.

The target ball size data 736 is data for defining the size (radius or diameter) of the target ball 122, and varies depending on the difficulty level of a game, for example. As shown in FIG. 27 and FIG. 28, in turning a noncircular image (152, 160) into the target ball 122, data of distance between the center of the image (152, 160) and the reference point (one corner of the home base or the top of head of the enemy character) is stored. The target ball position data 738 is data indicative of the display position of the target ball 122. As described above in relation to the first embodiment, the display position of the target ball 122 is decided by the state of a lateral inclination (uphill and downhill) of the place in which the ball 106 is located. In displaying the game screen 120 as shown in FIG. 3, the amount of the lateral difference, i.e., the data of the X coordinate may be stored as the target ball position data 738. The Y coordinate is a coordinate indicated by the impact line position data 734.

The lie state data 740 is data indicative of the state of the ground surface (lie) in the position of the ball 106. More specifically, the data indicates tee, green, green edge, fairway, rough (shallow, normal and deep), banker (shallow, normal and fried-egg), tree, cart road, bare ground, and hazard. The carry F of the ball 106 can be changed (see the equation 1) based on the data. Also, it is possible to make the player recognize the state of the lie by displaying a texture image corresponding to the state of the lie in the game screen 120.

The initial touch position data 742 is coordinate data indicative of the position in which the player performs touch-on (touch coordinates). The shot power line 127 is displayed at the Y coordinate of the touch coordinates indicated by the initial touch position data 742. The current touch position data 744 is coordinate data indicative of the current (current-frame) touch coordinates. The current touch position data 744 is updated for each frame during the time between the start and the end of a slide operation. The club head image 128 is displayed in such a manner that the center of the club face is positioned at the coordinates indicated by the current touch position data 744. At the same time, the club head image 128 is displayed in such a manner that its center is turned to direct its face toward the target ball 122. Therefore, when the current touch position coordinate data 744 is updated, the display of the club head image 128 is also updated accordingly. The immediately preceding touch position data 746 is coordinate data indicative of the touch coordinates detected immediately (one frame) before the current touch coordinates. Thus, when the current touch position coordinate data 744 is updated, the immediately preceding touch position data 746 is also updated accordingly. More specifically, after the current position data 744 is copied as the immediately preceding touch position data 746, the current position data 744 is updated. In addition, a straight line linking the current touch position data 744 and the immediately preceding touch position data 746 is displayed as a part of the path 142 in the game screen 120 on the LCD 14. That is, the path 142 is drawn in the shot area (1).

The shot power value data 748 is numerical value data for the shot power value P and is set within a range of 0 to 100%. The method for determining the shot power value P is as described in relation to the first embodiment. The shot power value data 748 is referred to not only for calculating the carry F but also for displaying the shot power value P in the game screen 120. As described relative to the first embodiment, the shot power value P is displayed in steps of 10% with the one place discarded, in the vicinity of the shot power line 127.

The stance value data 750 is numerical data on a horizontal distance between the touch coordinates (touch-on coordinates) indicated by the initial touch position data 742 and the stance reference line 140. More specifically, if the touch-on coordinates are on the right side of the stance reference line 140, the horizontal distance is indicated with a plus sign. On the contrary, if the touch-on coordinates are on the left side of the stance reference line 140, the horizontal distance is indicated with a minus sign. In addition, if the touch coordinates are on the stance reference line 140, the horizontal distance is ±0. The stance value data 748 is used for setting the stance, determining the line of the ball 106 (correcting the launch direction and the path of the ball 106 by a side-spin) and also displaying the indicative image 130. That is, as shown in relation to the first embodiment, the display of the indicative image 130 is changed according to the stance (the stance value data 748) (see FIG. 7 to FIG. 9).

The swing speed correction data 752 is numerical data on the swing speed correction value calculated on the basis of the swing speed. In the case where the swing time is obtained from the slide operation time reference timer 766 described later and the time elapsed from the swing start to the impact is equal to or more than a specific time, the swing speed correction value is set (calculated) according to the elapsed time. At the same time, the swing speed correction flag 774 described later is turned on (established). In contrast, if the swing time is shorter than the specific time, the swing speed correction value is not set and the swing speed correction flag 774 is turned off (not established).

The impact result data 754 is data indicative of the state (result) of an impact determined from the swing reference line q1 and the impact area 1220, that is, data indicative of "good shot (good)", "push shot (push)", "pull shot (pull)", "missed shot (missed)" or "air shot". Based on the impact result data 754, some change is made to the movement of the ball 106 displayed in the game screen 100 on the LCD 12. In the case of "air shot", however, the ball 106 makes no move. The impact point data 756 is coordinate data on the point (impact point) where the swing reference line q1 and the impact area 1220 intersect each other. When the impact result data 754 indicates "push" or "pull", the launch direction and the side-spin value are corrected in a pre-shot process described later, based on the coordinates of the impact point indicated by the impact point data 756.

The launch direction correction data 758 is numerical data on the correction value related to the launch direction of the ball 106 (horizontal direction). The launch direction is indicated within a range of 0 to 90 degrees for the right or within a range of 0 to 90 degrees for the left, assuming that the shot direction indicated by the shot direction data 726 is 0 degree (reference). In addition, the launch direction is a plus direction for the right and a minus sign for the left. The launch direction correction value is calculated on the basis of the coordinates of the impact point indicated by the above mentioned impact point data 756. The launch angle correction data 760 is numerical data on the correction value for the launch angle (vertical angle) of the ball 106. The launch angle is indicated within a range of 10 to 60 degrees along an upward direction, assuming that the degree is 0 in the case where the ball 106 goes straight ahead from the state of being positioned on the ground. The launch angle correction value is calculated on the basis of the spin value indicated by the ball spin data 728.

The power loss correction data 762 is numerical value on the power loss correction value, and is determined (calculated) according to the swing speed. More specifically, this is the correction value for the shot power value P indicated by the shot power value data 748. The spin correction data 764 is the correction value for a top-spin or back-spin. A top-spin is corrected within a range of 30 to 50% and a back-spin is corrected within a range of 0 to 30%. In addition, a top-spin is shown with a plus sign and a back-spin is shown with a minus sign.

The slide operation time reference timer 766 is a timer for counting the time (swing operation time) between the start of a slide operation and the end of the slide operation (in the case of predicting the path 142, the end of the prediction). As stated above, the swing speed correction value is calculated on the basis of the count value (swing time) of the slide operation time reference timer 766. The slide operation stop time reference timer 768 is a timer for counting the time during when a slide operation is stopped (the time during when a swing operation is stopped).

The swing process flag 770 is a flag for determining whether or not a swing operation, i.e. a slide operation is being operated. More specifically, the swing process flag 770 is turned on during the slide operation, and is turned off when the slide operation is ended or stopped. The touch-on flag 772 is a flag for determining whether the touch-on state is continuing or not. More specifically, the touch-on flag 772 is turned on in the touch-on state, and is turned off in the touch-off state.

The swing speed correction flag 774 is a flag for determining whether or not to perform a process of correcting the swing speed. As stated above, the swing speed correction flag 774 is turned on when the swing speed correction value is set, and in contrast, the swing speed correction flag 774 is turned off if when the swing speed correction value is not set. The nice shot flag 776 is a flag for determining whether or not to make a nice shot presentation in the game screen 100 displayed on the LCD 12. This flag is turned on in the case of making a nice shot presentation, and is turned off in the case of not making a nice shot presentation. Also, the nice shot flag 776 is turned on if the result of impact determination is "good" and a predetermined requirement (the shot power value=100% and the swing speed correction value=0% in the second embodiment) is satisfied. In the cases other than the above mentioned one, the nice shot flag 776 is turned off. That is, this means that a nice shot is superior to a good shot in the second embodiment.

Figure 31:
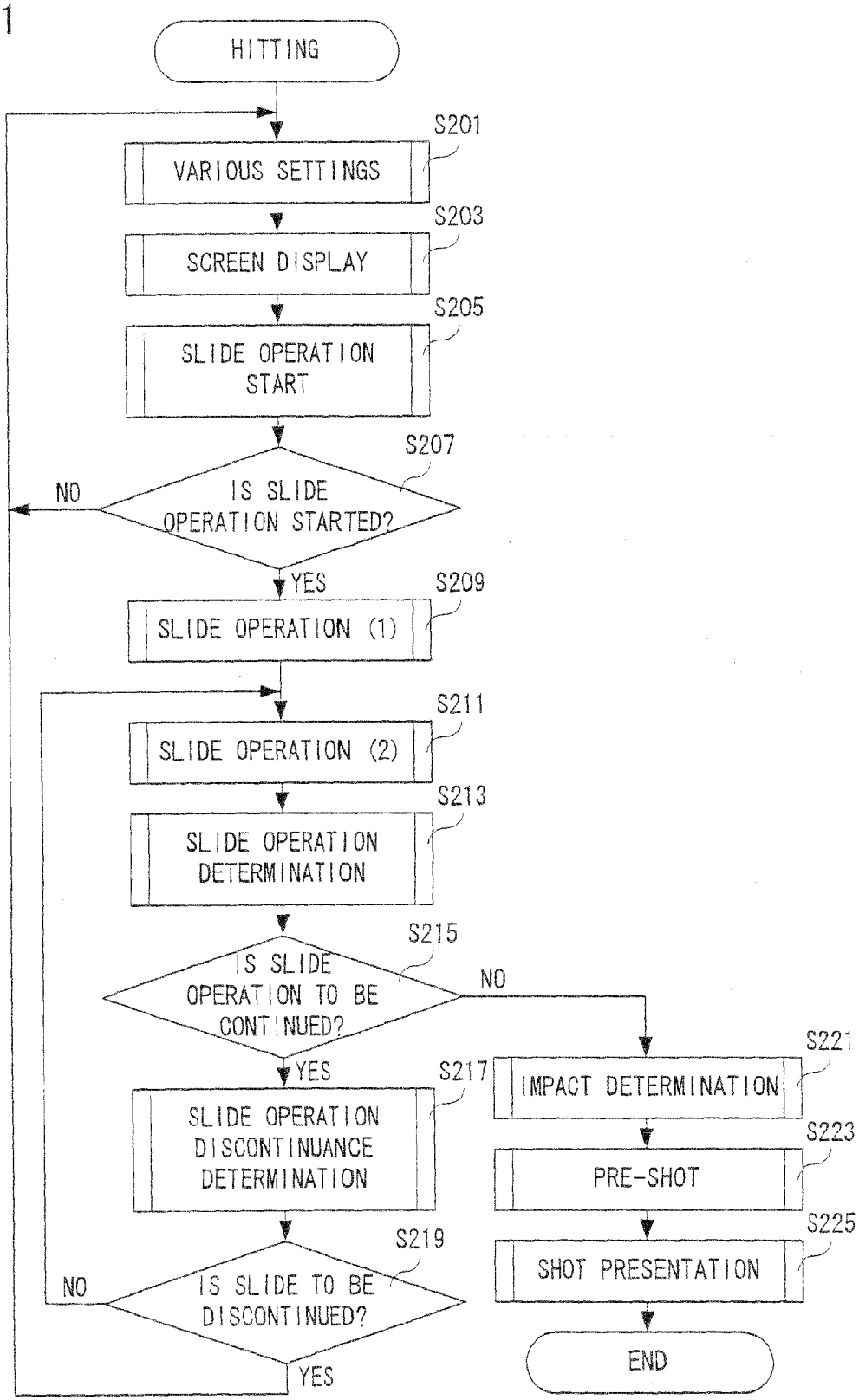
FIG. 31 is a flowchart showing a hitting process by the CPU core in the second embodiment.

More specifically, the CPU core 42 performs a hitting process according to the flowchart shown in FIG. 31. The hitting process shown in FIG. 31 includes such operations as a club selection input, a shot direction input, a longitudinal spin value input and a shot type input as well as a hitting operation.

Referring to FIG. 31, after starting a hitting operation, the CPU core 42 performs a various-settings process (see FIG. 32) in a step S201, a screen display process (see FIG. 33) in a step S203, and a slide operation start process (see FIG. 34) in a step S205. In a next step S207, it is determined whether a slide operation is started or not. Here, it is determined whether or not the touch-on flag 772 has turned from off to on. If the touch-on flag 772 remains off or on, or is turned from on to off, the determination result becomes "NO" in the step S207, and thus it is concluded that no slide operation is started, and the process returns directly to the step S201. If the touch-on flag 772 is changed from off to on, it is concluded that a slide operation is started, and then a slide operation (1) process is carried out (see FIG. 35 and FIG. 36) in a step S209.

Next, a slide operation (2) process is performed in a step S211 (see FIG. 37 and FIG. 38), a slide operation determination process (FIG. 40) is carried out in a step S213, and then it is determined whether or not the slide operation is ongoing in a step S215. Here, it is determined whether the swing process flag 770 is turned on or not. If "YES" in the step S215, that is, if the swing process flag 770 is turned on, it is concluded that the slide operation is ongoing. Then, a slide operation discontinuance determination process (see FIG. 41) is carried out in a step S217, and it is determined whether or not to discontinue the slide operation in a step S219. Here, it is determined whether the swing process flag 770 is turned off or not. If "NO" in the step S219, that is, if the swing process flag 770 is turned on, it is concluded that the slide operation is not to be stopped, and the process returns to the step S211. On the other hand, if "YES" in the step S219, that is, if the swing process flag 770 is turned off, the process returns to the step S201 to start a slide operation from the beginning again.

On the contrary, if "NO" in the step S215, that is, if the swing process flag 770 is turned off, it is concluded that the slide operation is to be ended. Accordingly, an impact determining process (see FIG. 42 and FIG. 43) is performed in a step S221, a pre-shot process (see FIG. 44 to FIG. 47) is performed in a step S223, a shot presentation process (see FIG. 48) is performed in a step S225, and then the hitting process is terminated.

Figure 32:
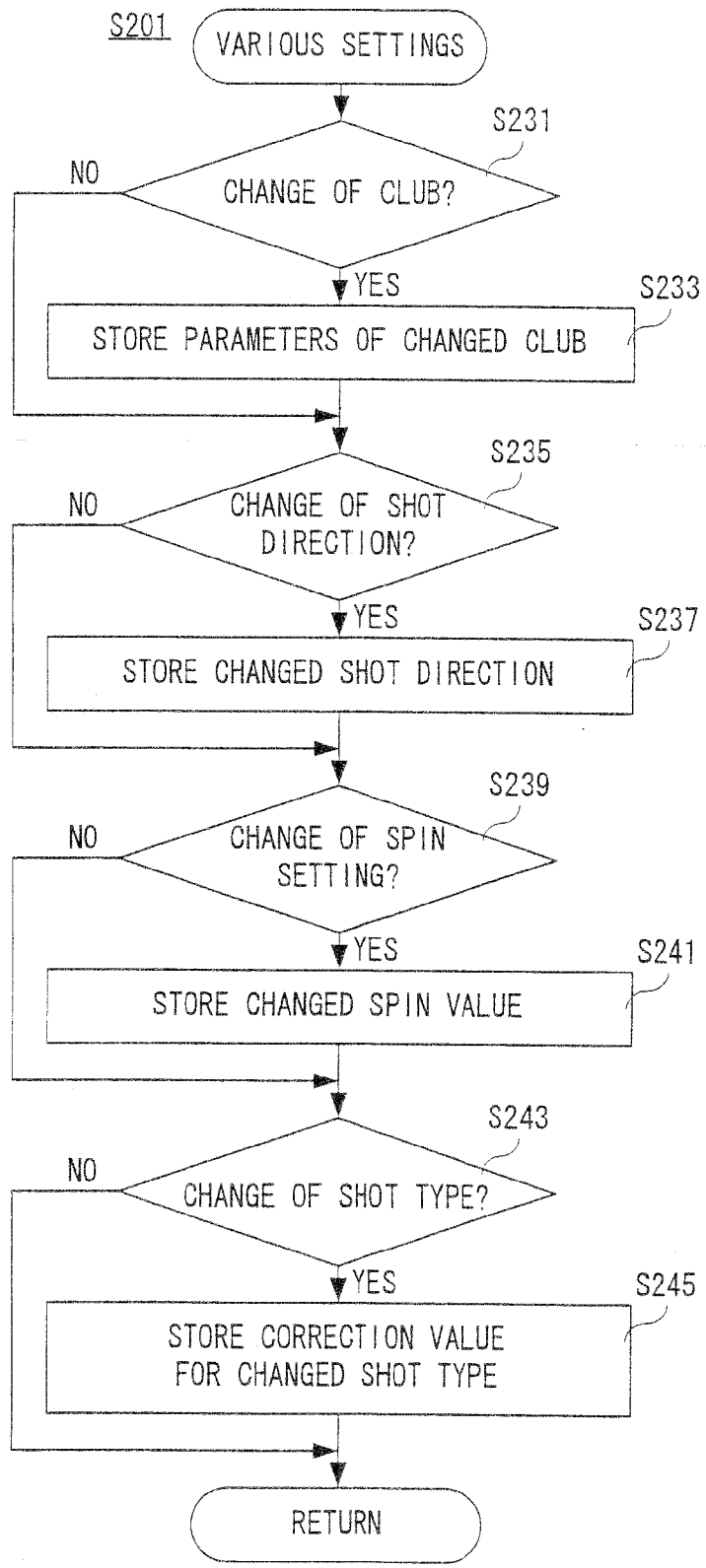
FIG. 32 is a flowchart showing various-settings processes by the CPU core in the second embodiment.

FIG. 32 is a flowchart for the various-settings process shown in the step S201 of FIG. 31. Referring to FIG. 32, after starting the various-settings process, the CPU core 42 determines in a step S231 whether or not to change (or set) the club 104. If "NO" in the step S231, that is, if the club 104 is not to be changed, the process moves directly to a step S235. However, if "YES" in the step S231, that is, if the club 104 is to be changed, the parameters for the changed club 104 are stored (updated) in the RAM 48 as the selected club data 724 in a step S233, and then the process moves to the step S235.

In the step S235, it is determined whether or not to change (or set) the shot direction. If "NO" in the step S235, that is, if the shot direction is not to be changed, the process goes directly to a step S239. However, if "YES" in the step S235, that is, if the shot direction is to be changed, the shot direction data 726 corresponding to the changed shot direction is stored (updated) in the RAM 48 in a step S237, and the process then moves to the step S239.

In the step S239, it is determined whether or not to change the setting of a spin (longitudinal spin). If "NO" in the step S239, that is, if the setting of the spin is not to be changed, the process goes directly to a step S243. However, if "YES" in the step S239, that is, if the setting of the spin is to be changed, the ball spin data 728 corresponding to the changed spin value is stored (updated) in the RAM 48 in a step S241, and the process goes to the step S243.

In the step S243, it is determined whether or not to change (or set) the shot type. If "NO" in the step S243, that is, if the shot type is not to be changed, the various-settings process is directly returned. However, if "YES" in the step S243, that is, the shot type is to be changed, the shot type setting data 730 corresponding to the correction value for the changed shot type is stored in the RAM 48 in a step S245, and then the various-settings process is returned.

Figure 33:
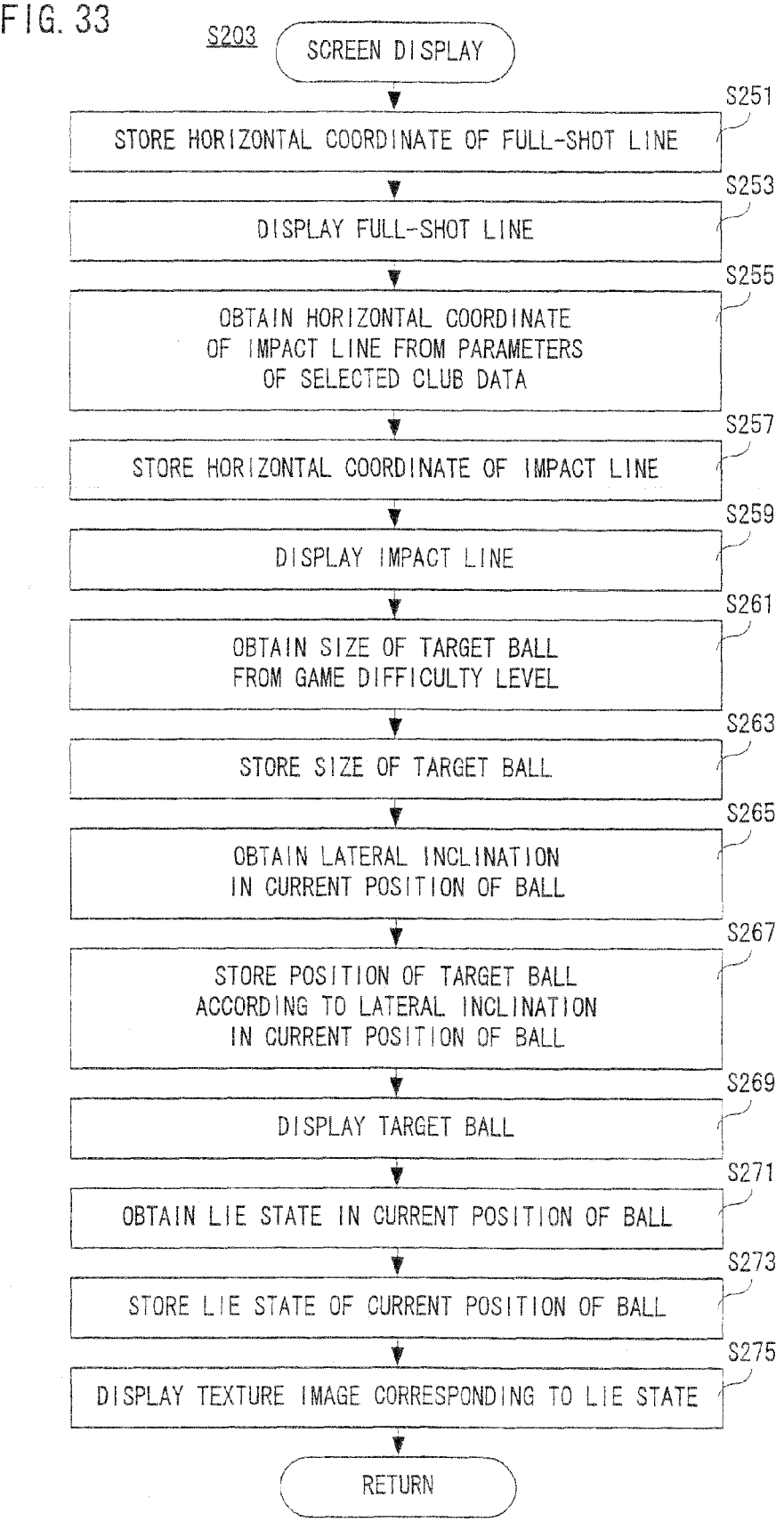
FIG. 33 is a flowchart showing a screen display process by the CPU core in the second embodiment.

FIG. 33 is a flowchart showing the screen display process of the step S203 in FIG. 31. Referring to FIG. 33, after starting the image display process, the CPU core 42 stores the full shot line position data 732 corresponding to the horizontal coordinate (Y coordinate) of the full shot line 126 in the RAM 48 in a step S251. In a next step S253, the full shot line 126 is displayed in the position of the horizontal coordinate indicated by the full shot line position data 732. Next, the horizontal coordinate of the impact line 124 is obtained from the parameter indicated by the selected club data 724 in a step S255, and then the horizontal coordinate of the impact line 124, that is, the impact line position data 734 is stored in the RAM 48 in a step S257. Then, the impact line 124 is displayed in the position of the horizontal coordinate indicated by the impact line position data 734 in a step S259. That is, the impact line 124 is displayed according to the kind of the club 104 to be used by the player character 102.

In a succeeding step S261, the size of the target ball 122 is obtained from the game difficulty level. As stated above, the game difficulty level can be changed according to the club 104 to be used, selected in advance of the start of a game, and altered according to the progress of the game. Also, the lower the game difficulty level, the larger the size of the target ball 122 becomes. The higher the game difficulty level, the smaller the size of the target ball 122 becomes. As described above in relation to the first embodiment, the game difficulty level is set in three stages, and the size of the target ball 122 corresponding to the set stage is obtained in the step S261. Upon obtainment of the size of the target ball 122, the size of the target ball 122, that is, the target ball size data 736 is stored in the RAM 48 in a step S263.

Next, a lateral inclination (inclination and its amount) in the current position of the ball 106 is obtained (calculated) in a step S265. More specifically, as stated above regarding the first embodiment, a height difference d between the player character 102 and the ball 106 is calculated according to the equation 3, and the lateral inclination is calculated according to the equation 4. When the lateral inclination in the current position of the ball 106 has been obtained, the position of the target ball 122 defined by the lateral inclination in the current position of the ball 106 (target ball coordinates x), i.e. the target ball position data 738 is stored in the RAM 48 in a step S267. Then, in a step S269, the target ball 122 is displayed in the position indicated by the target ball position data 738.

Next, the state of the lie in the current position of the ball 106 is acquired in a step S271. The state of the lie is obtained from the above mentioned virtual game map data (landform data) 722. Upon obtainment of the state of the lie, the state of the lie in the current position of the ball 106, i.e., the lie state data 740 is stored in the RAM 48 in a step S273. Then, a texture image corresponding to the lie state indicated by the lie state data 740 is displayed on the LCD 14 in a step S275, and the screen display process is returned. That is, by performing the processes of step S271 to step S275, it is possible to display the game screen 120 corresponding to the current lie state of the ball 106, whereby allowing the player to perform a realistic swing operation (slide operation). For example, if the lie in the current position of the ball 106 is a banker, the game screen 120 is displayed in which the target ball 122 is placed on the sand.

Figure 34:
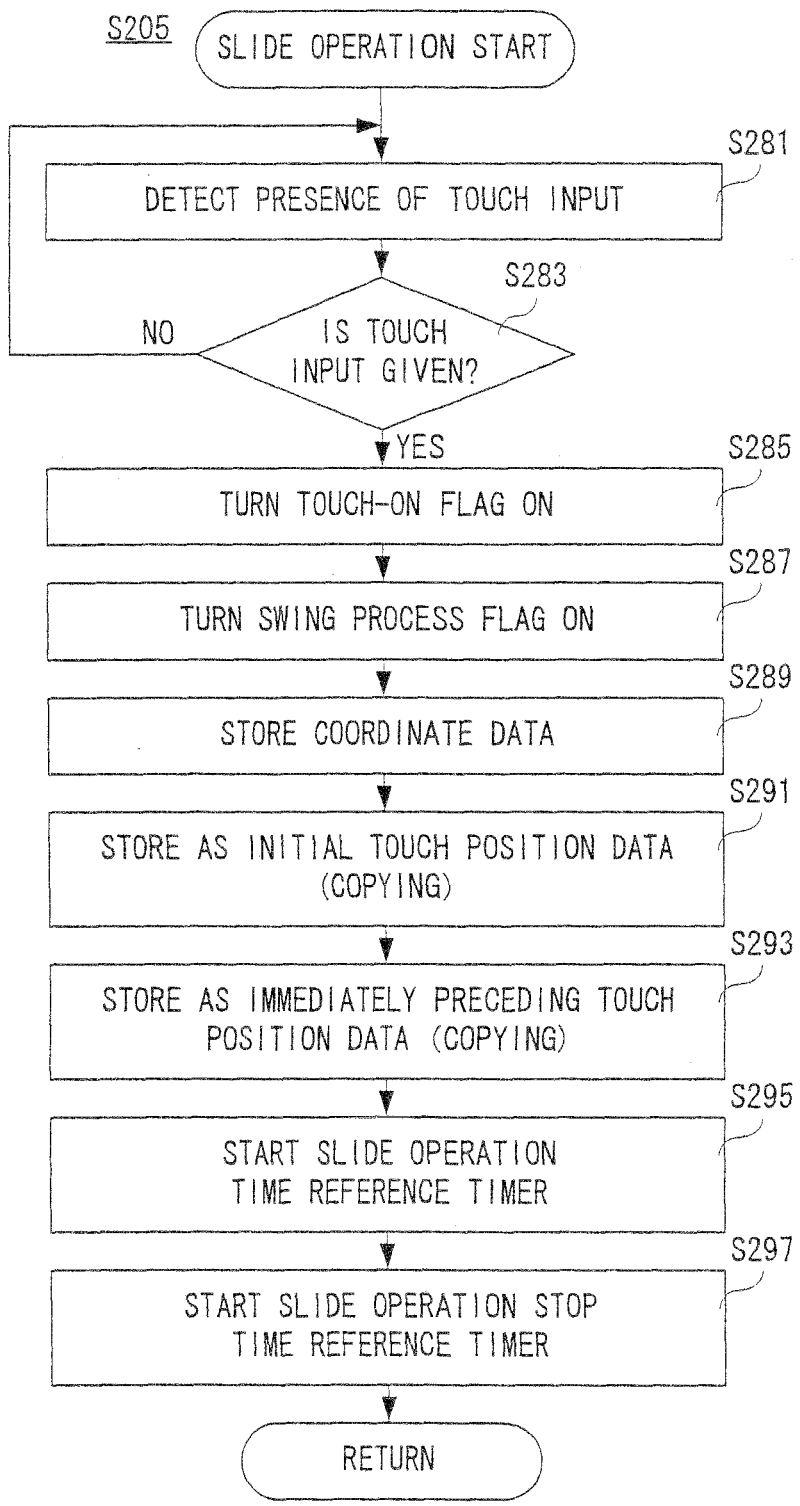
FIG. 34 is a flowchart showing a slide operation start process by the CPU core in the second embodiment.

FIG. 34 is a flowchart showing a slide operation start process in the step S205 shown in FIG. 31. Referring to FIG. 34, after starting the slide operation start process, the CPU core 42 detects the presence of a touch input in a step S281. In a next step S283, it is determined whether a touch input is given or not. It is determined here whether or not coordinate data on the touch coordinates is input from the touch panel 22. If "NO" in the step S283, that is, if no touch input is given, the process returns directly to the step S281. On the other hand, if "YES" in the step S283, that is, if a touch input is given, the touch-on flag 772 is turned on in a step S285, the swing process flag 770 is turned on in a step S287, and the coordinate data on the touch coordinates (touch-on coordinates) detected this time is stored as the current touch position data 744 in the RAM 48.

In a succeeding step S291, the coordinate data on the touch-on coordinates is stored (copied) as the initial touch position data 742 in the RAM 48. Also, the coordinate data on the touch-on coordinates is stored (copied) as the immediately preceding touch position data 746 in a step S293. Then, the slide operation time reference timer 766 is started in a step S295, the slide operation stop time reference timer 768 is started in a step 297, and the slide operation starting process is returned.

Figure 35:
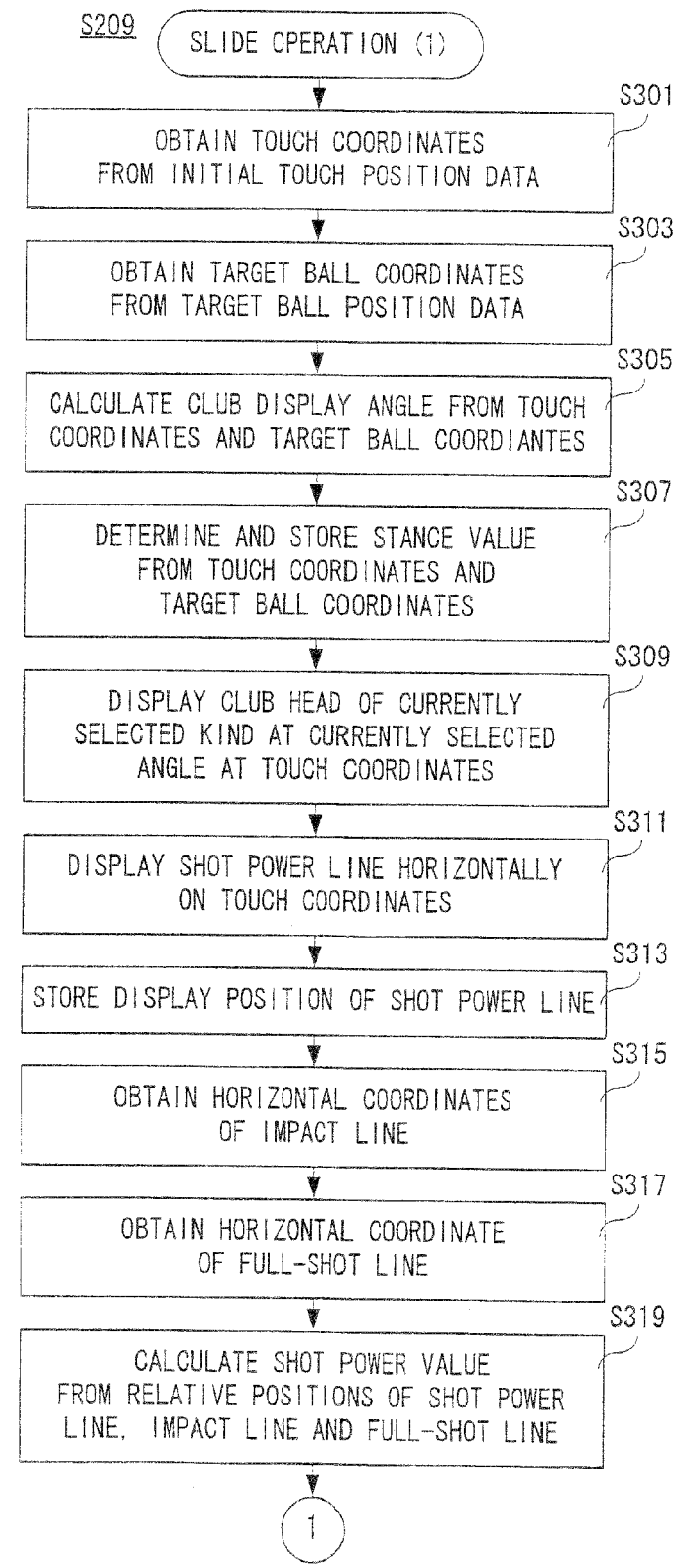
FIG. 35 is a flowchart showing a part of a slide operation (1) process by the CPU core in the second embodiment.
Figure 36:
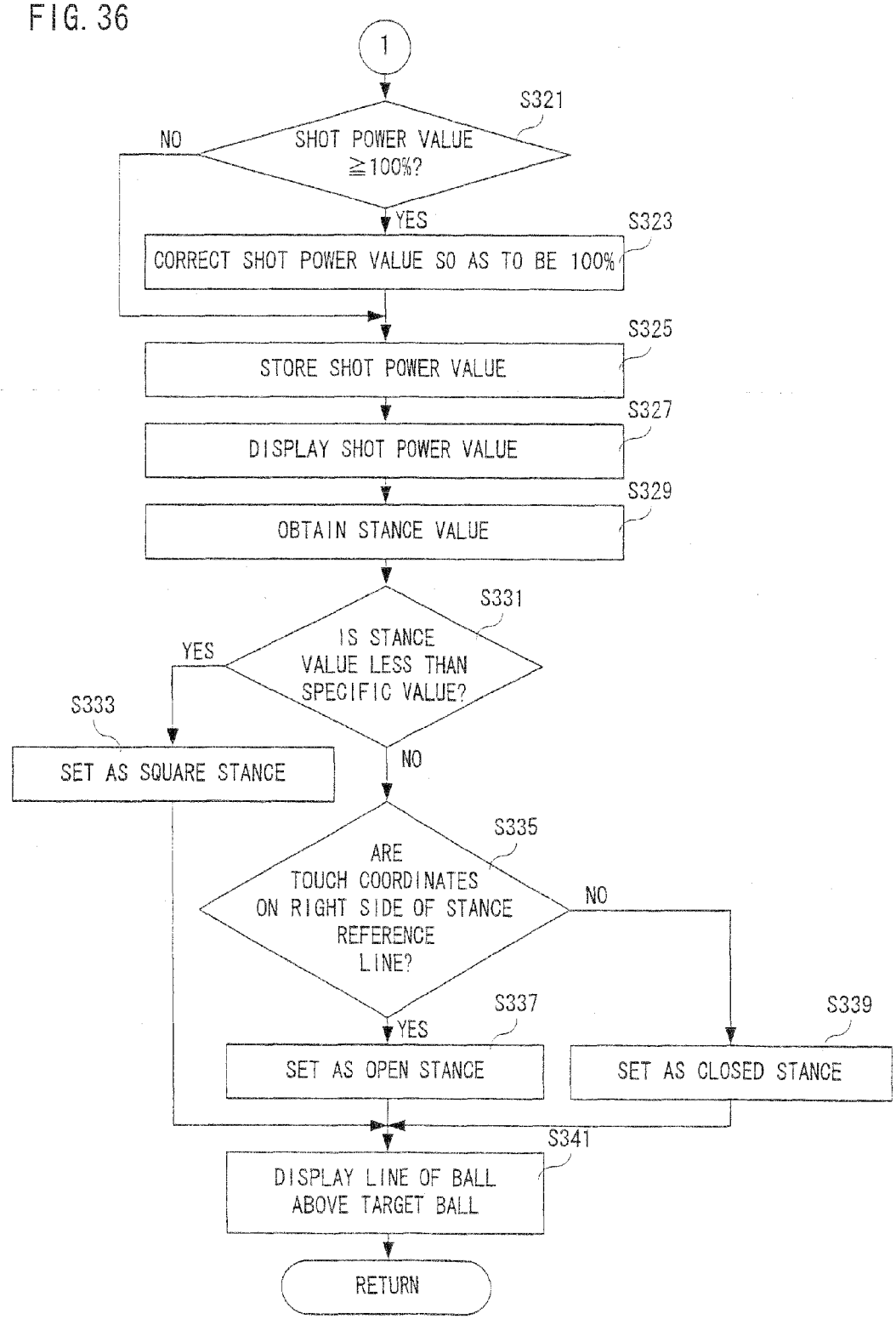
FIG. 36 is a flowchart showing another part of the slide operation (1) process by the CPU core in the second embodiment and continued from FIG. 35.

FIG. 35 and FIG. 36 are a flowchart showing the slide operation (1) process of the step S209 shown in FIG. 31. In the slide operation (1) process, mainly, the shot power value P and the stance are set (decided) on the basis of the touch-on coordinates. Referring to FIG. 35, after starting the slide operation (1) process, the CPU core 42 obtains touch coordinates (touch-on coordinates here) from the initial touch position data 742 in a step S301. In a next step S303, target ball coordinates (the position of the target ball 122) is obtained from the target ball position data 738. In a step S305, a club display angle is calculated from the touch coordinates and the target ball coordinates x. More specifically, the club display angle is calculated so that a straight line (line segment) linking the touch coordinates and the target ball coordinates x becomes orthogonal to the club face.

Next, in a step S307, the stance value is determined (calculated) from the touch coordinates and the target ball coordinates x, and the stance value data 750 corresponding to the stance value is stored in the RAM 48. In a succeeding step S309, the club head of the currently selected kind is displayed at the currently selected display angle at the touch-on coordinates. More specifically, the club head image 128 of the kind indicated by the selected club data 724 is displayed at the touch coordinates on the LCD 14, at the club display angle calculated in the step S305. In addition, the club head image 128 is displayed in such a manner that the touch coordinates overlaps the center of the club face so as to form the club display angle calculated in the step S305.

Then, the shot power line 127 is horizontally displayed on the touch coordinates in a succeeding step S311, and the display position of the shot power line 127 (horizontal (Y) coordinate) is stored in the RAM 48 in a step S313. Next, the horizontal coordinate (Y coordinate) of the impact line 124 is obtained in a step S315, and the horizontal coordinate (Y coordinate) of the full shot line 126 is obtained in a step S317. Then, the shot power value is calculated from the relative positions of the shot power line 127, the impact line 124 and the full shot line 126 in a step S319. The method for calculation is as described in relation to the first embodiment.

As shown in FIG. 36, it is determined in a next step S321 whether the shot power value is 100% or more. If "NO" in the step S321, that is, if the shot power value is less than 100%, the process goes directly to a step S325. However, if "YES" in the step S321, that is, if the shot power value is more than 100%, the shot power value is corrected so as to be 100% in a step S323, and then the process moves to the step S325. That is, the shot power value is controlled so as not to exceed 100% by the processes of steps S321 and S323.

In the step S325, the shot power value data 748 corresponding to the shot power value is stored in the RAM 48. In a next step S327, the shot power value is displayed in the vicinity of the shot power line 127 and at the left end of the game screen 120 (see FIG. 5). Additionally, the shot power value is indicated in steps of 10%.

Subsequently, the stance value is obtained in a step S329. That is, the stance value data 750 is read out. In a next step S331, it is determined whether or not the stance value is less than a specific value (the radius of the target ball 122, for example). More specifically, it is determined whether or not the distance between the vertical coordinate (X coordinate) of the stance reference line 140 and the X coordinate of the touch-on coordinates is shorter than the radius of the target ball 122. If "YES" in the step S331, that is, if the stance value is less than a specific value, the stance is set as square stance in a step S333, and the process goes to a step S341. For example, although not illustrated, the flag for the square stance is turned on. At the same time, both the flag for the open stance (not illustrated) and the flag for the closed stance (not illustrated) are turned off.

However, if "NO" in the step S331, that is, if the stance value is equal to or more than a specific value, it is determined in a step S335 whether or not the touch-on coordinates are on the right side of the stance reference line 140. More specifically, it is determined whether the sign for the stance value is a plus or not. If "YES" in the step S335, that is, if the touch-on coordinates are on the right side of stance reference line 140, the stance is set as open stance in a step S337, and the process moves to the step S341. In this embodiment, for example, the flag for the open stance is turned on, and the flag for the square stance and the flag for the closed stance are turned off.

Also, if "NO" in the step S335, that is, if the touch-on coordinates are on the left side of the stance reference line 140, the stance is set as closed stance, and the process moves to the step S341. Here, the flag for the closed stance is turned on, and the flag for the square stance and the flag for the open stance are turned off, for example. Then, in the step S341, the line of the ball, i.e., the indicative image 130 is displayed above the target ball 122, and the slide operation (1) process is returned. Additionally, the amount and direction of a curve of the indicative image 130 displayed in the step S341 vary according to the stance value. That is, in the step S341, the appropriate indicative image 130 is displayed by reference to the stance value data 750.

Figure 37:
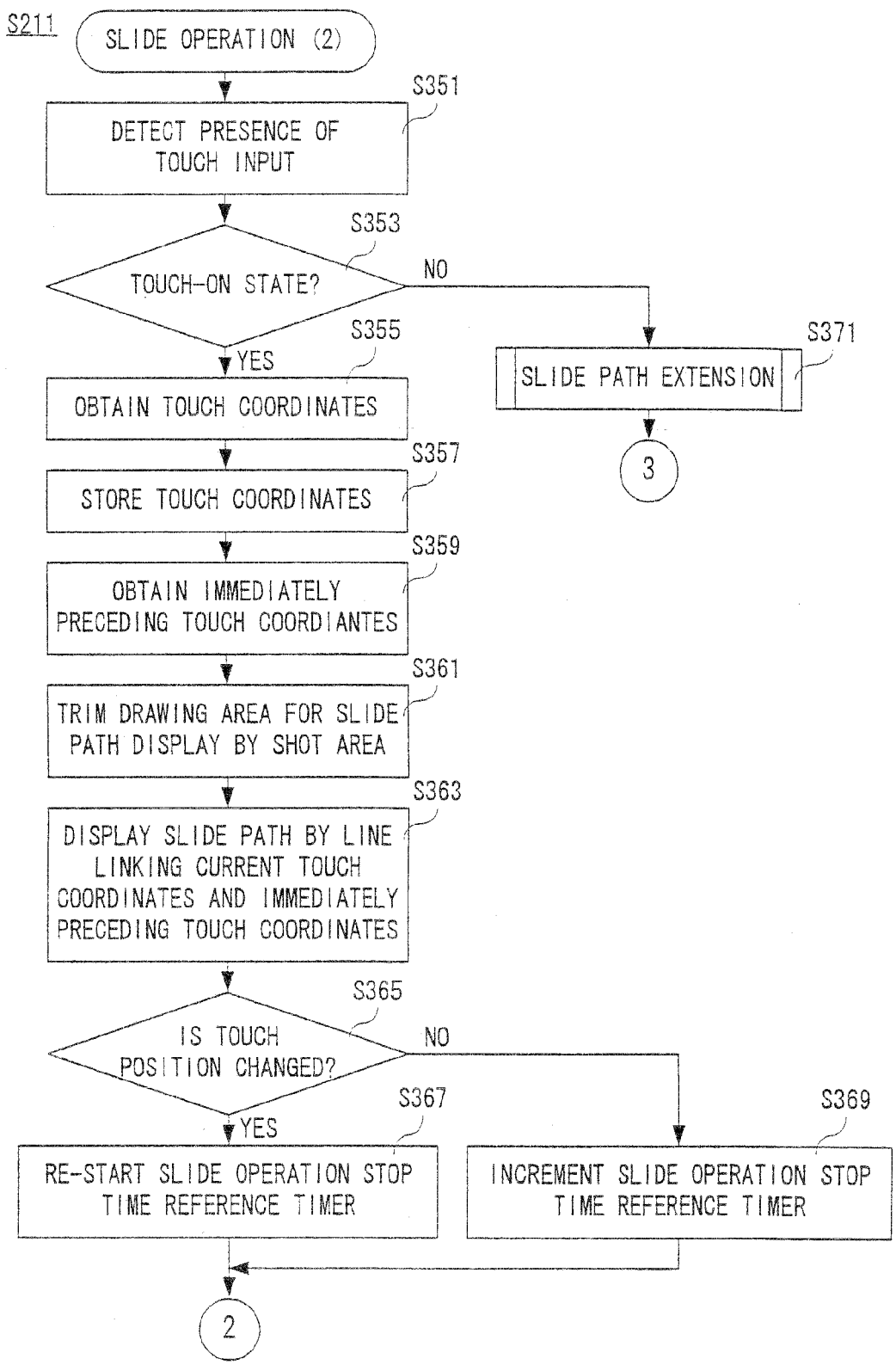
FIG. 37 is a flowchart showing one part of a slide operation (2) process by the CPU core in the second embodiment.
Figure 38:
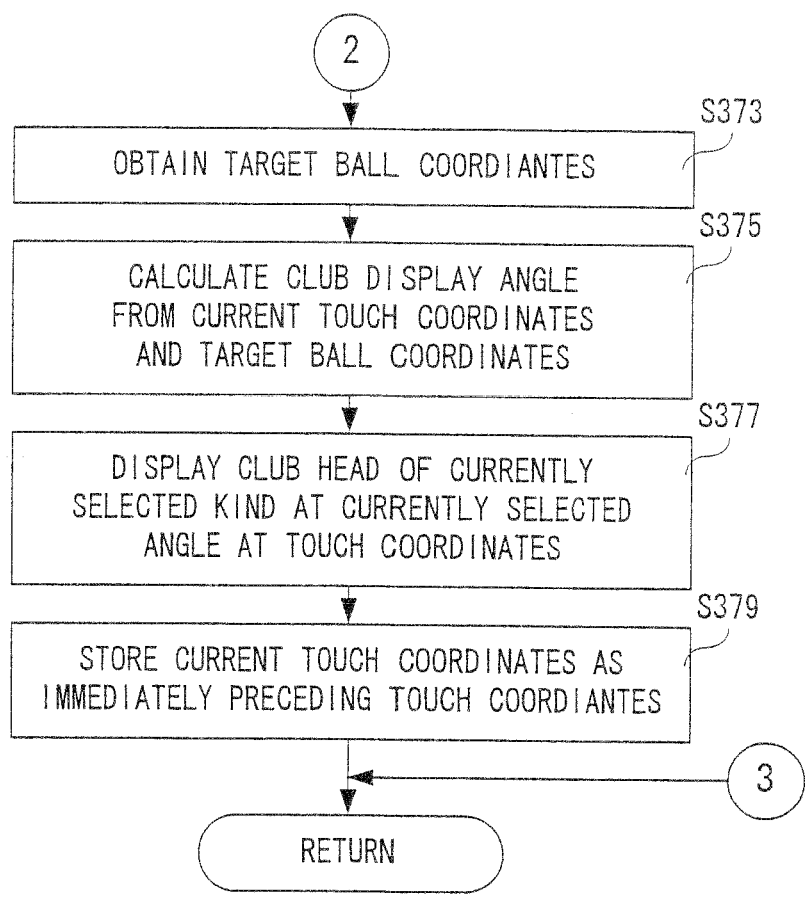
FIG. 38 is a flowchart showing another part of the slide operation (2) process by the CPU core in the second embodiment and continued from FIG. 37.
Figure 39:
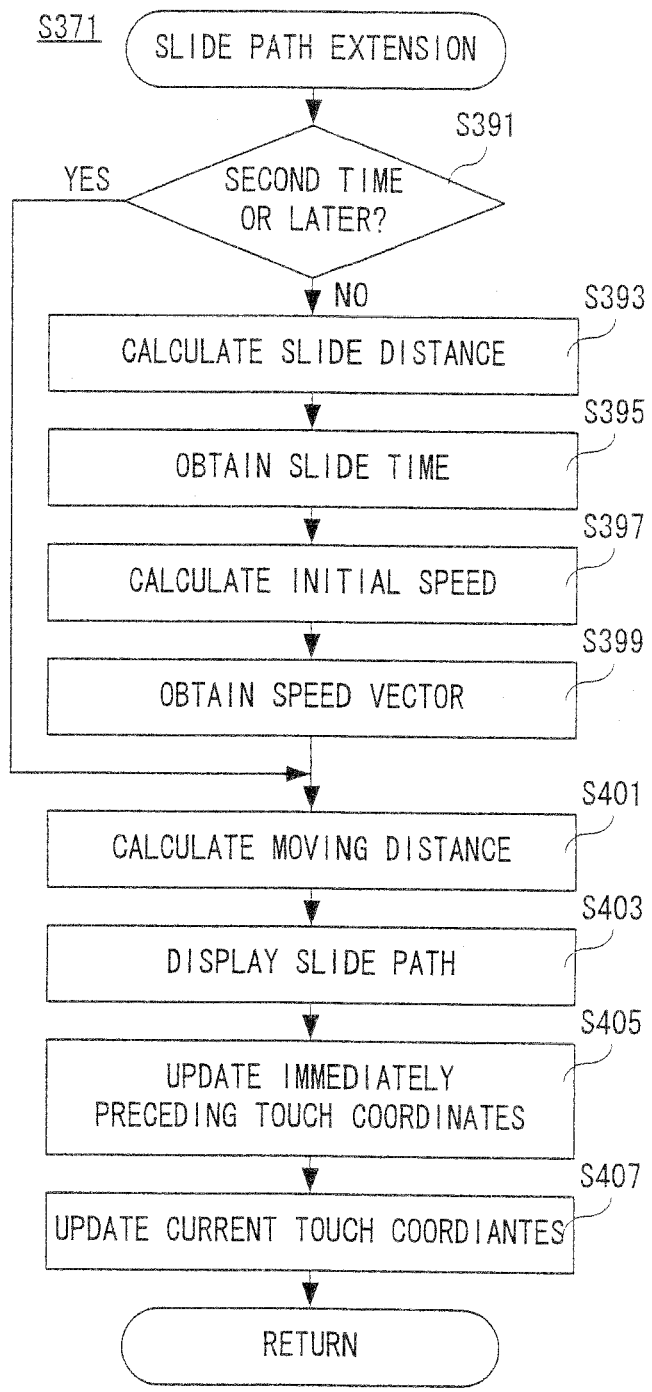
FIG. 39 is a flowchart showing a slide path extension process of a by the CPU core in the second embodiment.

FIG. 37 and FIG. 38 are a flowchart showing the slide operation (2) process in the step S211 shown in FIG. 31. In the slide operation (2) process, mainly, the slide operation path 142 is drawn. As shown in FIG. 37, after starting the slide operation (2) process, the CPU core 42 detects the presence of a touch operation in a step S351. In a next step S353, it is determined whether the touch-on state is continuing or not. That is, it is determined whether the touch-on flag 772 is turned on or not. If "NO" in the step S353, that is, if the touch-on flag 772 is turned off, it is concluded that touch-off is performed. Then, the slide path extension process shown in FIG. 39 is carried out in a step S371, and then the slide operation (2) process returned as shown in FIG. 38.

However, if "YES" in the step S353, that is, if touch-on is performed, the touch input (touch coordinates) detected in the step S351 is obtained in a step S355, and the touch coordinates are stored in the RAM 48 in a step S357. That is, the current touch position data 744 is updated. In a succeeding step S359, the immediately preceding touch coordinates are obtained. That is, the touch coordinates indicated by the immediately preceding touch position data 746 are obtained.

Subsequently, a drawing area for displaying the slide operation path 142 is trimmed by the shot area (1) in a step S361, and the slide operation path 142 is displayed by a straight line linking the current touch position and the immediately preceding touch coordinates in a step S363. Then, it is determined in a step S365 whether or not there is a change in the touch position. That is, it is determined whether this is a slide operation (swing operation) or not. Here, it is determined whether or not there is a specific length or more of distance between the current touch position and the immediately preceding touch position so that a change in the touch position can be identified with accuracy. This avoids a shake in the hand from being determined as a slide operation by mistake.

If "YES" in the step S365, that is, if there is a change in the touch position, it is concluded that this is a slide operation. Then, the swing stop time reference timer 768 is restart (reset and started again) in a step S367, and the process goes to a step S373 shown in FIG. 38. On the other hand, if "NO" in the step S365, that is, if there is no change in the touch position, it is concluded that this is not a slide operation. Then, the swing stop time reference timer 768 is incremented in a step S369, and the process moves to the step S373.

In the step S373 shown in FIG. 38, the target ball coordinates are obtained. That is, the target ball position data 738 is read out. In a next step S375, the club display angle is calculated from the current touch coordinates and the target ball coordinates. In a step S377, the club head image 128 of the currently selected kind is displayed at the touch coordinates, at the currently set display angle. Besides, the processes of steps S375 and S377 are the same as the processes of steps S305 and S309, respectively, and thus a detailed description on them is omitted here. Then, in a step S379, the current touch coordinates are stored as the immediately preceding touch coordinates, and the slide operation (2) process is returned. That is, in the step S379, the current touch position data 744 is copied to the immediately preceding touch position data 746.

FIG. 39 is a flowchart showing the slide path extension process of step S371 shown in FIG. 37. As shown in FIG. 39, it is determined in a step S391 whether or not this is the second slide path extension process or later. For example, although not illustrated, it is possible to provide the data storage area 72, etc. of the RAM 48 with a counter for counting the number of times of performing the slide path extending process, increment the counter each time the slide path extension process is performed, and reset the counter (set the count value to 0) at the start or end of the hitting process.

If "YES" in the step S391, that is, if this is the second slide path extending process or later, the process goes directly to a step S401. On the other hand, if "NO" in the step S391, that is, this is the initial slide path extending process (the first time), the slide distance is calculated in a step S393. More specifically, the CPU core 42 reads out the initial touch position data 742 and the current touch position data 744 from the RAM 48 to calculate a difference (distance) between the current touch coordinates and the initial touch coordinates. In a succeeding step S395, the slide time is obtained by reference to the timer value (count value) of the slide operation time reference timer 766. Then, in a step S397, an initial speed for extending the slide path is calculated (slide distance/slide time). Also, a slide direction vector is obtained in a step S399, and the process moves to a step S401. More specifically, in the step S399, a speed vector is calculated in which the immediately preceding touch coordinates indicated by the immediately preceding touch position data 746 are a start point and the current touch coordinates indicated by the current touch position data 744 is an end point. Then, the speed vector is obtained with the initial speed calculated in the step S397 as a scalar for the calculated vector.

In a step S401, a moving distance is calculated. That is, determined is a speed vector that is changed in magnitude in such a manner that the slide speed is provided by a predetermined multiplying factor (0.94 time). In a next step S403, the slide operation path 142 of the moving distance calculated in the step S401 is displayed along the direction indicated by the speed vector. Then, the immediately preceding touch coordinates (the immediately preceding touch position data 746) are updated in a step S405, and the current touch coordinates (the current touch position data 744) are updated in a step S407, and the slide path extension process is returned. More specifically, the current touch coordinates prior to the extension of the slide operation path 142 is stored as the immediately preceding touch coordinates in the step S405, and the end point of the speed vector calculated at the extension of the slide operation path 142 is stored as the current touch coordinates in the step S407.

Figure 40:
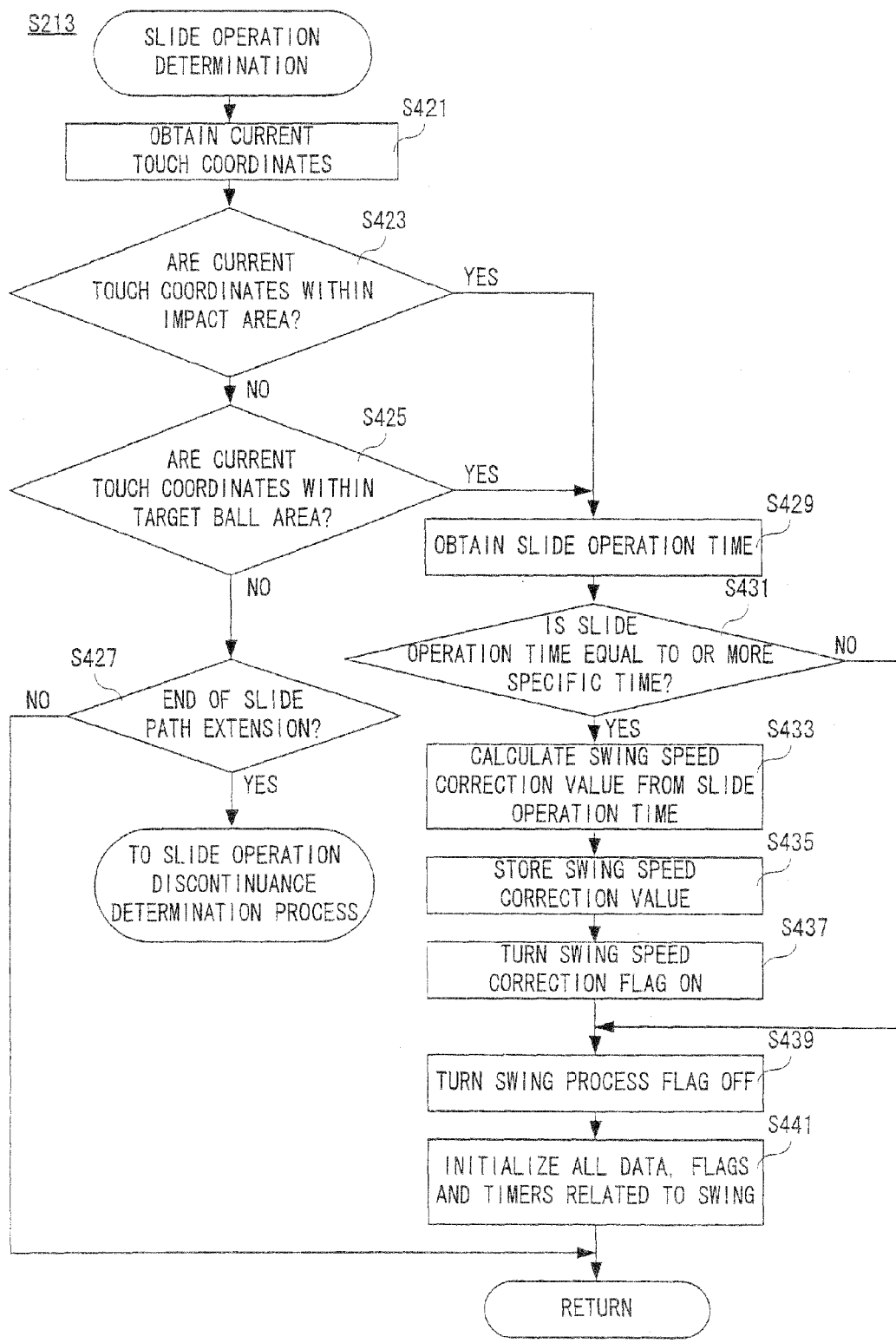
FIG. 40 is a flowchart showing a slide operation determination process by the CPU core in the second embodiment.

FIG. 40 is a flowchart showing the slide operation determination process of step S213 shown in FIG. 31. As shown in FIG. 40, after starting the slide operation determination process, the CPU core 42 obtains the current touch coordinates indicated by the current touch position data 744 by reference to the RAM 48 in a step S421. In a next step S423, it is determined whether or not the current touch coordinates are within the impact area (4). Here, it is determined whether or not the Y coordinate of the current touch coordinates is smaller than the Y coordinate indicated by the impact line position data 734.

If "YES" in the step S423, that is, if the current touch coordinates are within the impact area (4), the process goes directly to a step S429. On the other hand, if "NO" in the step S423, that is, the current touch coordinates are not within the impact area (4), it is determined in a step S425 whether or not the current touch coordinates are within the target ball area. Here, it is determined whether or not the current touch coordinates match with the coordinates contained in the display area of the target ball 122. If "YES" in the step S425, that is, if the current touch coordinates are within the target ball area, the process moves directly to the step S429. On the other hand, if "NO" in the step S425, that is, if the current touch coordinates are not within the target ball area, it is determined in a step S427 whether or not to end the extension of the slide path. Here, it is determined whether or not the speed of the speed vector (slide speed) is equal to or less than a specific value. If "NO" in the step S427, that is, if the slide speed is more than a specific value, it is concluded that the extension of the slide path (path 142) is to be continued, and the slide operation determining process is directly returned. On the other hand, if "YES" in the step S427, that is, if the slide speed is less than a specific value, it is concluded that the extension of the slide path is to be ended, the process returns (jumps) to the slide operation discontinuance determination process shown in FIG. 41.

In the step S429, the time of the slide operation is obtained from the timer value (count value) of the swing operation time reference timer 766. In a next step S431, it is determined whether or not the time of the slide operation (swing operation) is equal to or longer than a specific time. If "NO" in the step S431, that is, if the time of the slide operation is shorter than the specific time, the process goes directly to a step S439. However, if "YES" in the step S431, that is, if the time of the slide operation is equal to or longer than the specific time, the swing speed correction value is calculated from the time of the slide operation in a step S433, the swing speed correction data 752 corresponding to the swing speed correction value is stored in the RAM 48 in a step S435, the swing speed correction flag 774 is turned on in a step S437, and then the process goes to the step S439. That is, if the speed of the slide operation is low, it becomes easy to slide the target ball 122 and its core (center), and thus the swing speed is corrected in such a manner that the carry F of the ball 106 becomes short.

The swing process flag 770 is turned off to end the slide operation in the step S439, and all data, flags and timers related to the swing (slide operation) are initialized in a step S441, and the slide operation determination process is returned. In the step S441, however, the swing speed correction data 752 and the swing speed correction flag 774 are not initialized.

Figure 41:
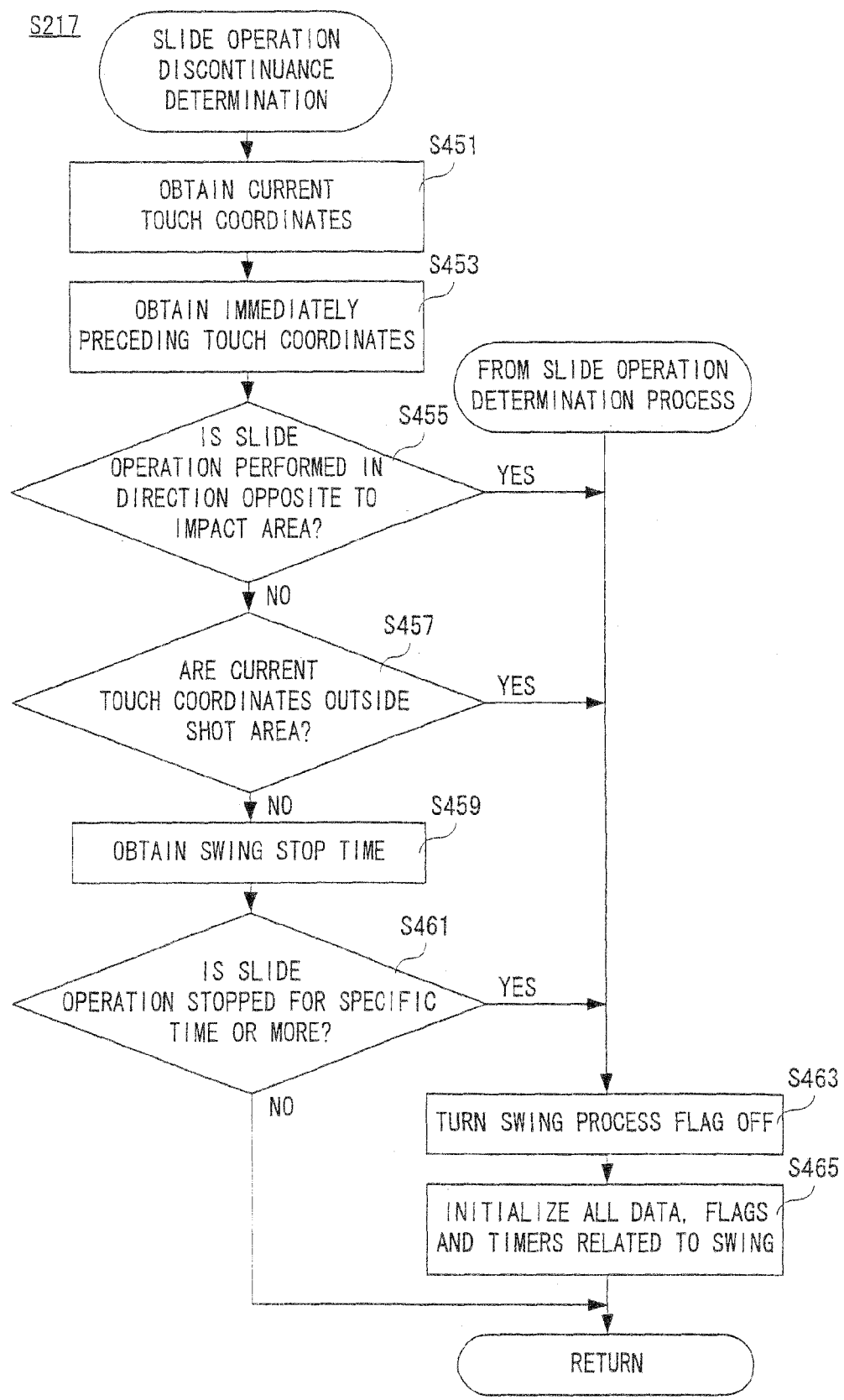
FIG. 41 is a flowchart showing a slide operation discontinuance determination process by the CPU core in the second embodiment.

FIG. 41 is a flowchart showing the slide operation discontinuance determination process of step S217 shown in FIG. 31. As shown in FIG. 41, after starting the slide operation discontinuance determination process, the CPU core 42 refers to the RAM 48 in a step S451 to obtain the current touch coordinates indicated by the current touch position data 744. In a succeeding step S453, the CPU core 42 refers to the RAM 48 to obtain the immediately preceding touch coordinates indicated by the immediately preceding touch data 746. In a next step S455, it is determined whether or not the slide operation is performed in a direction opposite to the impact area (4). More specifically, it is determined whether or not the vector having the immediately preceding touch coordinates as a start point and the current touch coordinates as an end point is oriented downward. Otherwise, it is determined whether or not the Y coordinate of the immediately preceding touch coordinates is smaller than the Y coordinate of the current touch coordinates.

If "YES" in the step S455, that is, if the slide operation is performed in a direction opposite to the impact area (4), it is concluded that the swing operation is discontinued (to be newly performed again), and the process returns to a step S463. On the other hand, if "NO" in the step S455, that is, if the slide operation is not performed in a direction opposite to the impact area (4), it is determined in a step S457 whether or not the current touch coordinates have come outside the shot area (1). Although not illustrated in the above mentioned game screen 120, an area for displaying buttons or icons for various settings is provided on the right and left sides of the shot area (1) and the impact area (4) (either of them is also acceptable). In the step S457, it is determined whether or not the current touch coordinates have come in the area.

If "YES" in the step S457, that is, if the current touch coordinates have come out of the shot area (1), it is also concluded that the swing operation is discontinued (to be newly performed again), and the process moves to the step S463. On the other hand, if "NO" in the step S457, that is, if the current touch coordinates have not come out of the shot area (1), the CPU core 42 refers to the timer value (count value) of the slide operation stop time reference timer 768 to obtain the time during when the slide operation is stopped in a step S459. Then, it is determined in a step S461 whether or not the slide operation is stopped for a certain time or more. If "NO" in the step S461, that is, the slide operation is not stopped for a specific time or more, it is concluded that the slide operation is ongoing, and the slide operation discontinuance determination process is directly returned. On the other hand, if "YES" in the step S461, that is, if the slide operation is stopped for a specific time or more, it is concluded that the slide operation is discontinued (to be newly performed again), and the process goes to a step S463.

The swing process flag 770 is turned off to discontinue the slide operation in the step S463, and all data, flags and timers related to the swing (slide operation) are initialized and the slide operation discontinuance determination process is returned in a step S465. Besides, if the slide operation is discontinued, a hitting process is to be performed from the beginning again as shown in FIG. 31, and thus the swing speed correction data 752 and the swing speed correction flag 774 are also initialized in the step S465, unlike the case of the above mentioned slide operation determination process.

Figure 42:
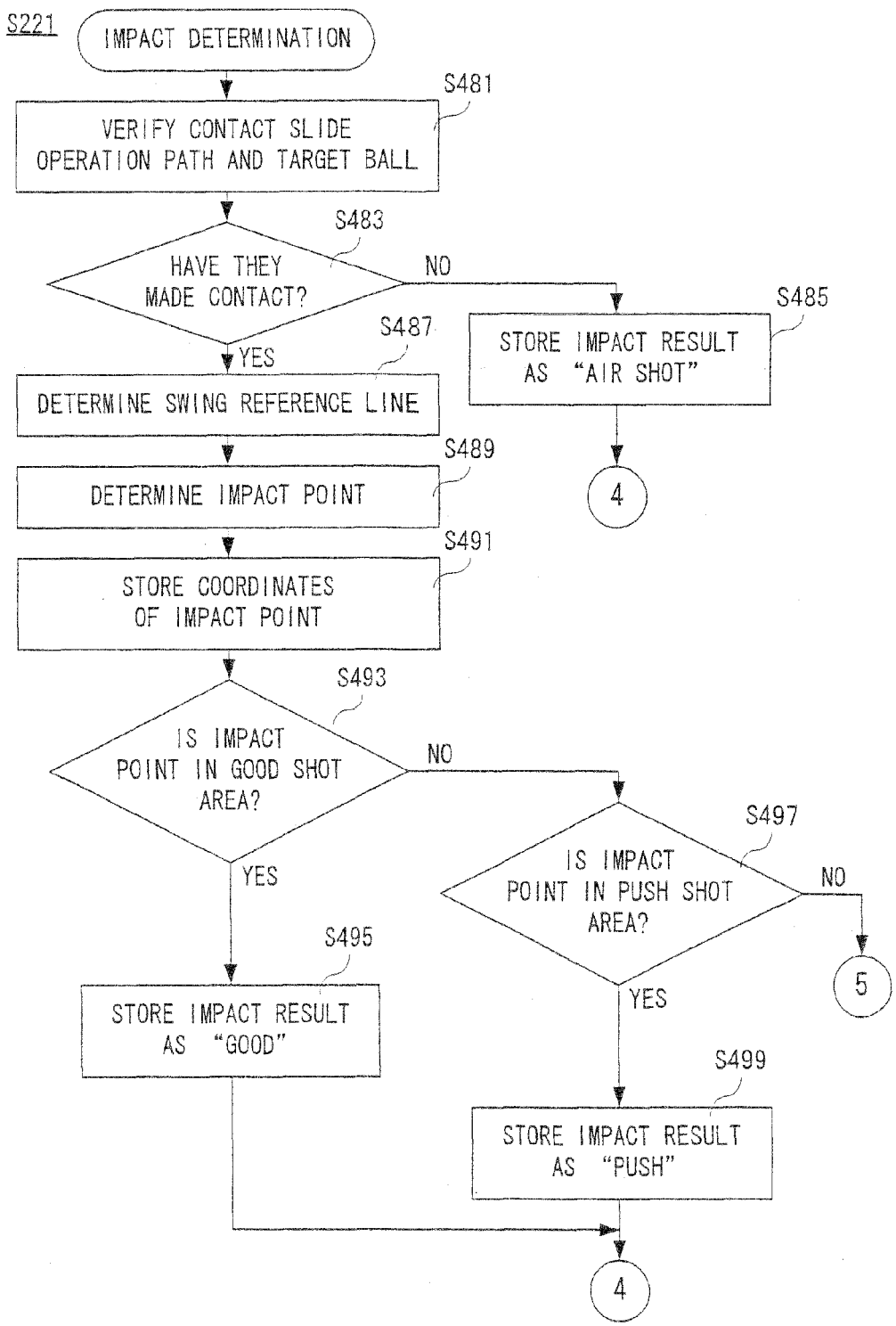
FIG. 42 is a flowchart showing a part of an impact determination process by the CPU core in the second embodiment.
Figure 43:
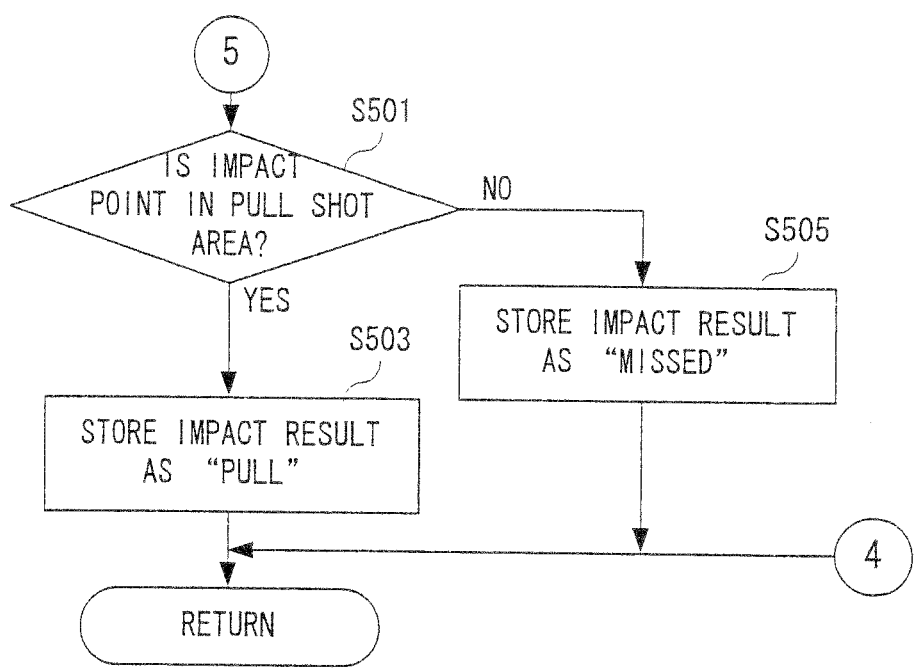
FIG. 43 is a flowchart showing another part of the impact determination process by the CPU core in the second embodiment and continued from FIG. 42.

FIG. 42 and FIG. 43 represent a flowchart showing the impact determination process of step S221 shown in FIG. 31. For the sake of simplicity, in a description on the impact determination process, the push shot area and the pull shot area are for the right-handed player character 102. The push shot area and the pull shot for the left-handed player character 102 are just reversed to those for the right-handed player character 102 (see FIG. 14). As shown in FIG. 42, after starting the impact determination process, the CPU core 42 verifies the presence of contact between the slide operation path 142 and the target ball 122 in a step S481. In a next step S483, it is determined whether or not the path 142 has made contact with the target ball 122. If "NO" in the step S483, that is, if the path 142 has not made contact with the target ball 122, the impact determination result "air shot" is stored in a step S485. That is, the impact determination result data 754 indicative of "air shot" is stored in the RAM 48. The same applies to the following cases where the impact determination result is stored.

However, if "YES" in the step S483, that is, if the path 142 has made contact with the target ball 122, the swing reference line q1 is determined in a step S487. The impact point is determined in a succeeding step S489, and the coordinates of the impact point, i.e., the impact point data 756 is stored in the RAM 48 in a step S491.

In a succeeding step S493, it is determined whether or not the impact point is within the good shot area (I). If "YES" in the step S493, that is, if the impact point is within the good shot area (I), the impact determination result data 754 indicative of "good" is stored in the RAM 48, and the impact determination process is returned as shown in FIG. 43. On the other hand, if "NO" in the step S493, that is, if the impact point is not within the good shot area (I), it is determined in a step S497 whether or not the impact point is within the push shot area (II). If "YES" in the step S497, that is, if the impact point is within the push shot area (II), the impact determination result data 754 indicative of "push" is stored in the RAM 48 in a step S499, and the impact determination process is returned.

However, if "NO" in the step S497, that is, if the impact point is not within the push shot area (II), it is determined in a step S501 shown in FIG. 43 whether or not the impact point is within the pull shot area (III). If "YES" in the step S501, that is, if the impact point is within the pull shot area (II), the impact determination result data 754 indicative of "pull" is stored in the RAM 48 in a step S503, and the impact determination process is returned. On the other hand, if "NO" in the step S501, that is, if the impact point is within the missed shot area (IV), the impact determination result data 754 indicative of "missed" is stored in the RAM 48 in a step S505, and the impact determination process is returned.

Figure 44:
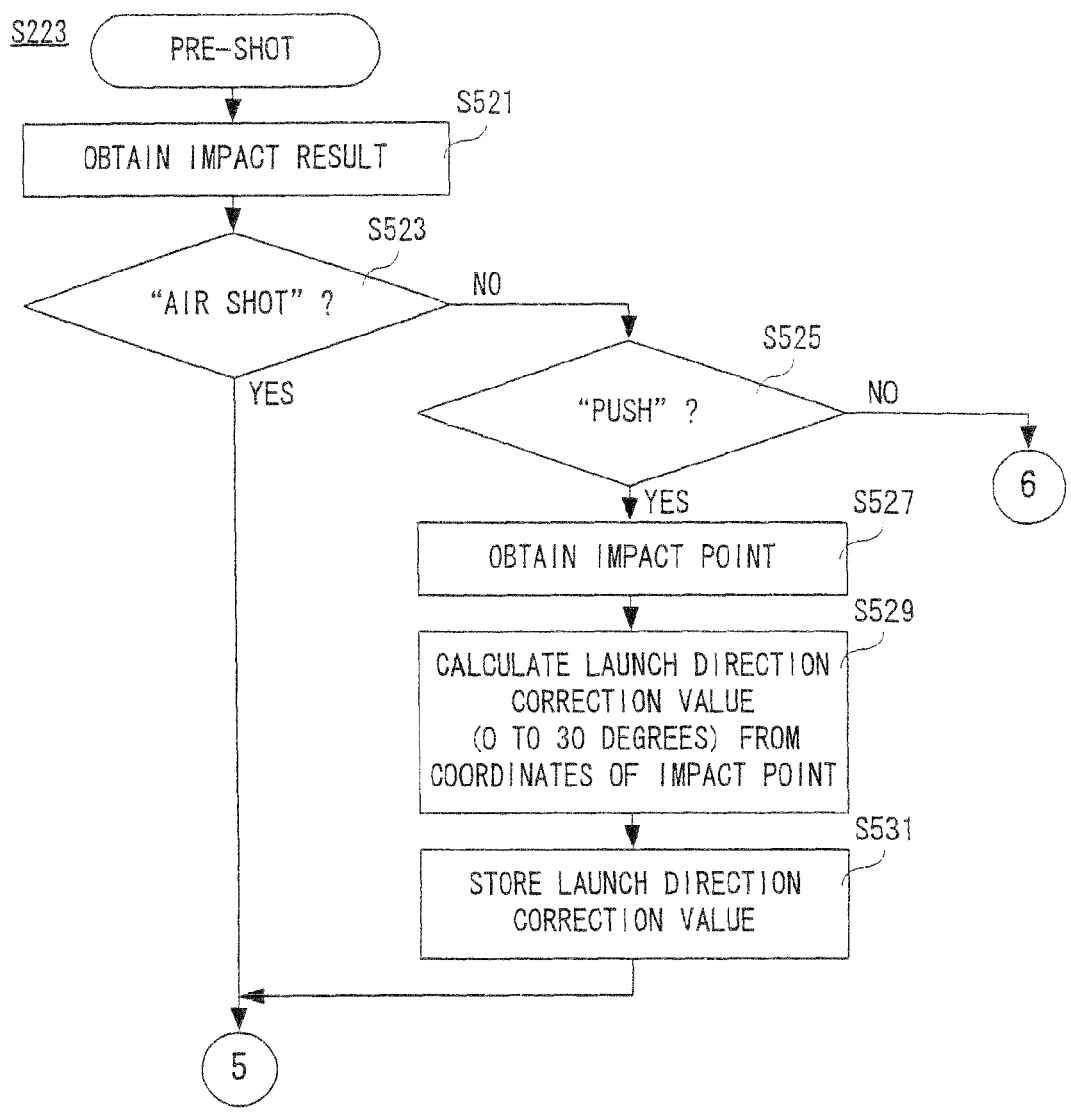
FIG. 44 is a flowchart showing a part of a pre-shot process by the CPU core in the second embodiment.

FIG. 44 to FIG. 47 represent a flowchart showing the pre-shot process of step S223 shown in FIG. 31. As in the case of the above described impact determination process, this pre-shot process is described with reference to the right-handed player character 102. Referring to FIG. 44, after starting the pre-shot process, the CPU core 42, in a step S521, refers to the RAM 48 to obtain the impact determination result indicated by the impact determination result data 754. In a next step S523, it is determined whether the impact determination result indicates "air shot" or not.

Figure 46:
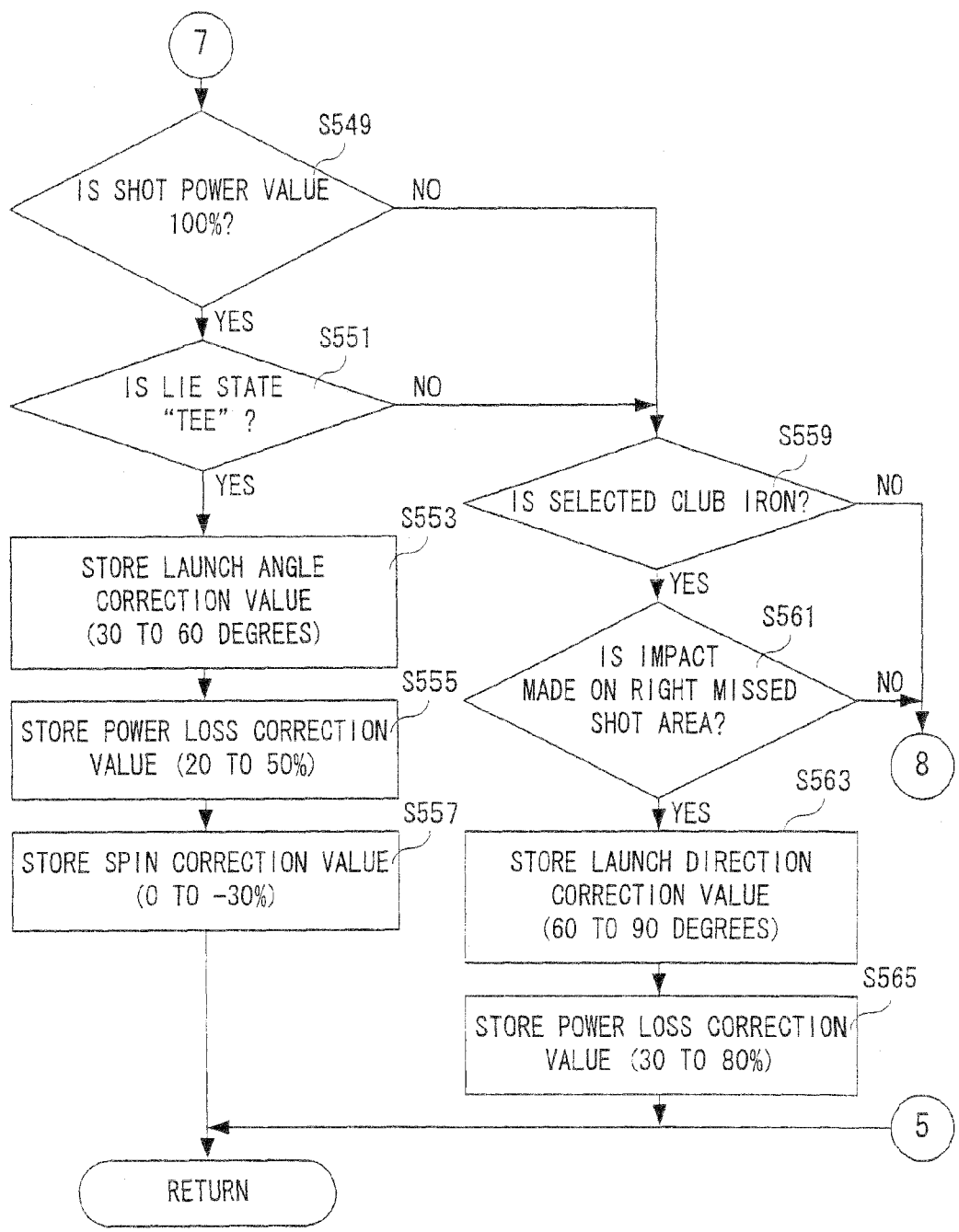
FIG. 46 is a flowchart showing still another part of the pre-shot process by the CPU core in the second embodiment and continued from FIG. 44.

If "YES" in the step S523, that is, if the impact determination result indicates "air shot", the pre-shot process is directly returned as shown in FIG. 46. On the other hand, if "NO" in the step S523, that is, if the impact determination result does not indicate "air shot", it is determined in the step S525 whether the impact determination result indicates "push" or not. If "YES" in the step S525, that is, if the impact result indicates "push", the RAM 48 is referred to and the coordinates of the impact point indicated by the impact point data 756 is obtained in a step S527. In a succeeding step S529, the launch direction correction value (0 to 30 degrees, for example) is calculated from the coordinates of the impact point. Here, the amount of shift (distance) of the impact point from the center of the impact determination area 1220 is detected and the launch direction correction value is calculated according to the distance. For example, the launch direction correction value varies in a linear manner (in stages) as the distance becomes longer. Conversely, the launch direction correction value may vary in a linear manner (in stages) as the distance becomes shorter. Then, the launch direction correction data 758 corresponding to the calculated launch direction correction value is stored in the RAM 48 in a step S531, and the pre-shot process is returned.

Figure 45:
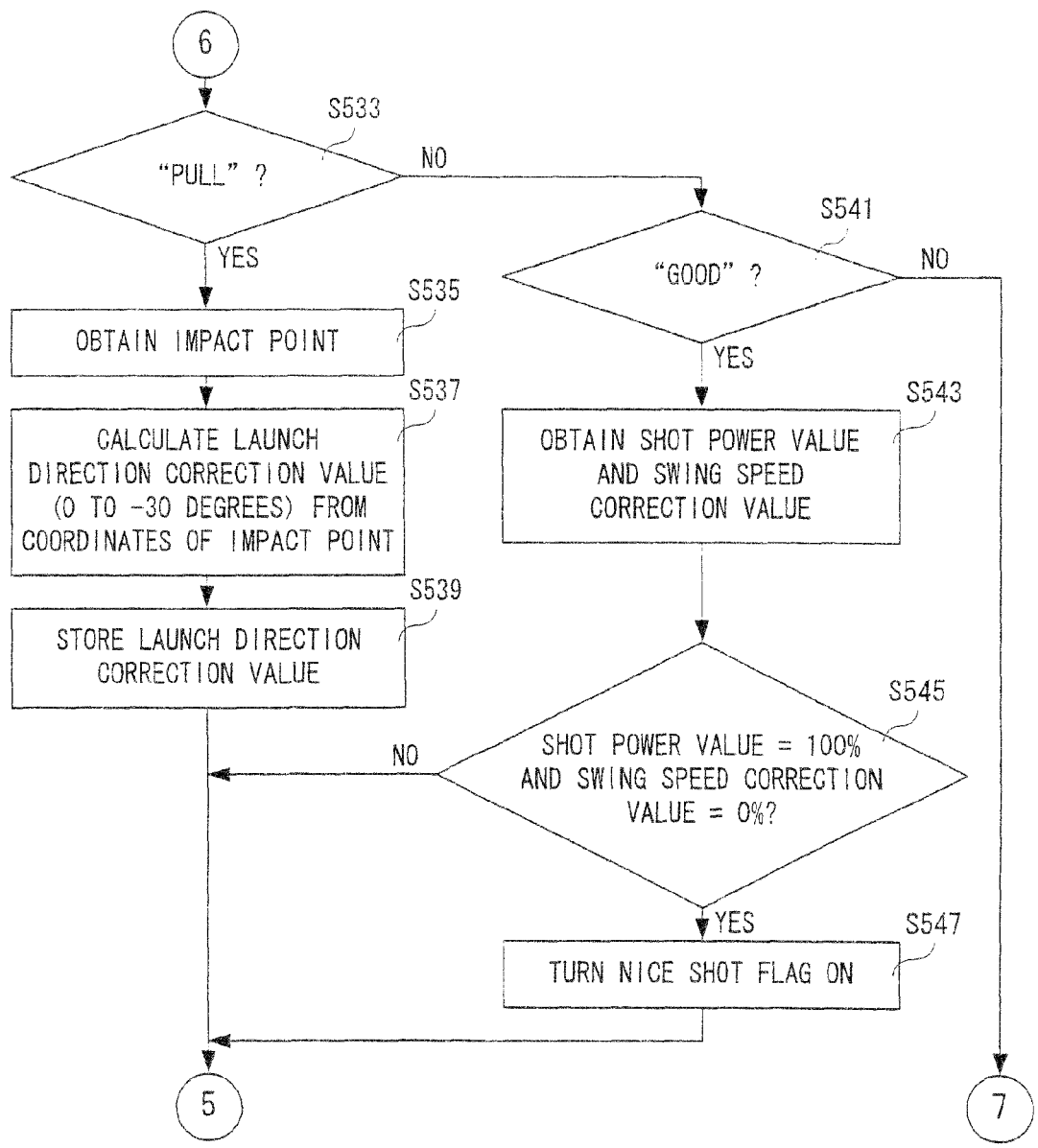
FIG. 45 is a flowchart showing another part of the pre-shot process by the CPU core in the second embodiment and continued from FIG. 44.

However, if "NO" in the step S525, that is, if the impact determination result does not indicate "push", it is determined in a step S533 shown in FIG. 45 whether the impact determination result indicates "pull" or not. If "YES" in the step S533, that is, if the impact determination result indicates "pull", the RAM 48 is referred to and the coordinates of the impact point indicated by the impact point data 756 are obtained. In a succeeding step S537, the launch direction correction value (0 to −30 degrees, for example) is calculated from the coordinates of the impact point. Here, as in the case where the impact determination result is "push", the amount of shift (distance) of the impact point from the center of the impact determination area 1220 is detected, and the launch direction correction value is calculated according to the distance. For example, the launch direction correction value varies in a linear manner (in stages) in a negative direction as the distance becomes longer. Otherwise, the launch direction correction value varies in a linear manner (in stages) in a negative direction as the distance becomes shorter. Then, the launch direction correction data 758 corresponding to the calculated launch direction correction value is stored in the RAM 48 in a step S539, and the pre-shot process is returned.

However, if "NO" in the step S533, that is, if the impact determination result does not show "pull", it is determined in a step S541 whether the impact determination result indicates "good" or not. If "NO" in the step S541, that is, the impact determination result does not indicate "good", it is concluded that the impact determination result indicates "missed", and the process moves to a step S549 shown in FIG. 46. On the other hand, if "YES" in the step S541, that is, if the impact determination result indicates "good", the shot power value and the swing speed correction value are obtained in a step S543. More specifically, the CPU core 42 refers to the RAM 48 to obtain the shot power value indicated by the shot power value data 748 and the swing speed correction value indicated by the swing speed correction value data 752.

Then, it is determined in a step S545 whether or not the shot power value is 100% and the swing speed correction value is 0%. Alternatively, it may be determined whether the swing speed correction flag 774 is turned off or not, instead of whether the swing speed correction value is 0% or not. If "NO" in the step S545, that is, if the shot power value is less than 100%, or if the swing speed correction value is 1% or more, or if both the two requirements are satisfied, the pre-shot process is directly returned. On the other hand, if "YES" in the step S545, that is, if the shot power value is 100% and the swing speed correction value is 0%, it is concluded that this is a "nice shot", and the nice shot flag 776 is turned on in a step S547, and the pre-shot process is returned.

As stated above, if the impact determination result indicates "missed", in a step S549 shown in FIG. 46, the RAM 48 is referred to and it is determined whether the shot power value indicated by the shot power value data 748 is 100% or not. If "NO" in the step S549, that is, the shot power value is not 100%, the process moves directly to a step S559. However, if "YES" in the step S549, that is, if the shot power value is 100%, the RAM 48 is referred to and it is determined whether the lie state indicated by the lie state data 740 is "tee" or not. That is, it is determined whether this is a tee shot or not.

If "NO" in the step S551, that is, if the lie state is not "tee", it is concluded that this is not a tee shot, and the process goes to the step S559. On the other hand, if "YES" in the step S551, that is, the lie state is "tee", it is concluded that this is a tee shot, and the type of the missed shot is determined as "pop-up". More specifically, in a step S553, the launch angle correction value is decided at random (random number) within a range of 30 to 60 degrees, and the corresponding launch angle correction data 762 is stored in the RAM 48. Also, in a step S555, the power loss correction value is decided at random (random number) within a range of 20 to 50%, and the corresponding power loss correction data 762 is stored in the RAM 48. Then, in a step S557, the spin (back-spin) correction value is decided at random (random number) within a range of 0 to −30%, and the corresponding spin correction data 764 is stored in the RAM 48, and the pre-shot process is returned.

Also, in the step S559, by reference to the RAM 48, it is determined whether the club 104 indicated by the selected club data 724 is an iron (here including a wedge) or not. If "NO" in the step S559, that is, if the selected club 104 is not an iron, the process goes to a step S567 shown in FIG. 47. On the other hand, if "YES" in the step S559, that is, if the selected club 104 is an iron, it is determined in a step S561 whether or not an impact is made on the right missed shot area (IV). If "NO" in the step S561, that is, if no impact is made on the right missed shot area (IV), the process moves to the step S567. On the other hand, if "YES" in the step S561, that is, if an impact is made on the right missed shot area (IV), the type of the missed shot is determined as "shank". More specifically, in a step S563, the launch direction correction value is decided at random (random number) within a range of 60 to 90 degrees, and the corresponding launch direction correction data 758 is stored in the RAM 48. Then, in a step S565, the power loss correction value is decided at random (random number) within a range of 30 to 80%, and the corresponding power loss correction data 762 is stored in the RAM 48, and then the pre-shot process is returned.

Besides, this pre-shot process is described with reference to the case where the player character 102 is right-handed. For the left-handed player character, it is determined in the step S561 whether or not an impact is made on the left missed shot area (IV).

Figure 47:
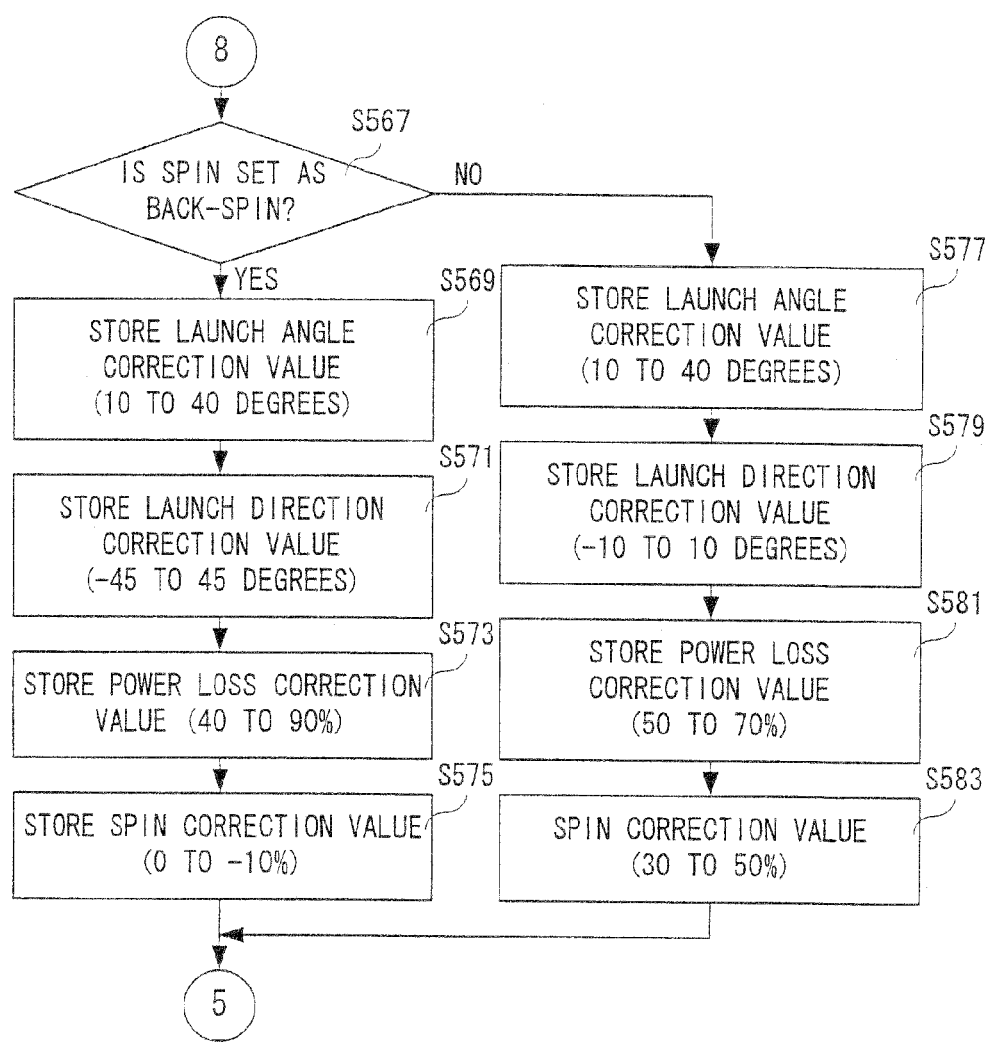
FIG. 47 is a flowchart showing further another part of the pre-shot process by the CPU core in the second embodiment and continued from FIG. 46.

As shown in FIG. 47, in the step S567, it is determined whether the spin is set as back-spin or not. Here, the CPU core 42 refers to the RAM 48 to determine whether the spin correction value indicated by the spin correction data 764 has a minus sign or not. If "YES" in the step S567, that is, if the spin is set as back-spin, the type of the missed shot is determined as "duffing". More specifically, in a step S569, the launch angle correction value is decided at random (random number) within a range of 10 to 40 degrees, and the correcting launch angle correction data 760 is stored in the RAM 48. Also, in a step S571, the launch direction correction value is decided at random (random number) within a range of −45 to 45 degrees, and the corresponding launch direction correction data 758 is stored in the RAM 48. Moreover, in a step S573, the power loss correction value is decided at random (random number) within a range of 40 to 90%, and the corresponding power loss correction data 762 is stored in the RAM 48. Then, in a step S575, the spin (back-spin) correction value is decided at random (random number) within a range of 0 to −10%, and the corresponding spin correction data 764 is stored (updated) in the RAM 48, and then the pre-shot process is returned as shown in FIG. 46.

However, if "NO" in the step S567, that is, if the spin is not set as back-spin, the type of the missed shot is determined as "top". More specifically, in a step S577, the launch angle correction value is decided at random (random number) within a range of 10 to 40 degrees, and the correcting launch angle correction data 760 is stored in the RAM 48. Also, in a step S579, the launch direction correction value is decided at random (random number) within a range of −10 to 10 degrees, and the corresponding launch direction correction data 758 is stored in the RAM 48. Moreover, in a step S581, the power loss correction value is decided at random (random number) within a range of 50 to 70%, and the corresponding power loss correction data 762 is stored in the RAM 48. Then, in a step S583, the spin (top-spin) correction value is decided at random (random number) within a range of 30 to 50%, and the corresponding spin correction data 764 is stored (updated) in the RAM 48, and then the pre-shot process is returned.

As stated above, in the pre-shot process, the parameters (correction values) related to the movement of the ball 106 are decided on the basis of the impact determination result.

Incidentally, in the second embodiment, the launch angle correction value, the launch direction correction value, the power loss correction value, and the spin correction value are decided at random (random numbers) according to the type of a missed shot. These values may be decided in a linear manner (in stages) according to the impact point, as in the above described case of "push" or "pull".

In the above described pre-shot process, the type of a missed shot is determined as "pop-up", "shank", "duffing", or "top". If the selected club 104 is PT, a missed shot is not determined as any of them.

Figure 48:
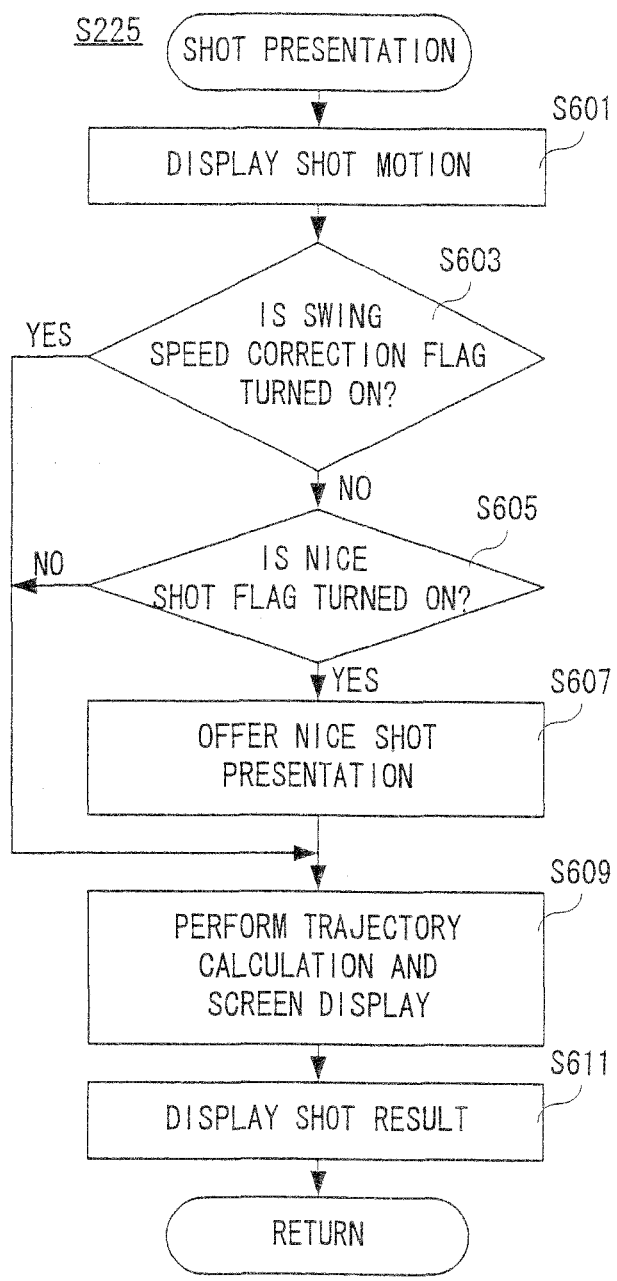
FIG. 48 is a flowchart showing a shot presentation process by the CPU core in the second embodiment.

FIG. 48 is a flowchart showing the shot presentation process of step S225 shown in FIG. 31. As shown in FIG. 48, after starting the shot presentation process, the CPU core 42 offers a shot motion display in a step S601. More specifically, the game screen 100 displayed on the LCD 12 shows a motion (animation) of the player character 102 swinging the club 104 (or hitting the ball 106). However, if the impact determination result is "air shot", an animation of the player character 102 swinging at the ball 106 and missing is presented. In a succeeding step S603, the RAM 48 is referred to and it is determined whether the swing speed correction flag 774 is turned on or not. If "YES" in the step S603, that is, if the swing speed correction flag 774 is turned on, the process goes straight to a step S609. On the other hand, if "NO" in the step S603, that is, if the swing speed correction flag 774 is turned off, it is determined in a step S605 whether the nice shot flag 776 is turned on or not.

If "NO" in the step S605, that is, if the nice shot flag 776 is turned off, the process moves directly to the step S609. On the other hand, if "YES" in the step S605, that is, if the nice shot flag 776 is turned on, a nice shot presentation is made in a step S607, and the process goes to a step S609. The nice shot presentation is the same as that described in relation to the step S93 of the first embodiment, and a detailed description is omitted here.

In the step S609, trajectory calculation (calculation of carry F and hitting direction D) is performed and screen display is provided. The carry F and the hitting direction D are calculated according to the equation 1 and the equation 2 described in connection to the first embodiment, respectively. Also, in the process of screen display, the game screen 100 is displayed in which the ball 106 moves (flies off or rolls on the ground) in the virtual space according to the calculated trajectory. In the case of "air shot", however, the ball 106 makes no move, and, for example, the game screen 100 is displayed in which the player character 102 is taking a disappointed posture in the tee ground. Then, the shot result is displayed in a step S611, and the shot presentation process is returned. For the shot result, the carry is displayed in numerical value, the remaining distance to the pin is displayed in numerical value, or the lie state in the current position of the ball 106 is displayed.

As in the case of the first embodiment, the second embodiment allows the player to perform simple and intuitive operations, which makes it possible to enjoy a realistic game.

Although the present example embodiments have been described and illustrated in detail, it is clearly understood that the same is by way of illustration and example only and is not to be taken by way of limitation, the spirit and scope of the present example embodiments being limited only by the terms of the appended claims.

What is claimed is:

1. An information processing apparatus comprising:
a display portion;
a pointing device provided relative to said display portion; and a computer processor configured to:
- set at least two parameters based on the two-dimensional coordinates of a designated position on the display portion by utilizing said pointing device; and
- perform a predetermined process based on the set two parameters and a locus input subsequent to a designation by said pointing device when the two parameters are set.

2. The information processing apparatus according to claim 1, wherein
said pointing device comprises a touch panel provided relative to said display portion, and wherein
said designated position on said display portion is a touch position on said touch panel when the touch panel is touched on, and
said locus input is slide operation from said touch position.

3. The information processing apparatus according to claim 1, wherein said computer processor is configured to further:
decide a locus by said locus input, and
determine, based on the decided locus, whether or not at least one of said two parameters is to be changed.

4. The information processing apparatus according to claim 3, wherein the computer processor is configured to further:
decide a change amount of one of said two parameters in accordance with a position that said decided locus passes.

5. The information processing apparatus according to claim 1, wherein the computer processor is configured to further:
reset said two parameters based on the change of said designated position if and when a predetermined condition is satisfied after the two parameters are set.

6. The information processing apparatus according to claim 5, wherein
said predetermined condition includes that a direction of said locus input is a predetermined direction.

7. The information processing apparatus according to claim 5, wherein
said predetermined condition includes that a change of said locus input is less than a predetermined distance.

8. The information processing apparatus according to claim 1, wherein
said computer processor sets a first parameter based on one coordinate of said designated position and a second parameter based on another coordinate of said designated position.

9. An information processing system comprising:
a display portion;
a pointing device provided relative to said display portion; and
one or more computer processors configured to:
- set at least two parameters based on the two-dimensional coordinates of a designated position on the display portion by utilizing said pointing device; and
- perform a predetermined process based on the set two parameters and a locus input subsequent to a designation by said pointing device when the two parameters are set.

10. A non-transitory computer readable storage medium storing an information processing program executable by one or more computers which has a display portion and a pointing device provided relative to said display portion, wherein the information processing program causes the computer to at least perform:
setting at least two parameters based on the two-dimensional coordinates of a designated position on the display portion by utilizing said pointing device; and
performing a predetermined process based on the set two parameters and a locus input subsequent to a designation by said pointing device when the two parameters are set.

11. An information processing method by one or more computers which has a display portion and a pointing device provided relative to said display portion, the computer at least performing:
(a) setting at least two parameters based on the two-dimensional coordinates of a designated position on the display portion by utilizing said pointing device; and
(b) performing a predetermined process based on the set two parameters and a locus input subsequent to a designation by said pointing device when the two parameters are set.

* * * * *